United States Patent
Yi et al.

(10) Patent No.: US 11,723,032 B2
(45) Date of Patent: Aug. 8, 2023

(54) TRANSMISSION USING A PLURALITY OF WIRELESS RESOURCES

(71) Applicant: Comcast Cable Communications, LLC, Philadelphia, PA (US)

(72) Inventors: Yunjung Yi, Vienna, VA (US); Esmael Dinan, McLean, VA (US); Jonghyun Park, Vienna, VA (US); Nazanin Rastegardoost, McLean, VA (US); Ali Cirik, Herndon, VA (US); Kai Xu, Herndon, VA (US); Hua Zhou, Herndon, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 123 days.

(21) Appl. No.: 17/323,928

(22) Filed: May 18, 2021

(65) Prior Publication Data

US 2021/0360616 A1    Nov. 18, 2021

Related U.S. Application Data

(60) Provisional application No. 63/026,457, filed on May 18, 2020.

(51) Int. Cl.
*H04W 72/00*   (2023.01)
*H04W 72/21*   (2023.01)
*H04W 72/044*  (2023.01)

(52) U.S. Cl.
CPC .......... *H04W 72/21* (2023.01); *H04W 72/044* (2013.01)

(58) Field of Classification Search
CPC ................ H04L 12/28; H04L 12/50

USPC ......................................................... 370/329
See application file for complete search history.

(56) References Cited

U.S. PATENT DOCUMENTS

| | | | |
|---|---|---|---|
| 7,808,883 B2 | 10/2010 | Green | |
| 10,313,079 B2 | 6/2019 | Yerramalli et al. | |
| 10,334,450 B2 | 6/2019 | Bendlin et al. | |
| 10,411,838 B2 | 9/2019 | Xu et al. | |
| 2018/0020360 A1 | 1/2018 | Yerramalli et al. | |
| 2019/0141698 A1 | 5/2019 | Kim et al. | |
| 2019/0319823 A1 | 10/2019 | Akkarakaran et al. | |
| 2020/0100116 A1 | 3/2020 | Chakraborty et al. | |

(Continued)

FOREIGN PATENT DOCUMENTS

| | | |
|---|---|---|
| CN | 101534525 B | 12/2012 |
| EP | 3282791 A1 | 2/2018 |

(Continued)

OTHER PUBLICATIONS

3GPP TS 38.211 V15.4.0 (Dec. 2018), Technical Specification, 3rd Generation Partnership Project; Technical Specification Group Radio Access Network; NR; Physical channels and modulation (Release 15).

(Continued)

*Primary Examiner* — Dang T Ton
(74) *Attorney, Agent, or Firm* — Banner & Witcoff, Ltd.

(57) ABSTRACT

A base station and/or a wireless device may communicate using a plurality of wireless resources. Multiple carriers may be used for a transmission such that portions of the transmission may be transmitted using different carriers. Multiple carrier transmission may be independently configured for each of a plurality of wireless resources.

20 Claims, 33 Drawing Sheets

(56) References Cited

U.S. PATENT DOCUMENTS

| | | | |
|---|---|---|---|
| 2020/0367208 A1 | 11/2020 | Khoshnevisan et al. | |
| 2021/0050955 A1 | 2/2021 | Park et al. | |
| 2022/0295484 A1* | 9/2022 | Yi | H04W 72/042 |

FOREIGN PATENT DOCUMENTS

| | | |
|---|---|---|
| EP | 2678968 B1 | 3/2018 |
| EP | 3537818 A1 | 9/2019 |
| EP | 3618335 A1 | 3/2020 |
| WO | 2019105392 A1 | 6/2019 |

OTHER PUBLICATIONS

3GPP TS 38.213 V16.0.0 (Dec. 2019) 3rd Generation Partnership Project; Technical Specification Group Radio Access Network; NR; Physical layer procedures for control (Release 16).

3GPP TS 38.331 V15.8.0 (Dec. 2019) 3rd Generation Partnership Project; Technical Specification Group Radio Access Network; NR; Radio Resource Control (RRC) protocol specification (Release 15).

R1-2003282 3GPP TSG RAN WG1 Meeting #101-e, eMeeting, May 25-Jun. 5, 2020, Source: FUTUREWEI, Title: Coverage recovery for RedCap.

R1-2003291 3GPP TSG RAN WG1 Meeting #101-e, eMeeting, May 25-Jun. 5, 2020, Source: Ericsson, Title: Functionality for coverage recovery for RedCap.

R1-2003303 3GPP TSG RAN WG1 Meeting #101-e, eMeeting, May 25-Jun. 5, 2020, Source: Huawei, HiSilicon, Title: Functionality for coverage recovery.

R1-2003343 3GPP TSG RAN WG1 Meeting #101-e, eMeeting, May 25-Jun. 5, 2020, Source: Sierra Wireless, Title: Potential techniques for NR coverage enhancements.

R1-2003347 3GPP TSG RAN WG1 Meeting #101-e, eMeeting, May 25-Jun. 5, 2020, Source: vivo, Title: Discussion on potential techniques for coverage enhancements.

R1-2003646 3GPP TSG RAN WG1 Meeting #101-e, eMeeting, May 25-Jun. 5, 2020, Source: CATT, Title: Coverage recovery for reduced capability NR devices.

R1-2003651 3GPP TSG RAN WG1 Meeting #101-e, eMeeting, May 25-Jun. 5, 2020, Source: CATT, Title: Discussion on the method for coverage enhancement.

R1-2003772 3GPP TSG RAN WG1 Meeting #101-e, eMeeting, May 25-Jun. 5, 2020, Source: Intel Corporation, Title: On coverage recovery for RedCap NR Ues.

R1-2003775 3GPP TSG RAN WG1 Meeting #101-e, eMeeting, May 25-Jun. 5, 2020, Source: Intel Corporation, Title: Discussion on potential techniques for NR coverage enhancement.

R1-2003835 3GPP TSG RAN WG1 Meeting #101-e, eMeeting, May 25-Jun. 5, 2020, Source: China Telecom, Title: Potential solutions for PUSCH coverage enhancements.

R1-2003916 3GPP TSG RAN WG1 Meeting #101-e, eMeeting, May 25-Jun. 5, 2020, Source: Samsung, Title: Considerations on potential techniques for coverage enhancement.

R1-2003938 3GPP TSG RAN WG1 Meeting #101-e, eMeeting, May 25-Jun. 5, 2020, Source: Nomor Research GmbH, Facebook, Title: Potential solutions on coverage enhancement for FR1.

R1-2004106 3GPP TSG RAN WG1 Meeting #101-e, eMeeting, May 25-Jun. 5, 2020, Source: OPPO, Title: Discussion on functionality for coverage recovery.

R1-2004109 3GPP TSG RAN WG1 Meeting #101-e, eMeeting, May 25-Jun. 5, 2020, Source: OPPO, Title: The potential solutions to enhance NR coverage.

R1-2004180 3GPP TSG RAN WG1 Meeting #101-e, eMeeting, May 25-Jun. 5, 2020, Source: Nokia, Nokia Shanghai Bell, Title: Discussion on possible approaches and solutions for NR coverage enhancement.

R1-2004195 3GPP TSG RAN WG1 Meeting #101-e, eMeeting, May 25-Jun. 5, 2020, Source: Sony, Title: Coverage recovery techniques for reduced capability NR devices.

R1-2004198 3GPP TSG RAN WG1 Meeting #101-e, eMeeting, May 25-Jun. 5, 2020, Source: Sony, Title: Techniques for NR coverage enhancement.

R1-2004250 3GPP TSG RAN WG1 Meeting #101-e, eMeeting, May 25-Jun. 5, 2020, Source: Apple Inc., Title: On potential techniques for coverage enhancement.

R1-2004253 3GPP TSG RAN WG1 Meeting #101-e, eMeeting, May 25-Jun. 5, 2020, Source: Apple Inc., Title: Coverage recovery for reduced capability NR devices.

R1-2004254 3GPP TSG RAN WG1 Meeting #101-e, eMeeting, May 25-Jun. 5, 2020, Source: Ericsson, Title: Potential areas for coverage enhancement.

R1-2004426 3GPP TSG RAN WG1 Meeting #101-e, eMeeting, May 25-Jun. 5, 2020, Source: NTT Docomo, Inc., Title: Potential techniques for coverage enhancements.

R1-2004495 3GPP TSG RAN WG1 Meeting #101-e, eMeeting, May 25-Jun. 5, 2020, Source: Qualcomm Incorporated, Title: Considerations for coverage recovery of RedCap devices.

R1-2004532 3GPP TSG RAN WG1 Meeting #101-e, eMeeting, May 25-Jun. 5, 2020, Source: Xiaomi, Title: Initial discussion on coverage recovery for reduced capability device.

R1-1814378; 3GPP TSG-RAN WG1 Meeting #95; Spokane, WA, USA; Nov. 12-Nov. 16, 2018; Ericsson, "Combined CR of all essential corrections to 38.211 from RAN 1#94bis and RAN1#95".

Oct. 29, 2021—European Search Report—EP 21174415.6.

\* cited by examiner

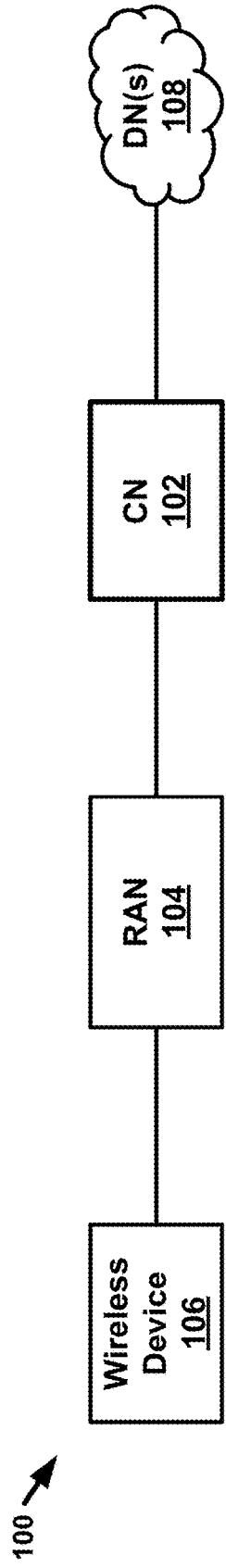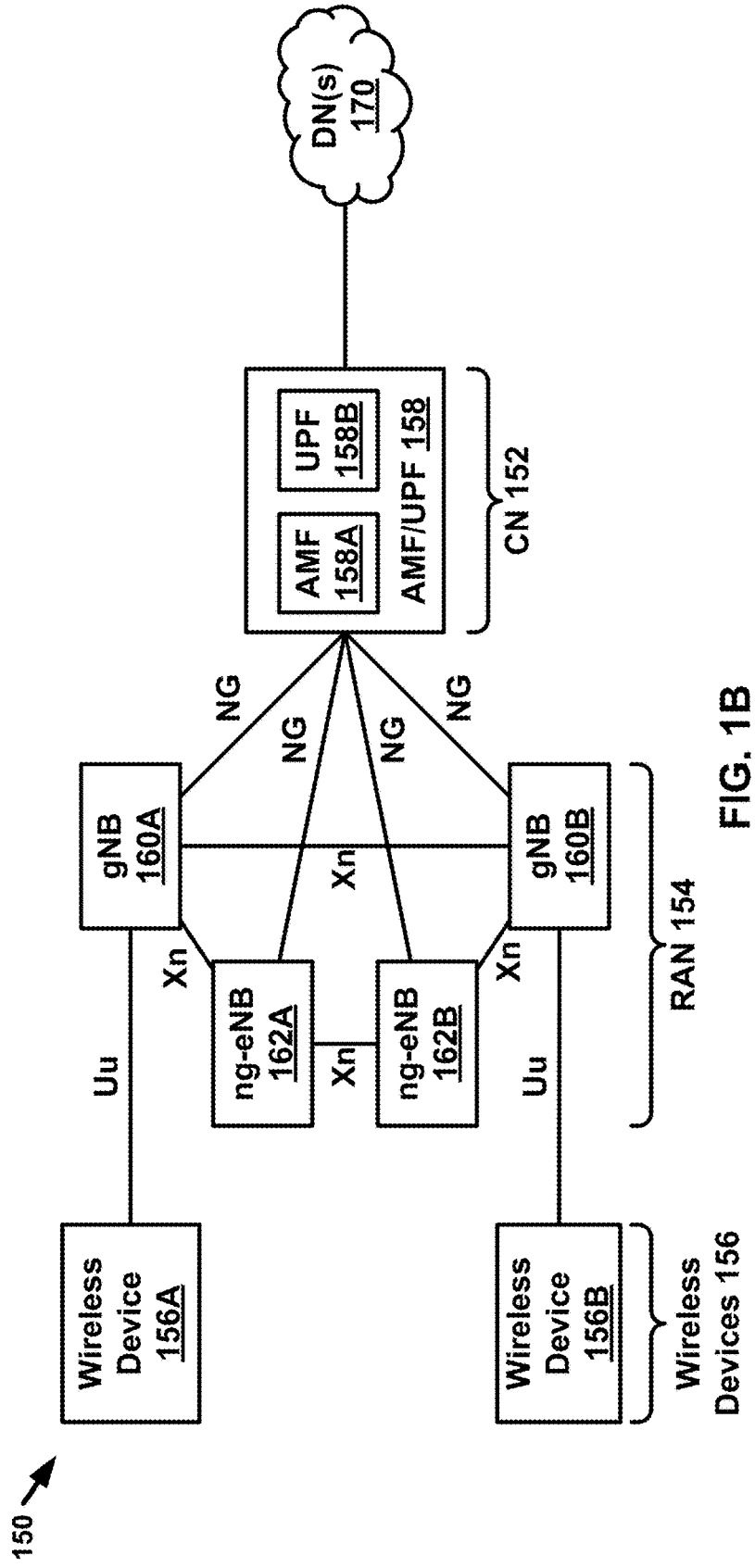

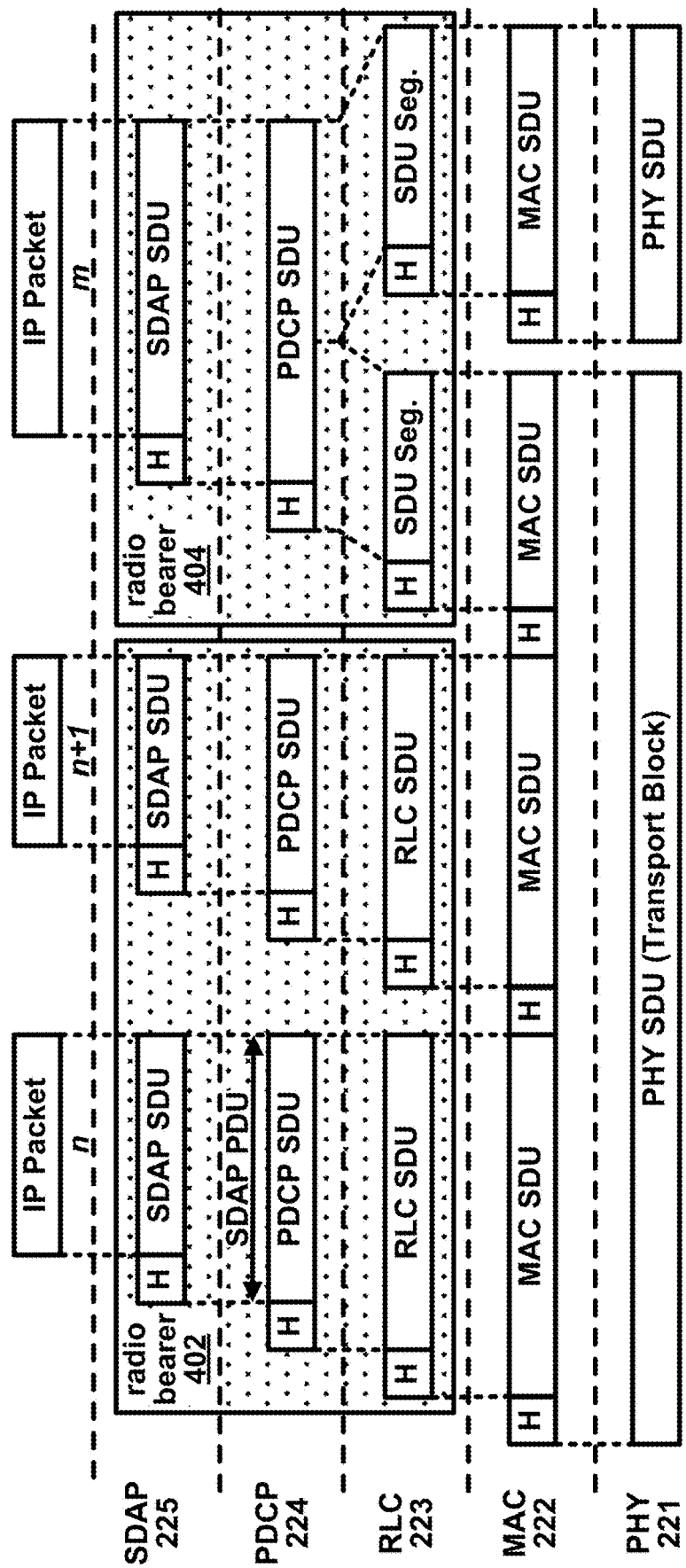
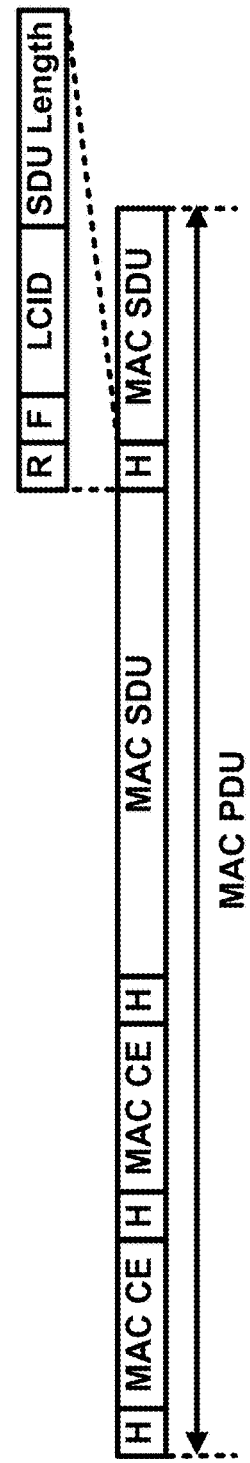
FIG. 4A
FIG. 4B

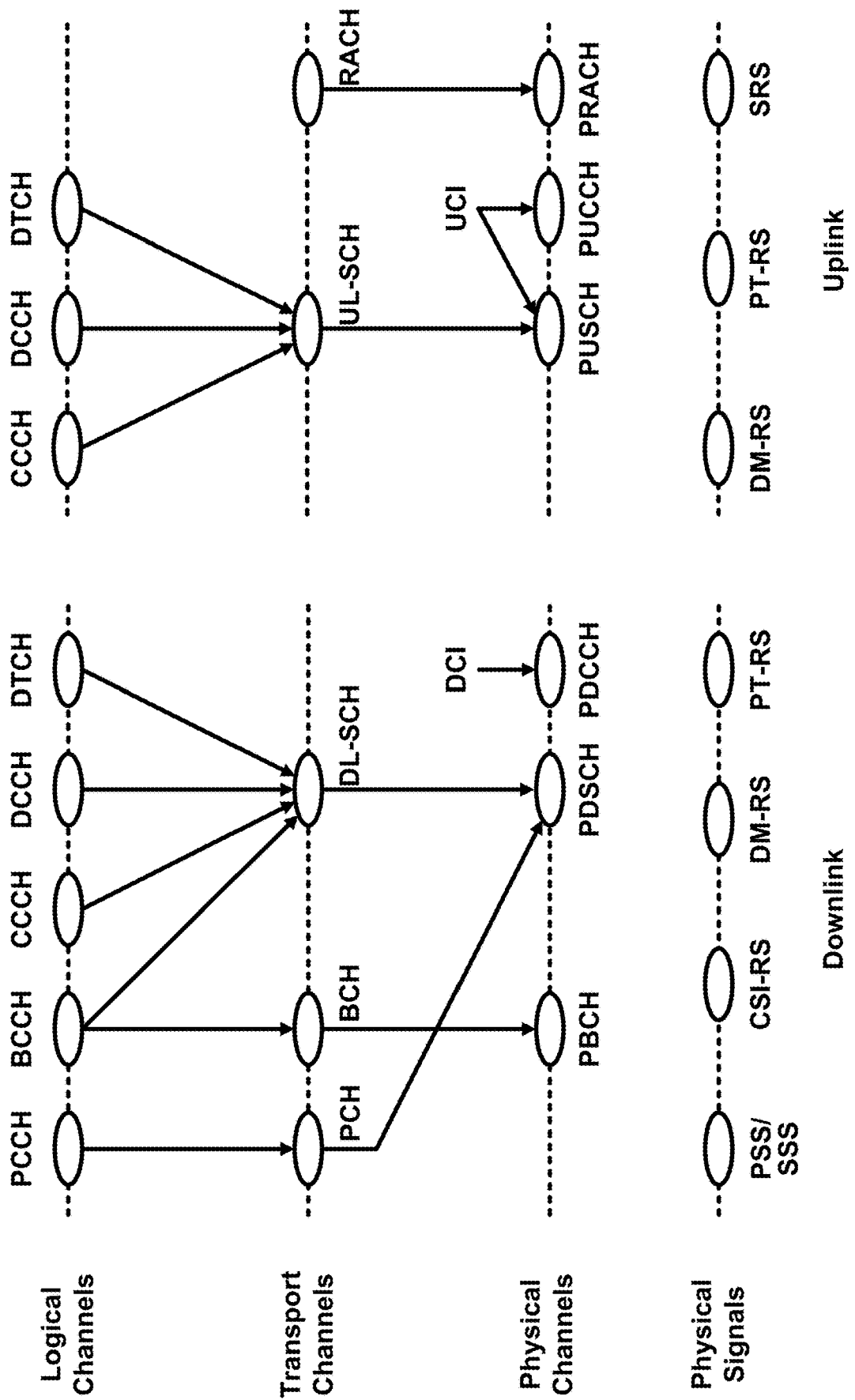

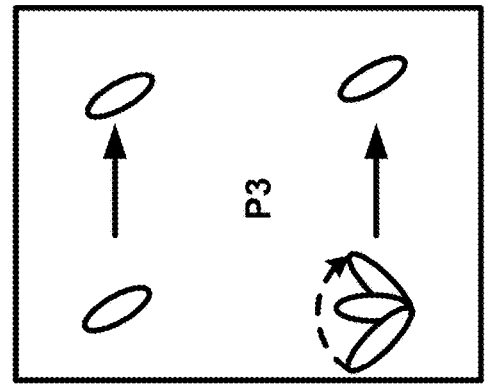
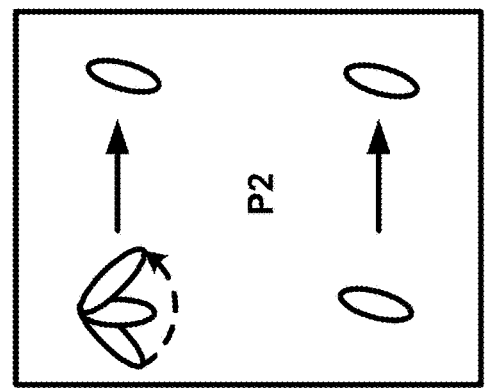
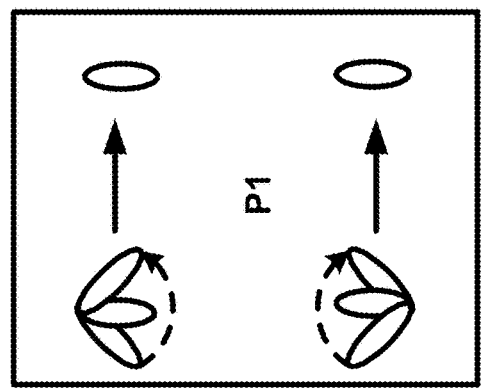
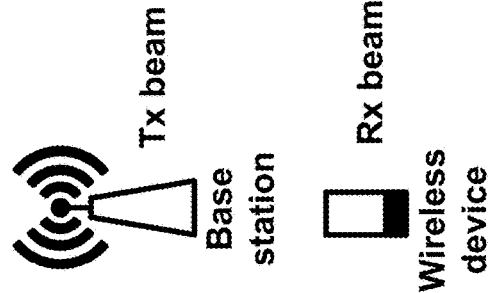
FIG. 12A
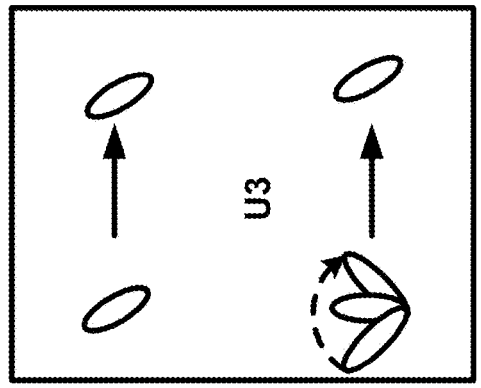
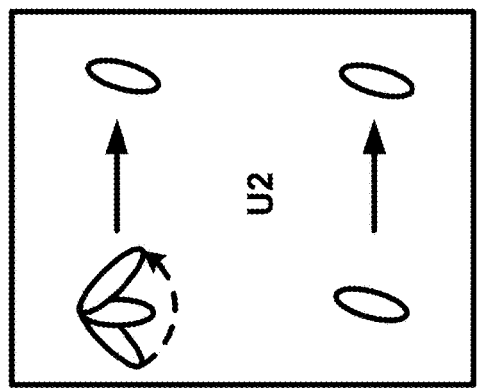
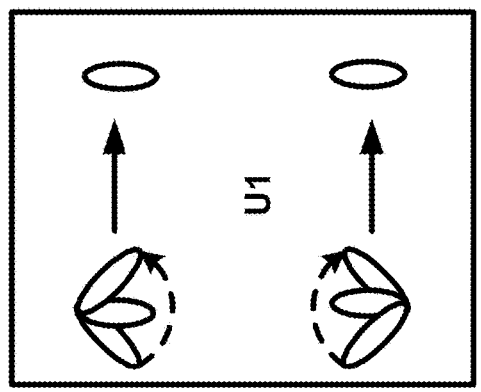
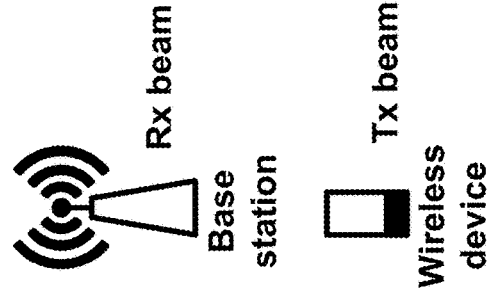
FIG. 12B

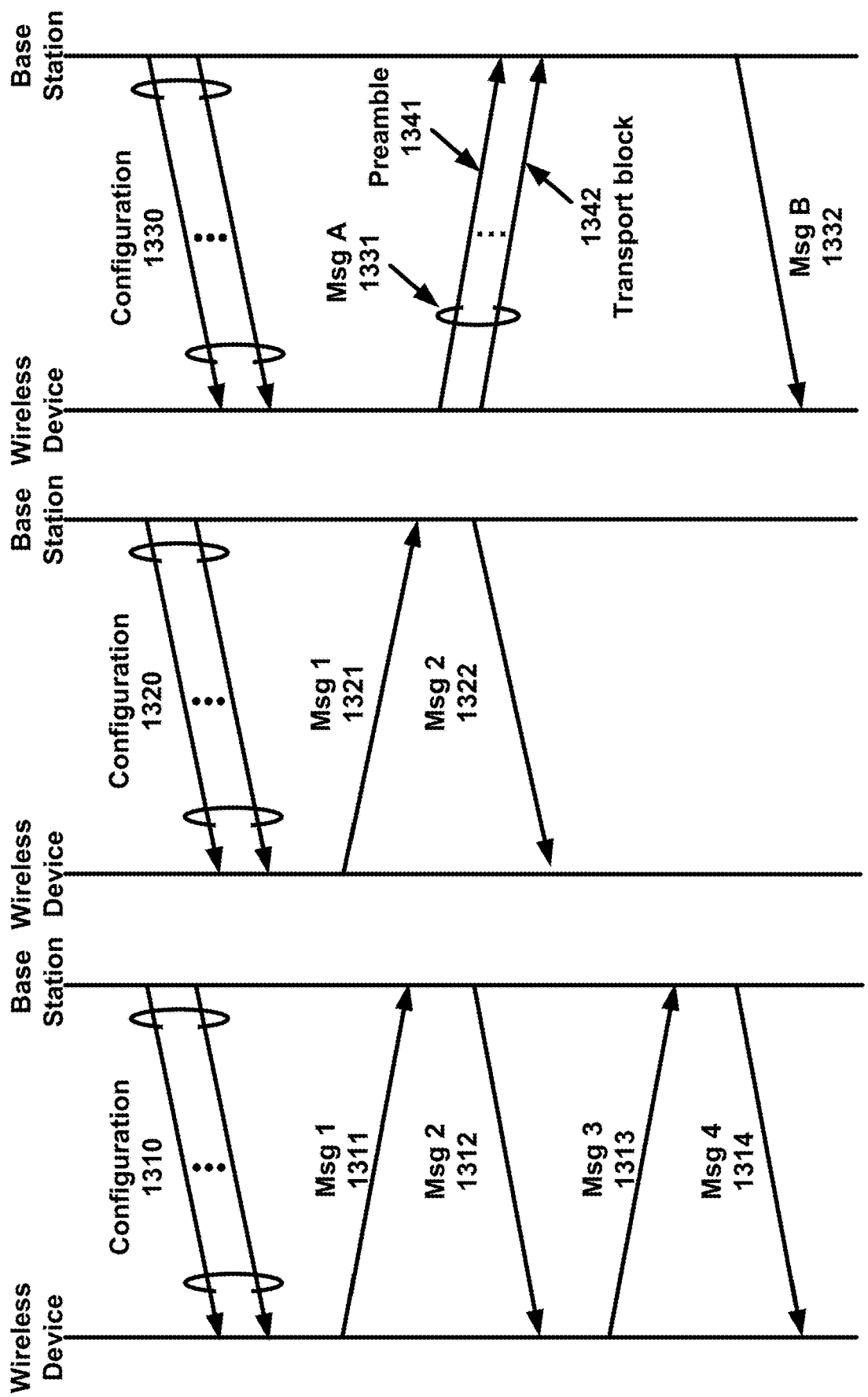

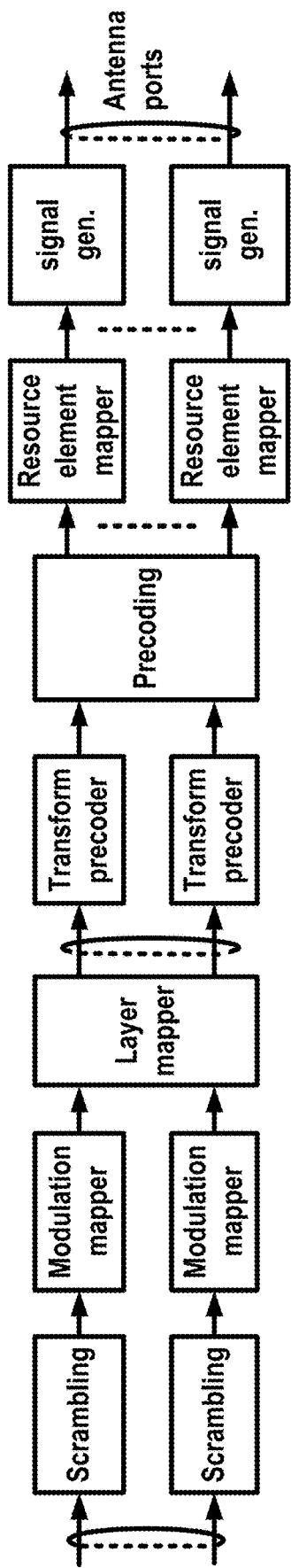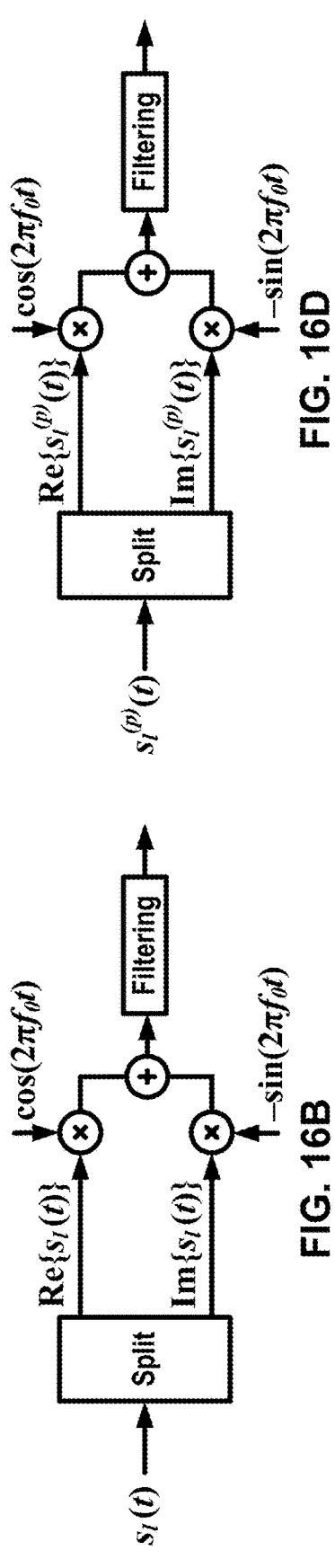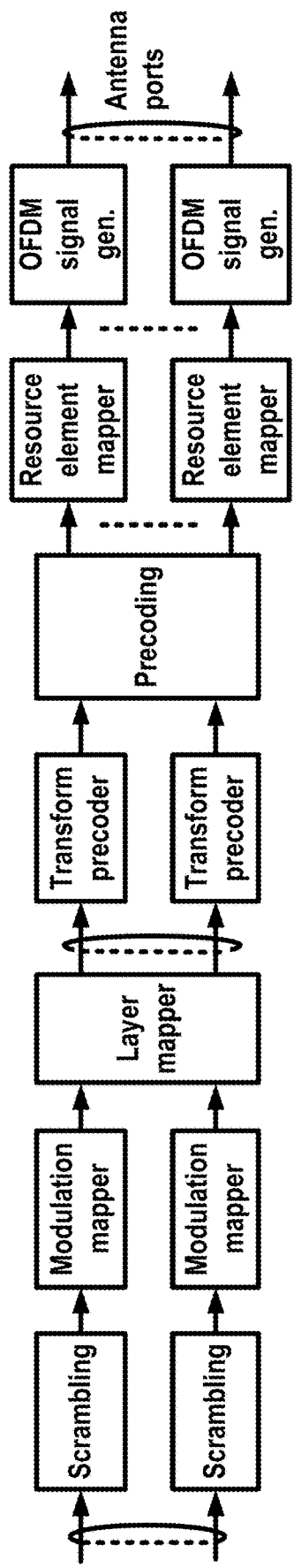
FIG. 16A
FIG. 16B
FIG. 16C
FIG. 16D

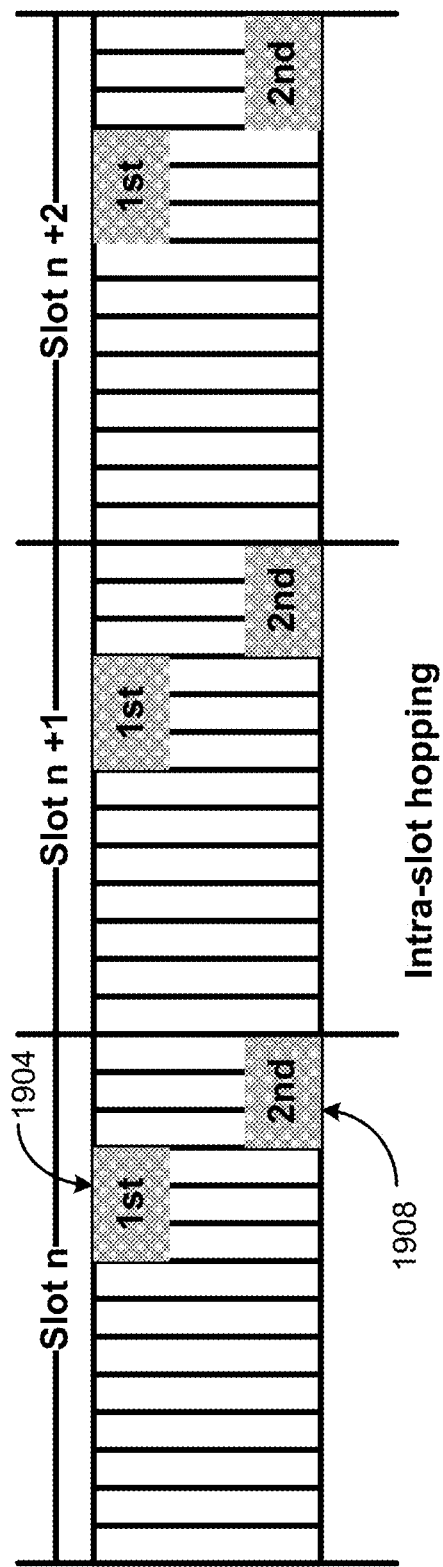
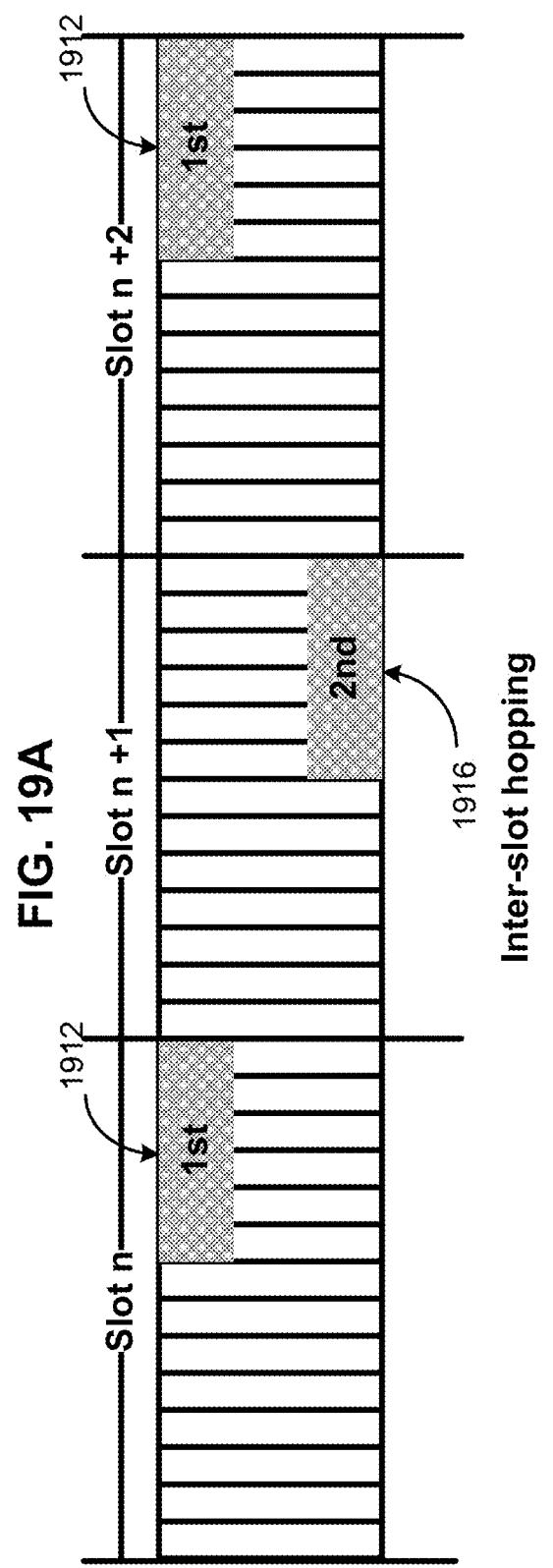
FIG. 19A
FIG. 19B

```
PUCCH-Resource ::=          SEQUENCE {
    pucch-ResourceId            PUCCH-ResourceId,
    startingPRB                 PRB-Id,
    intraSlotFrequencyHopping   ENUMERATED { enabled }
    secondHopPRB                PRB-Id
    format                  CHOICE {
        format0                 PUCCH-format0,
        format1                 PUCCH-format1,
        format2                 PUCCH-format2,
        format3                 PUCCH-format3,
        format4                 PUCCH-format4
    }
}

PUCCH-format0 ::=           SEQUENCE {
    initialCyclicShift          INTEGER(0..11),
    nrofSymbols                 INTEGER (1..2),
    startingSymbolIndex         INTEGER(0..13)
}
```

FIG. 20

| PUCCH length | DM-RS position *l* within PUCCH span ||||
| | No additional DM-RS ||  Additional DM-RS ||
| | No hopping | Hopping | No hopping | Hopping |
| 4 | 1 | 0, 2 | - | - |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

FIG. 21

| $l_d$ in symbols | DM-RS positions $\bar{l}$ ||||||||
|---|---|---|---|---|---|---|---|---|
| | PUSCH mapping type A |||| PUSCH mapping type B ||||
| | dmrs-AdditionalPosition |||| dmrs-AdditionalPosition ||||
| | 0 | 1 | 2 | 3 | 0 | 1 | 2 | 3 |
| <4 | - | - | - | - | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0,4$ | $l_0,4$ | $l_0,4$ |
| 6 | $l_0$ | $l_0$ | $l_0$ | $l_0$ | $l_0$ | $l_0,4$ | $l_0,4$ | $l_0,4$ |
| 7 | $l_0$ | $l_0$ | $l_0$ | $l_0$ | $l_0$ | $l_0,4$ | $l_0,4$ | $l_0,4$ |
| 8 | $l_0$ | $l_0,7$ | $l_0,7$ | $l_0,7$ | $l_0$ | $l_0,6$ | $l_0,3,6$ | $l_0,3,6$ |
| 9 | $l_0$ | $l_0,7$ | $l_0,7$ | $l_0,7$ | $l_0$ | $l_0,6$ | $l_0,3,6$ | $l_0,3,6$ |
| 10 | $l_0$ | $l_0,9$ | $l_0,6,9$ | $l_0,6,9$ | $l_0$ | $l_0,8$ | $l_0,4,8$ | $l_0,3,6,9$ |
| 11 | $l_0$ | $l_0,9$ | $l_0,6,9$ | $l_0,6,9$ | $l_0$ | $l_0,8$ | $l_0,4,8$ | $l_0,3,6,9$ |
| 12 | $l_0$ | $l_0,9$ | $l_0,6,9$ | $l_0,5,8,11$ | $l_0$ | $l_0,10$ | $l_0,5,10$ | $l_0,3,6,9$ |
| 13 | $l_0$ | $l_0,11$ | $l_0,7,11$ | $l_0,5,8,11$ | $l_0$ | $l_0,10$ | $l_0,5,10$ | $l_0,3,6,9$ |
| 14 | $l_0$ | $l_0,11$ | $l_0,7,11$ | $l_0,5,8,11$ | $l_0$ | $l_0,10$ | $l_0,5,10$ | $l_0,3,6,9$ |

FIG. 22

| Duration per hop | DM-RS positions $\bar{l}$ | | | | | | | | | | | |
|---|---|---|---|---|---|---|---|---|---|---|---|---|
| | PUSCH mapping type A | | | | | | | | PUSCH mapping type B | | | |
| | $l_0=2$ | | | | $l_0=3$ | | | | $l_0=0$ | | | |
| | dmrs-AdditionalPosition | | | | dmrs-AdditionalPosition | | | | dmrs-AdditionalPosition | | | |
| | 0 | | 1 | | 0 | | 1 | | 0 | | 1 | |
| | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop |
| ≤3 | - | - | - | - | - | - | - | - | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0,4 | 3 | 0 | 3 | 0,4 | 0 | 0 | 0 | 0 |
| 7 | 2 | 0 | 2,6 | 0,4 | 3 | 0 | 3 | 0,4 | 0 | 0 | 0,4 | 0,4 |

FIG. 23

```
PUCCH-Resource ::=          SEQUENCE {
    pucch-ResourceId            PUCCH-ResourceId,
    startingPRB                 PRB-Id,
    intraSlotFrequencyHopping   ENUMERATED { enabled }
    secondHopPRB                PRB-Id
    format                      CHOICE {
        format0                     PUCCH-format0,
        format1                     PUCCH-format1,
        format2                     PUCCH-format2,
        format3                     PUCCH-format3,
        format4                     PUCCH-format4
    }
    CUL-startingPRB              PRB-Id,
    CUL-intraSlotFrequencyHopping ENUMERATED { enabled }
    CUL-secondHopPRB             PRB-Id
    CUL-format                   CHOICE {
        CUL-format0                  PUCCH-format0,
        CUL-format1                  PUCCH-format1,
        CUL-format2                  PUCCH-format2,
        CUL-format3                  PUCCH-format3,
        CUL-format4                  PUCCH-format4
    }
}
```

FIG. 26

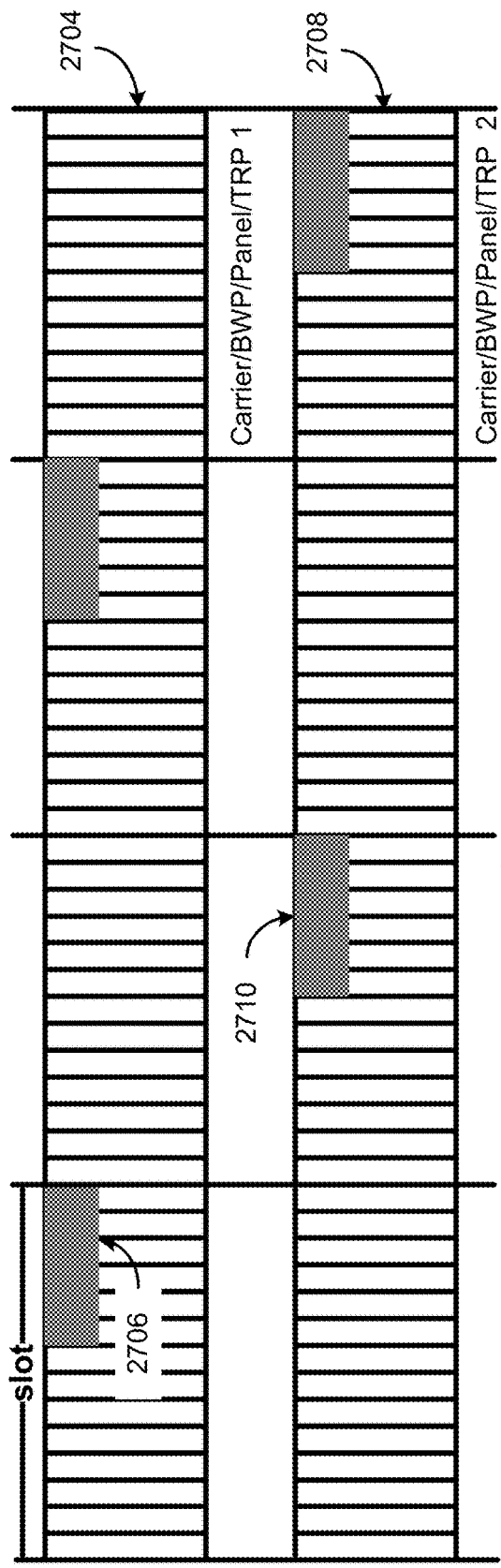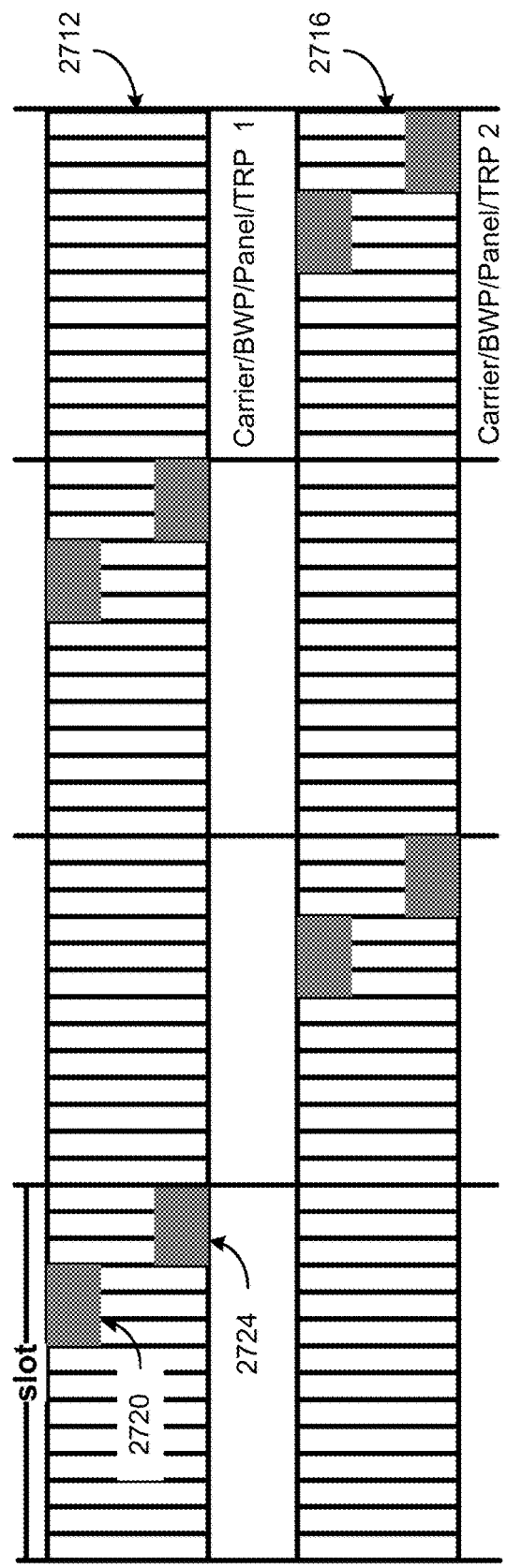

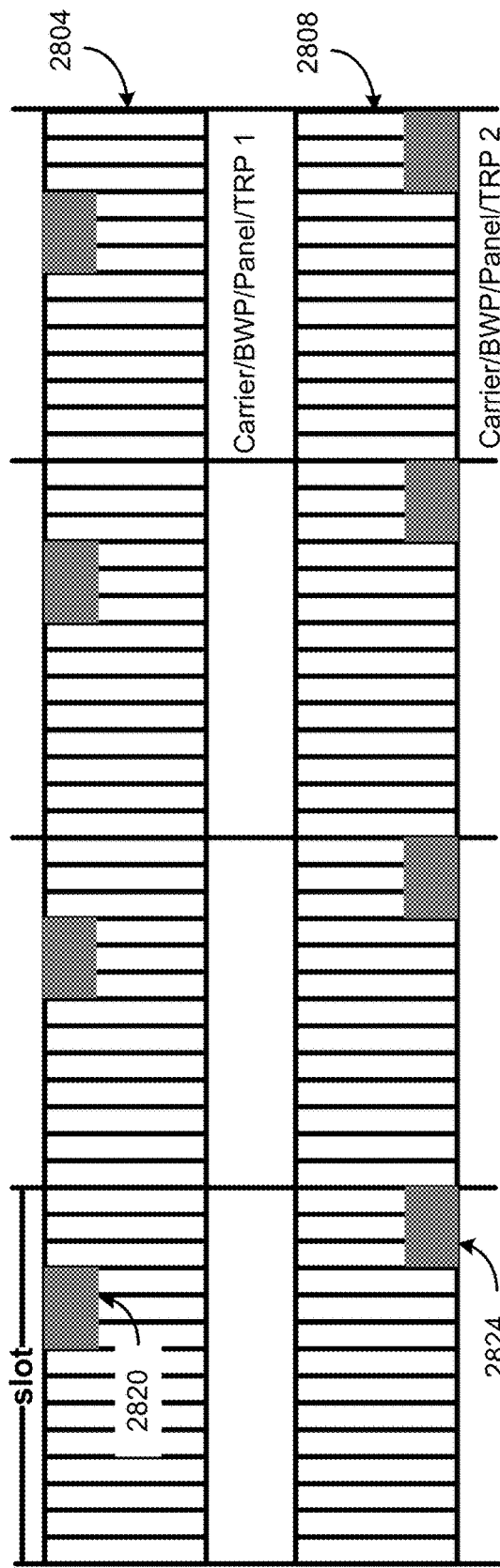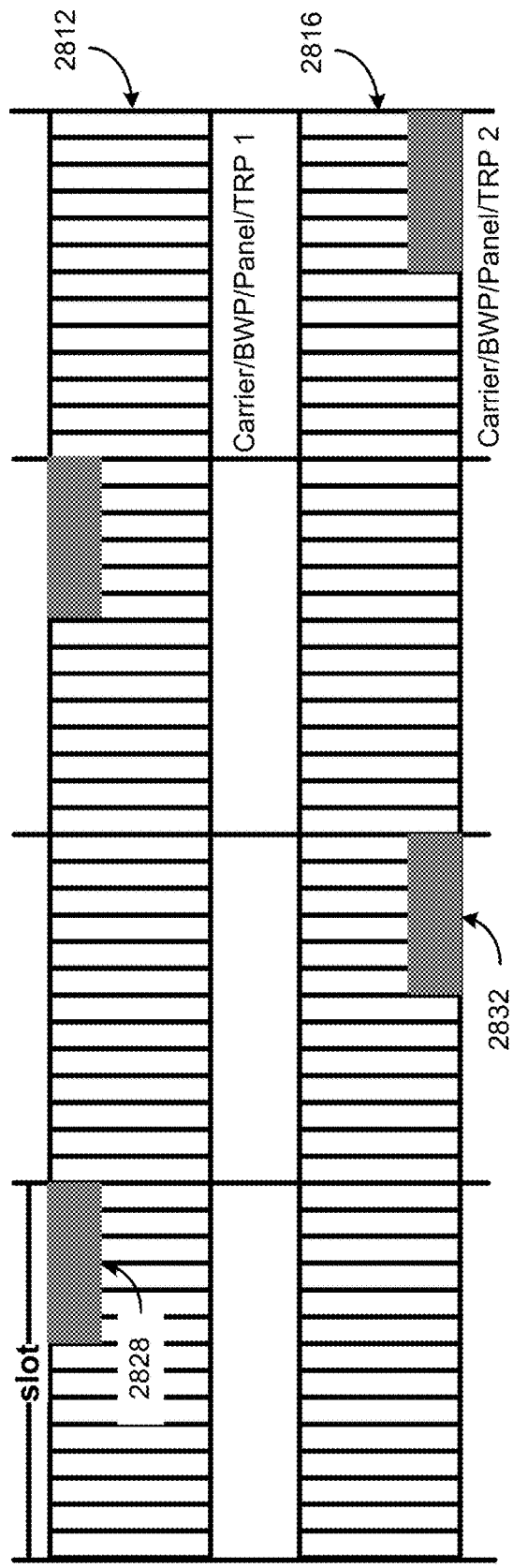

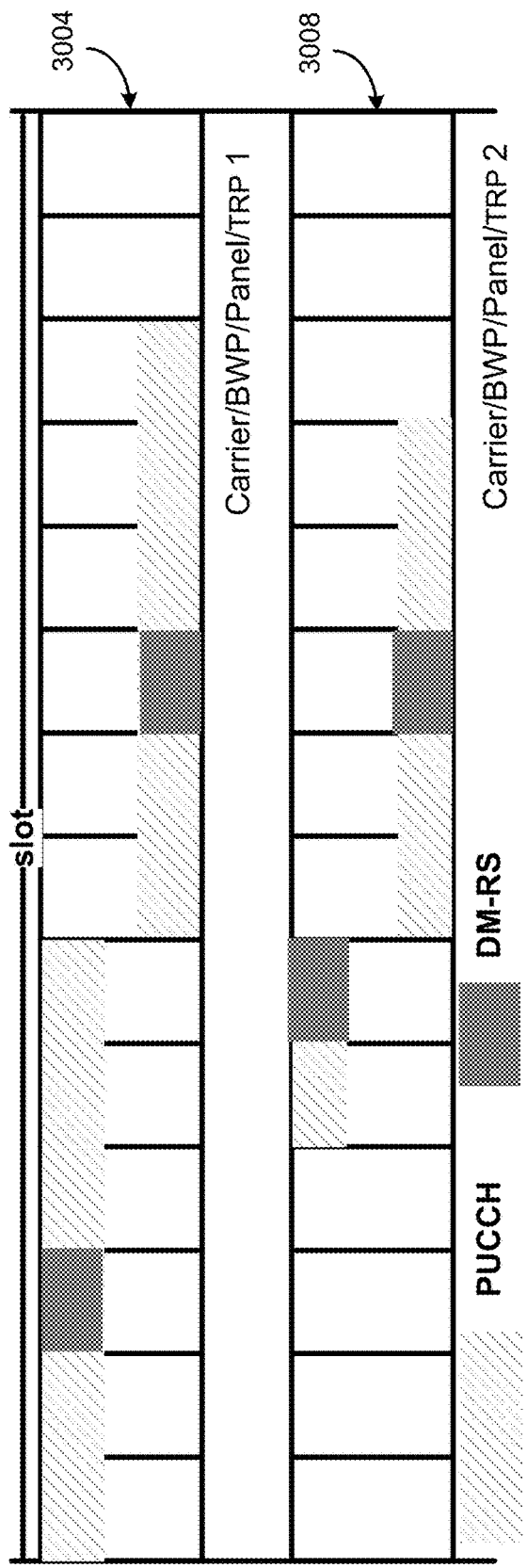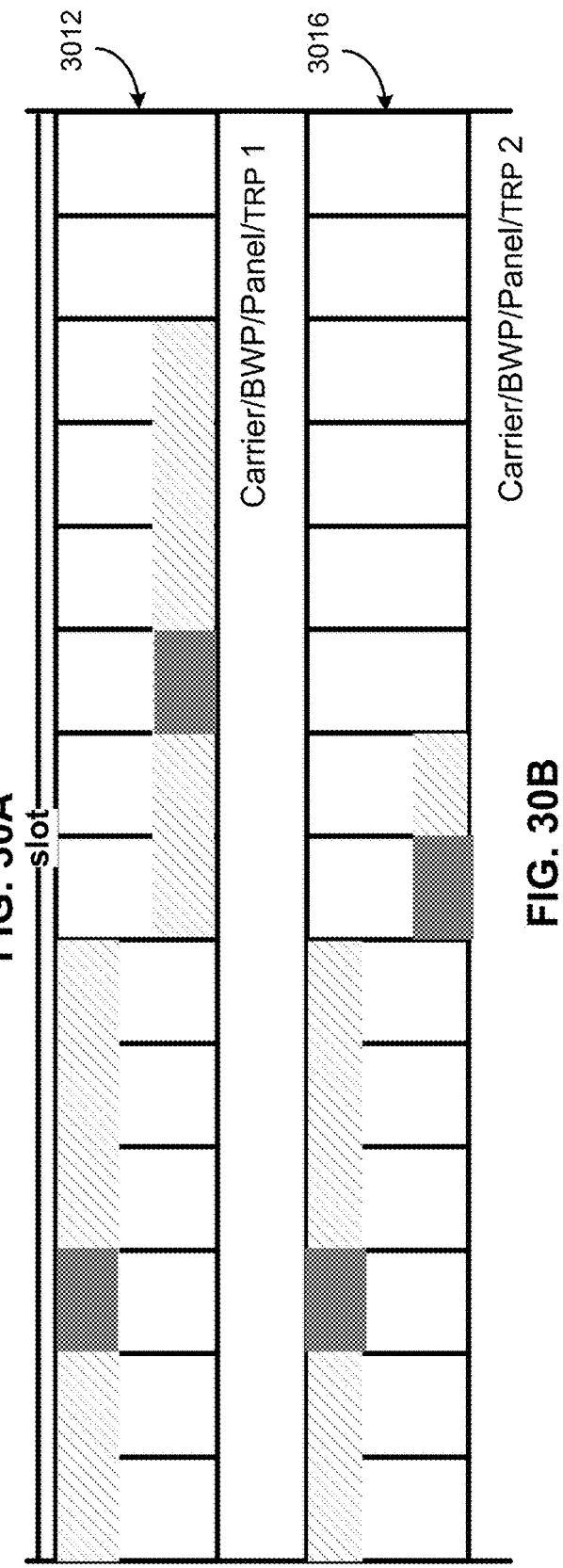
FIG. 30A
FIG. 30B

TRANSMISSION USING A PLURALITY OF WIRELESS RESOURCES

CROSS-REFERENCE TO RELATED APPLICATIONS

This application claims the benefit of U.S. Provisional Application No. 63/026,457, filed on May 18, 2020. The above-referenced application is hereby incorporated by reference in its entirety.

BACKGROUND

A base station sends a downlink message to a wireless device. The wireless device sends an uplink message to the base station based on receiving the downlink message.

SUMMARY

The following summary presents a simplified summary of certain features. The summary is not an extensive overview and is not intended to identify key or critical elements.

A base station and/or a wireless device may send one or more messages to the other. Communication via a wireless network may use a plurality of wireless resources (e.g., carriers, beams, bandwidth parts, antenna panels, transmission and reception points, cells, etc.). Multiple carrier transmission may be used in which a message (e.g., repetitions of a message or portions thereof) may be sent via different wireless resources and/or via different time/frequency resources within a wireless resource (e.g., using frequency hopping). Multiple carrier transmission may be independently configured for each of a plurality of wireless resources which may provide advantages such as improved reliability and decreased latency.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 4A shows an example downlink data flow for a user plane configuration.

FIG. 4B shows an example format of a Medium Access Control (MAC) subheader in a MAC Protocol Data Unit (PDU).

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 19A shows an example of intra-slot frequency hopping.

FIG. 19B shows an example of inter-slot frequency hopping.

FIG. 20 shows an example of configuration parameters of a physical uplink control channel (PUCCH) resource.

FIG. 21 shows an example table indicating positions of demodulation reference signal (DMRS) symbols and PUCCH length.

FIG. 22 shows an example table indicating DMRS positions for a physical uplink shared channel (PUSCH).

FIG. 23 shows an example table indicating DMRS positions for a PUSCH.

FIG. 26 shows example configuration parameters of a PUCCH resource.

FIG. 27A shows an example of transmission via multiple carriers.

FIG. 27B shows an example of transmission via multiple carriers.

FIG. 28A shows an example of transmission using intra-slot hopping and inter-carrier hopping.

FIG. 28B shows an example transmission using inter-slot hopping and inter-carrier hopping.

FIG. 30A shows an example of intra-slot hopping via multiple carriers.

FIG. 30B shows an example of intra-slot hopping via multiple carriers.

DETAILED DESCRIPTION

Figure 2A:
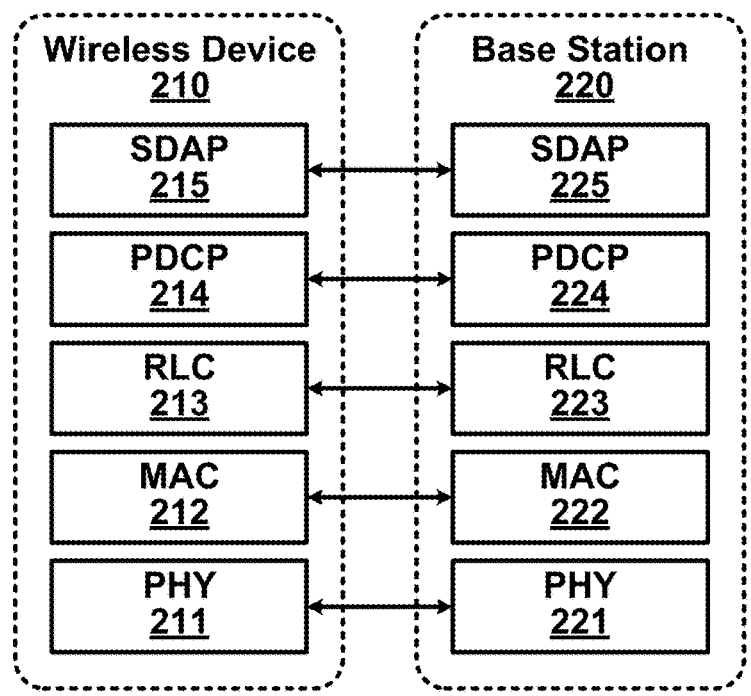
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to communication via multiple carriers using a plurality of wireless resources.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
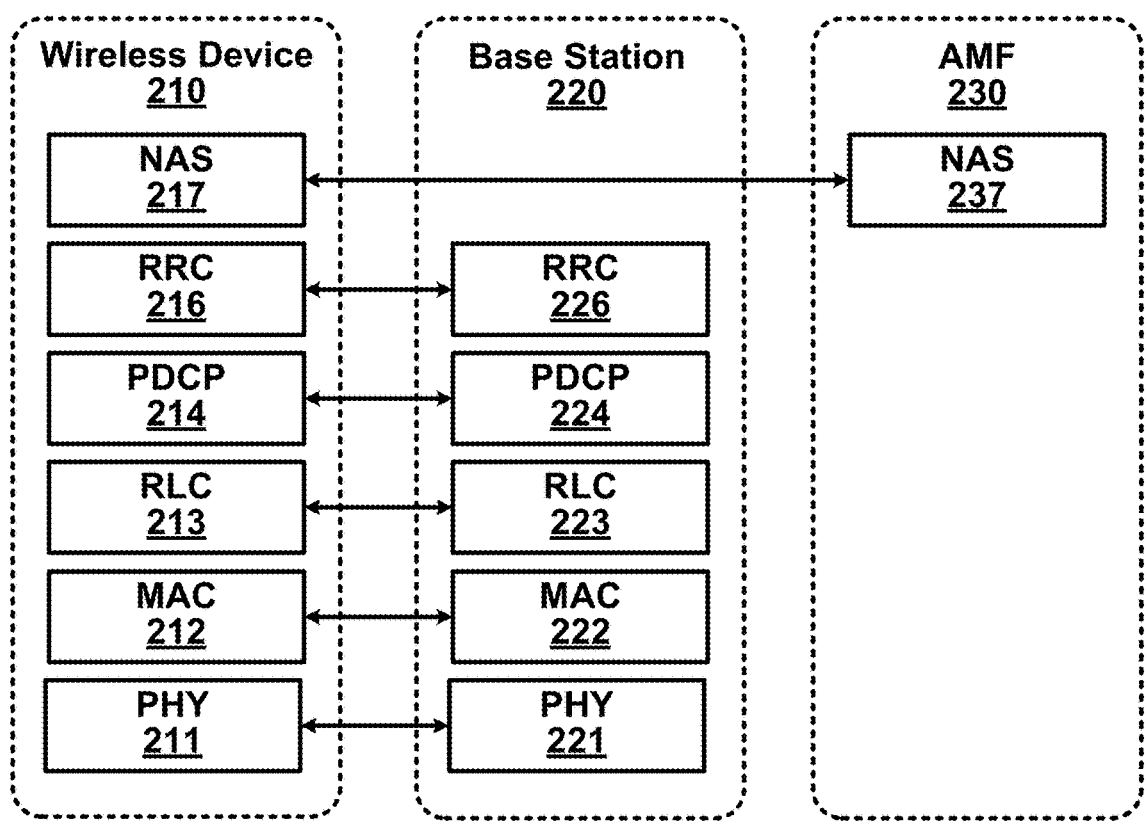
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack.

One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
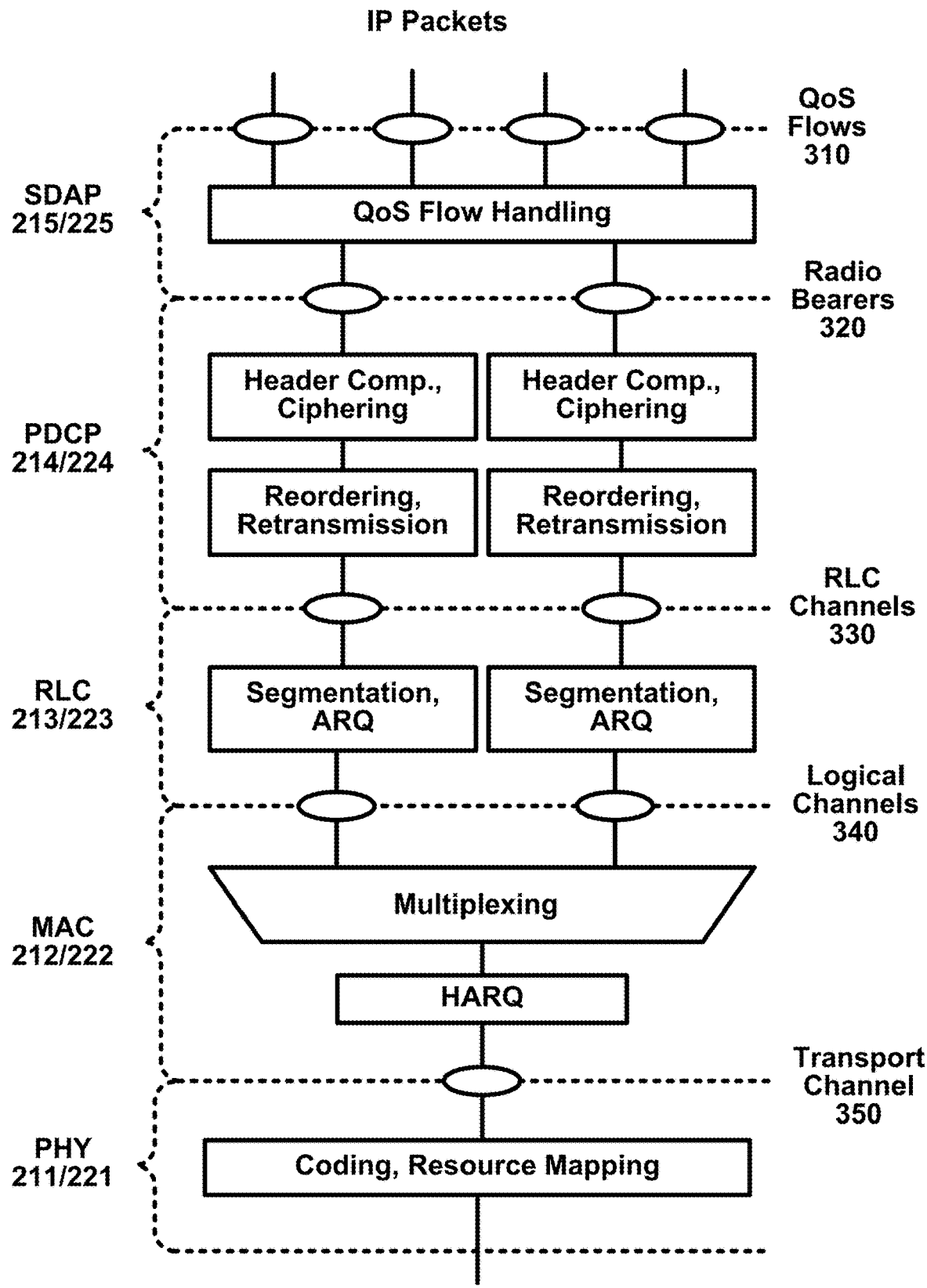
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively). Various operations described herein with reference to communication devices (e.g., base stations, wireless devices, etc.) may be performed by one or more entities in the communication device (e.g., a PHY layer entity, a MAC layer entity, and/or one or more other entities corresponding to any other layer in the communication device).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol laters may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
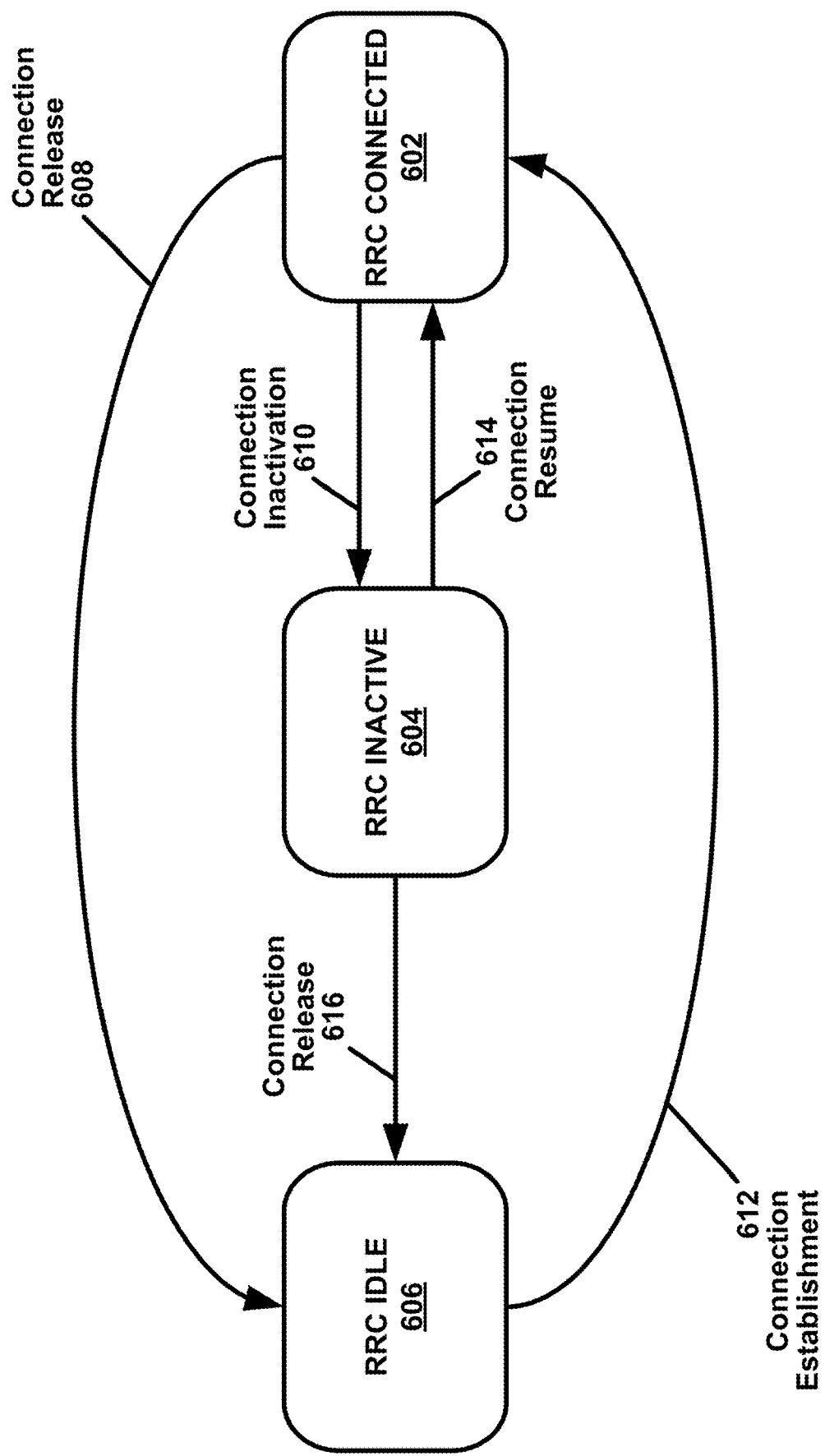
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
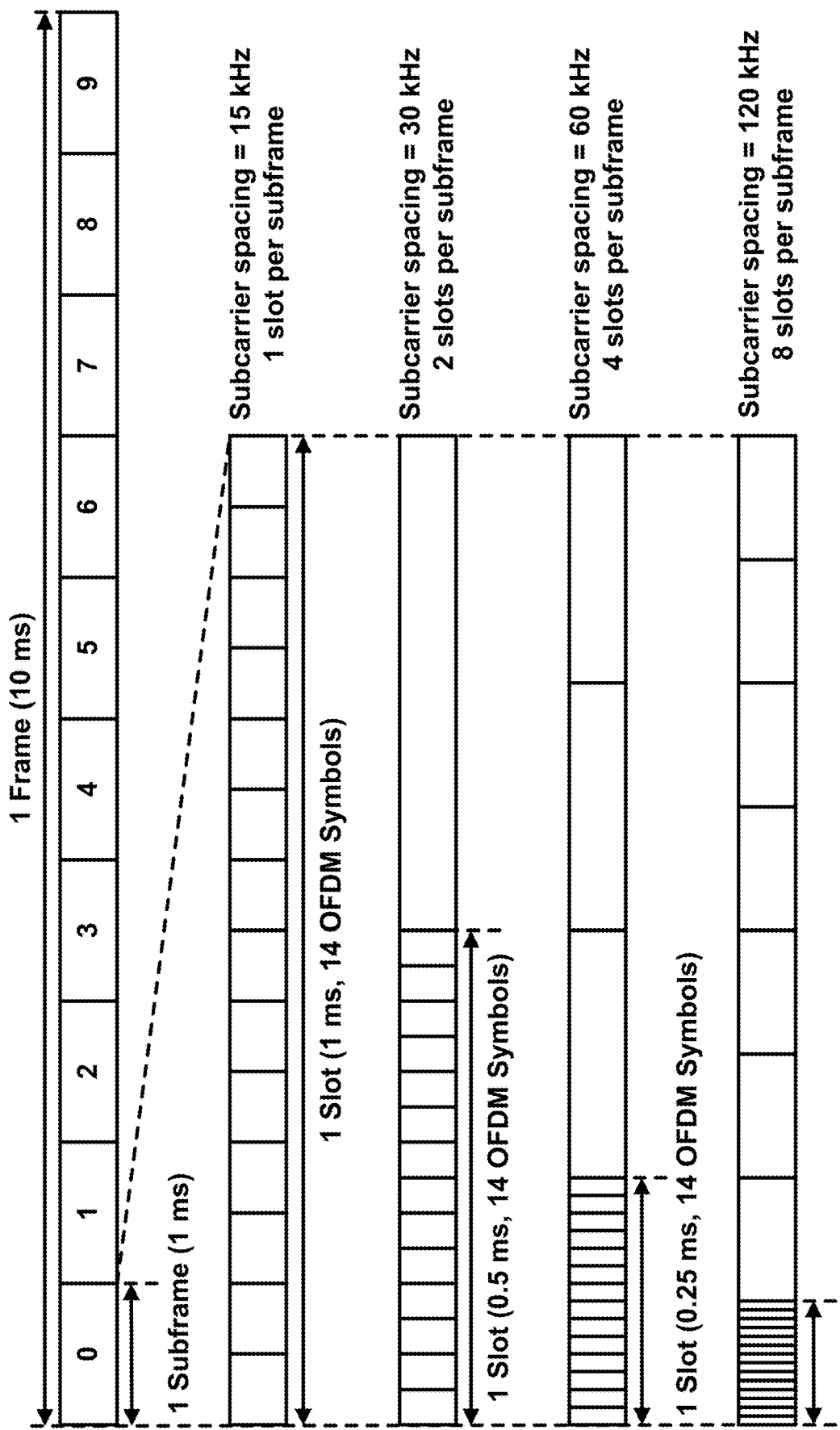
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
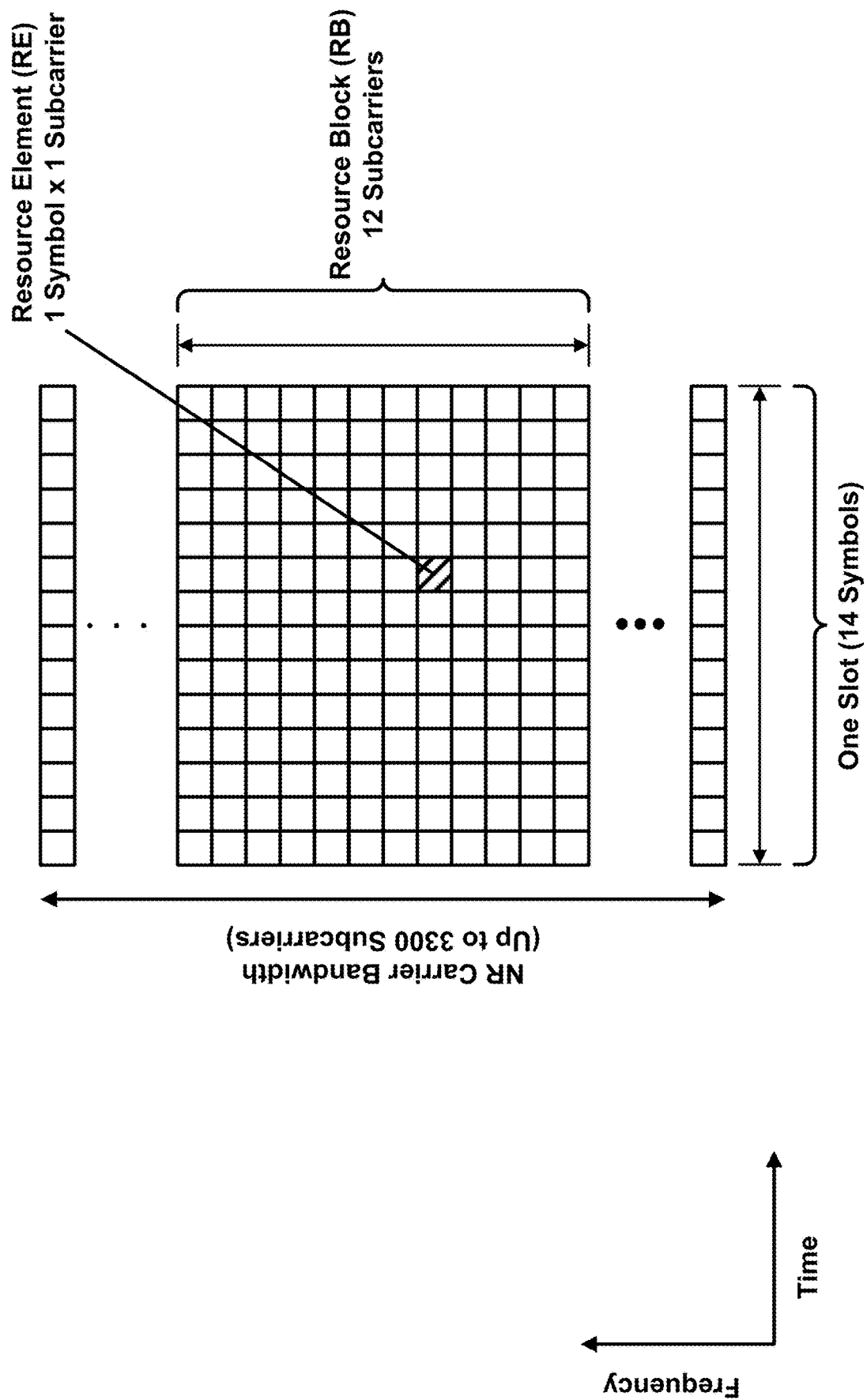
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
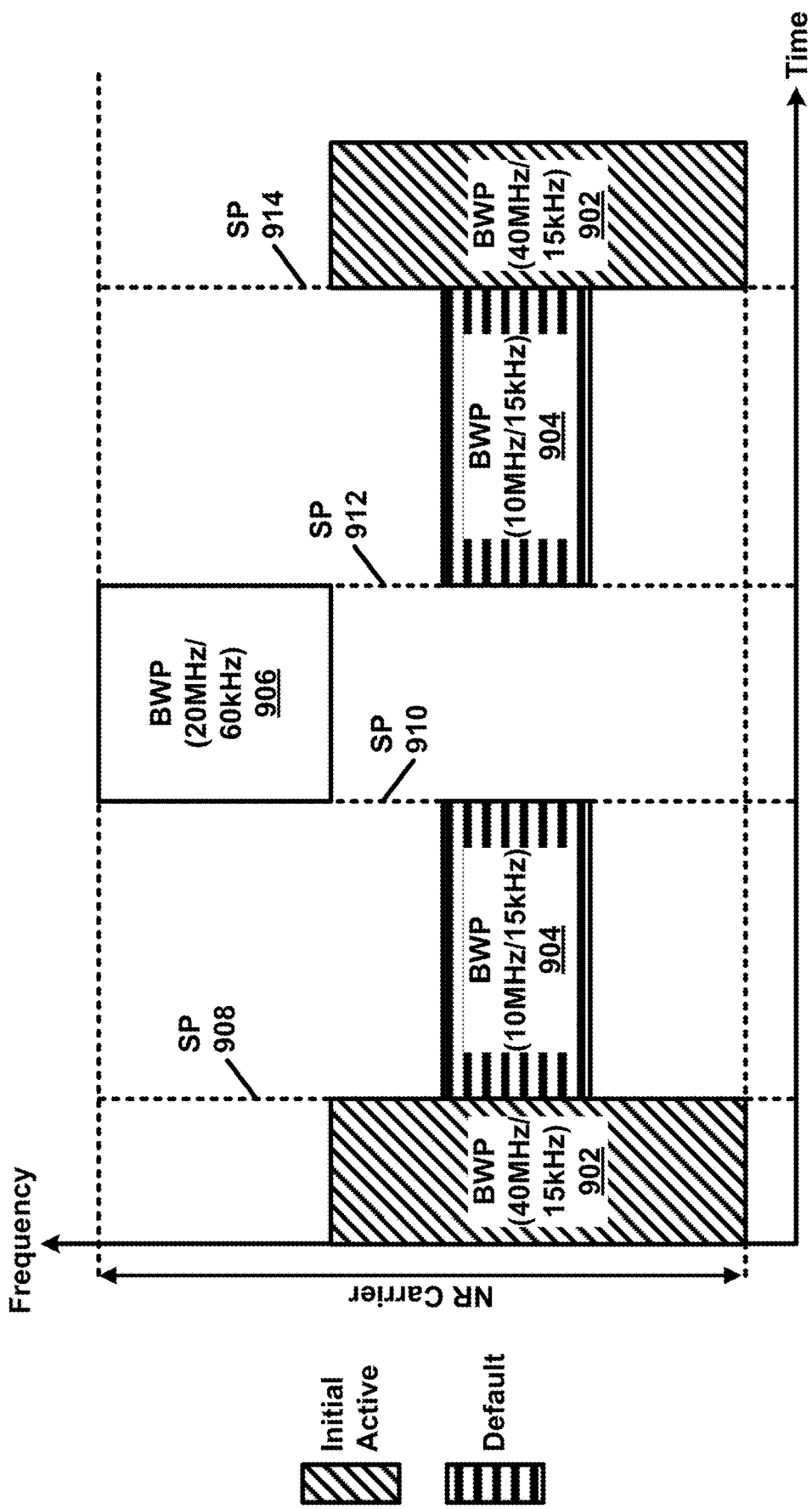
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
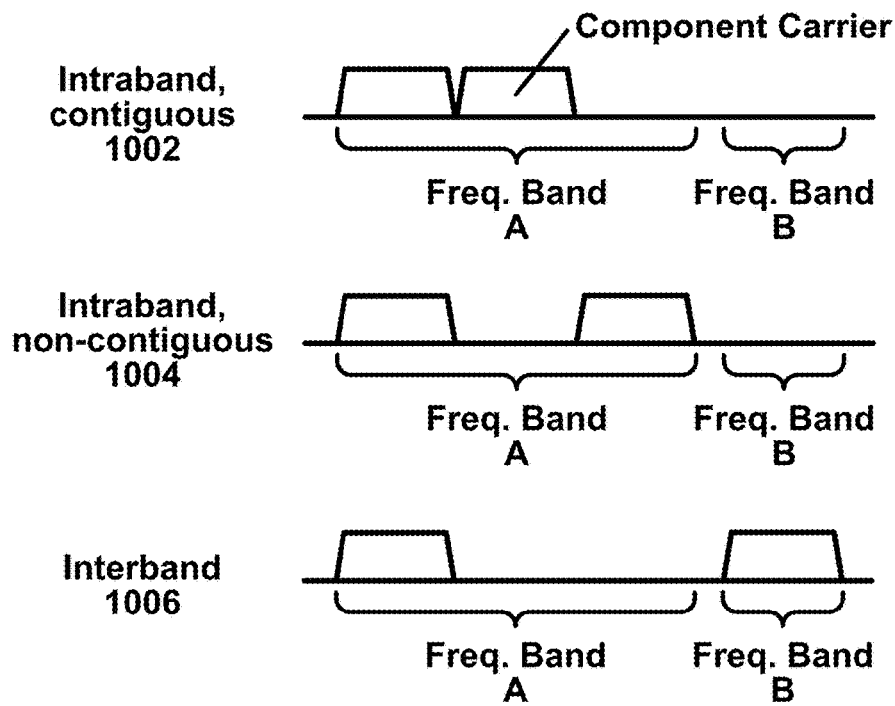
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
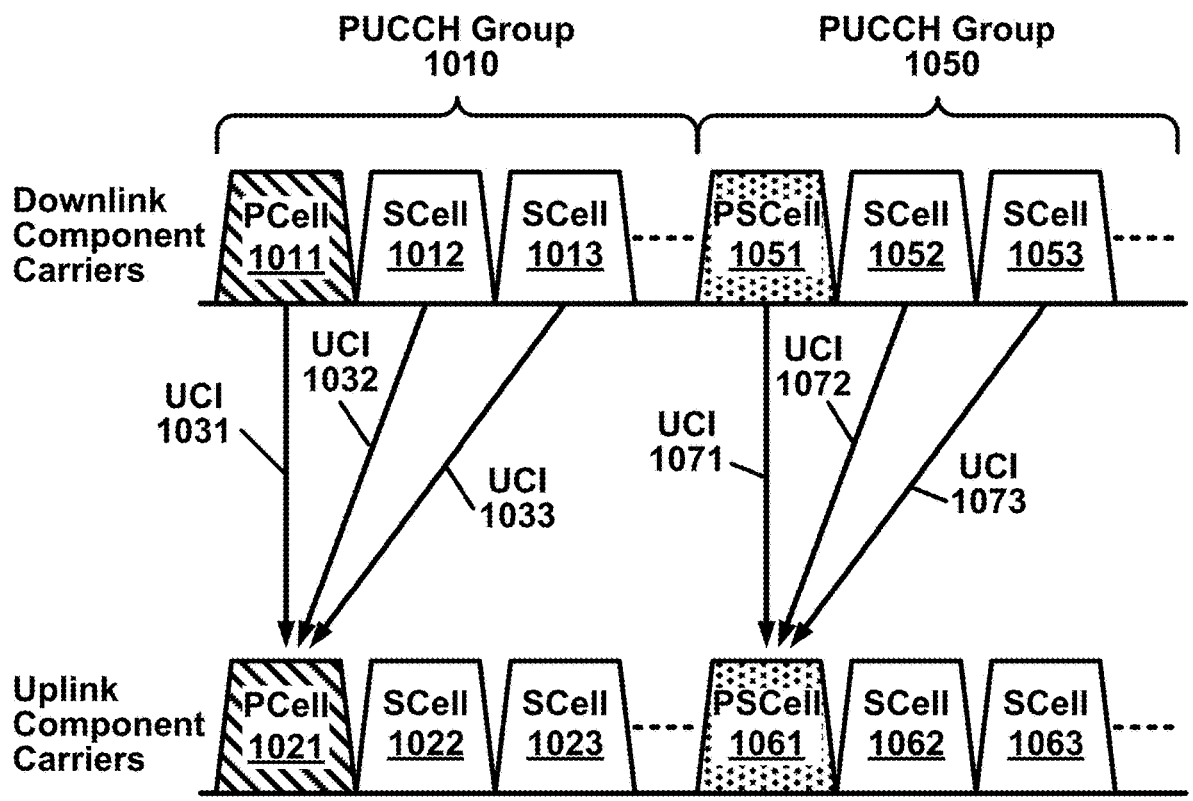
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
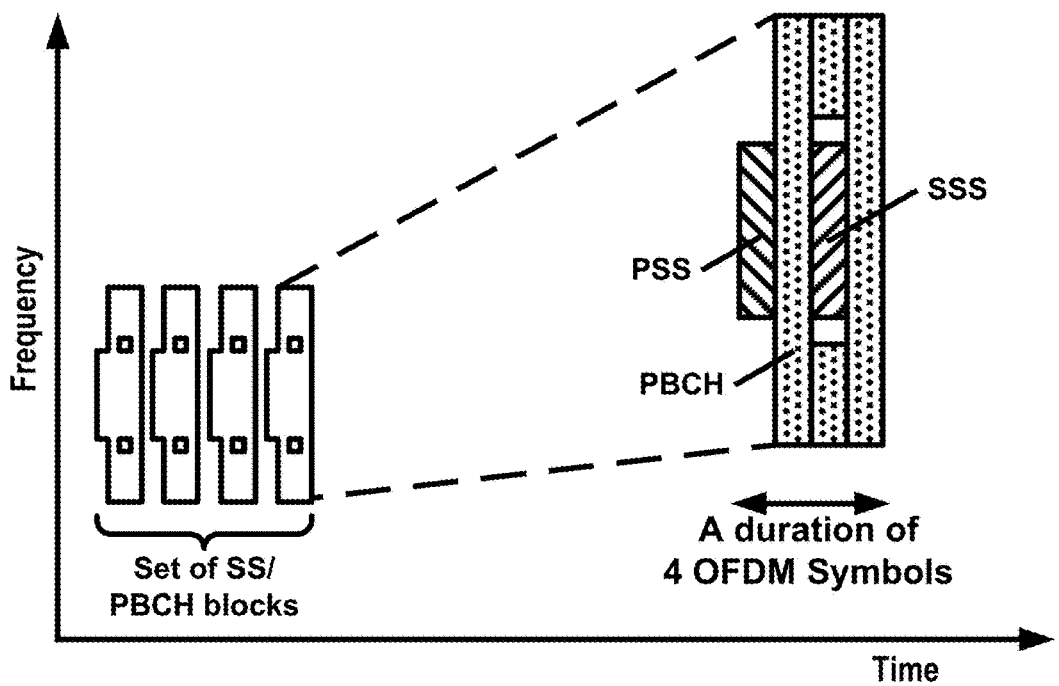
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
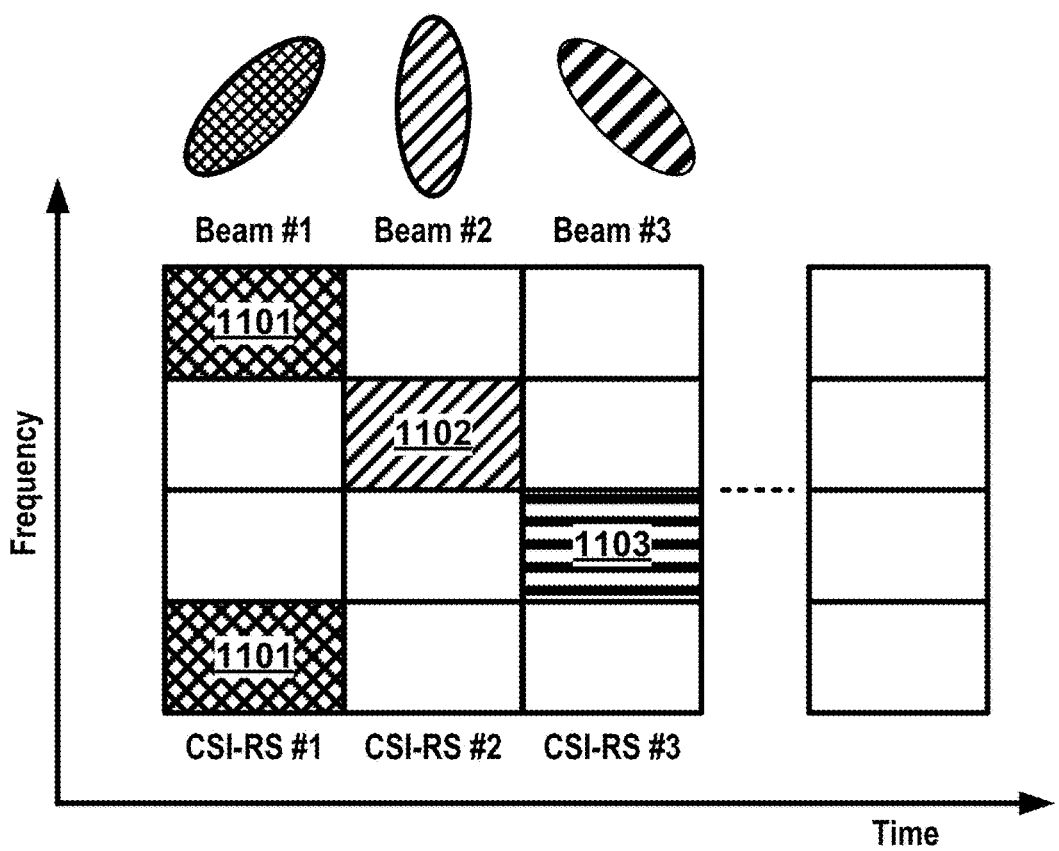
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device.

The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). Fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
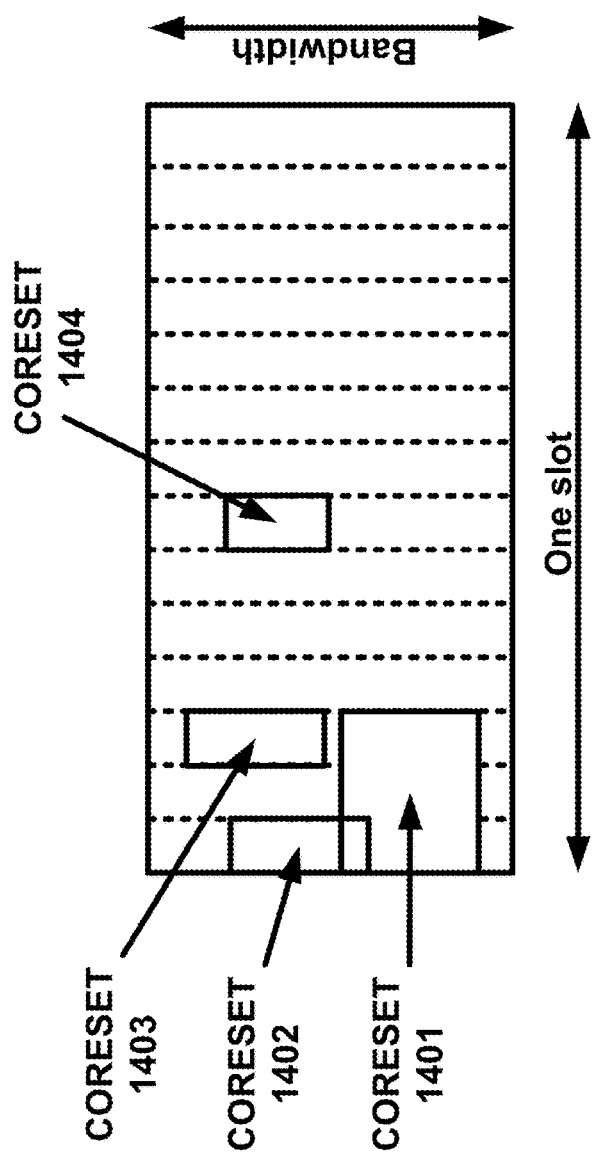
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
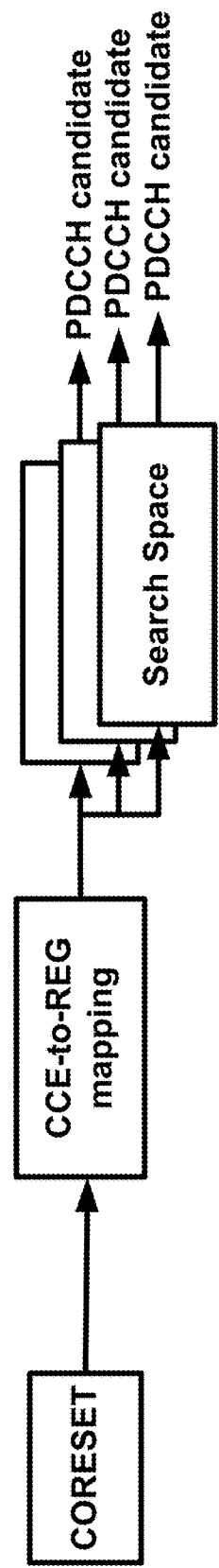
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit)

PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
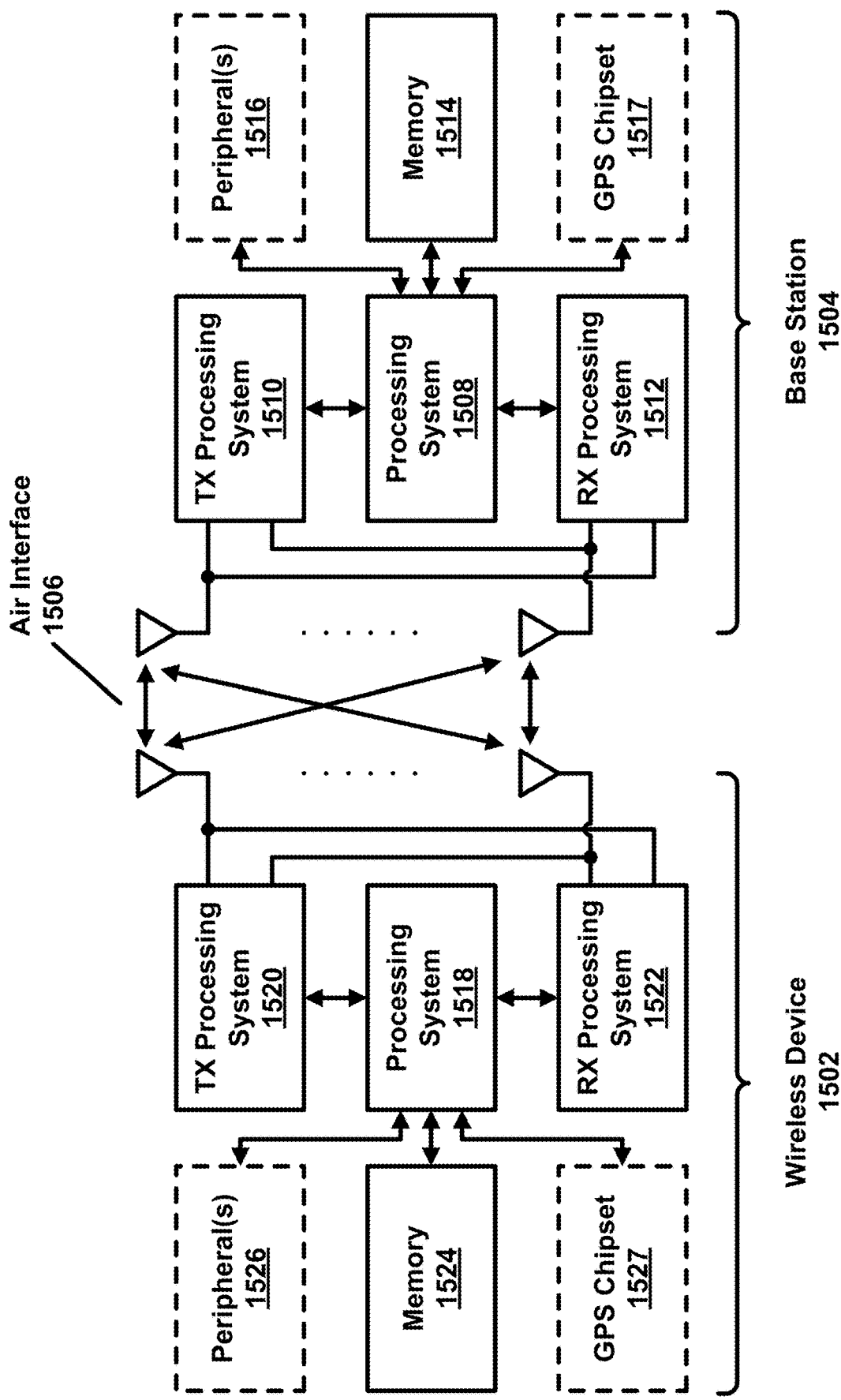
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
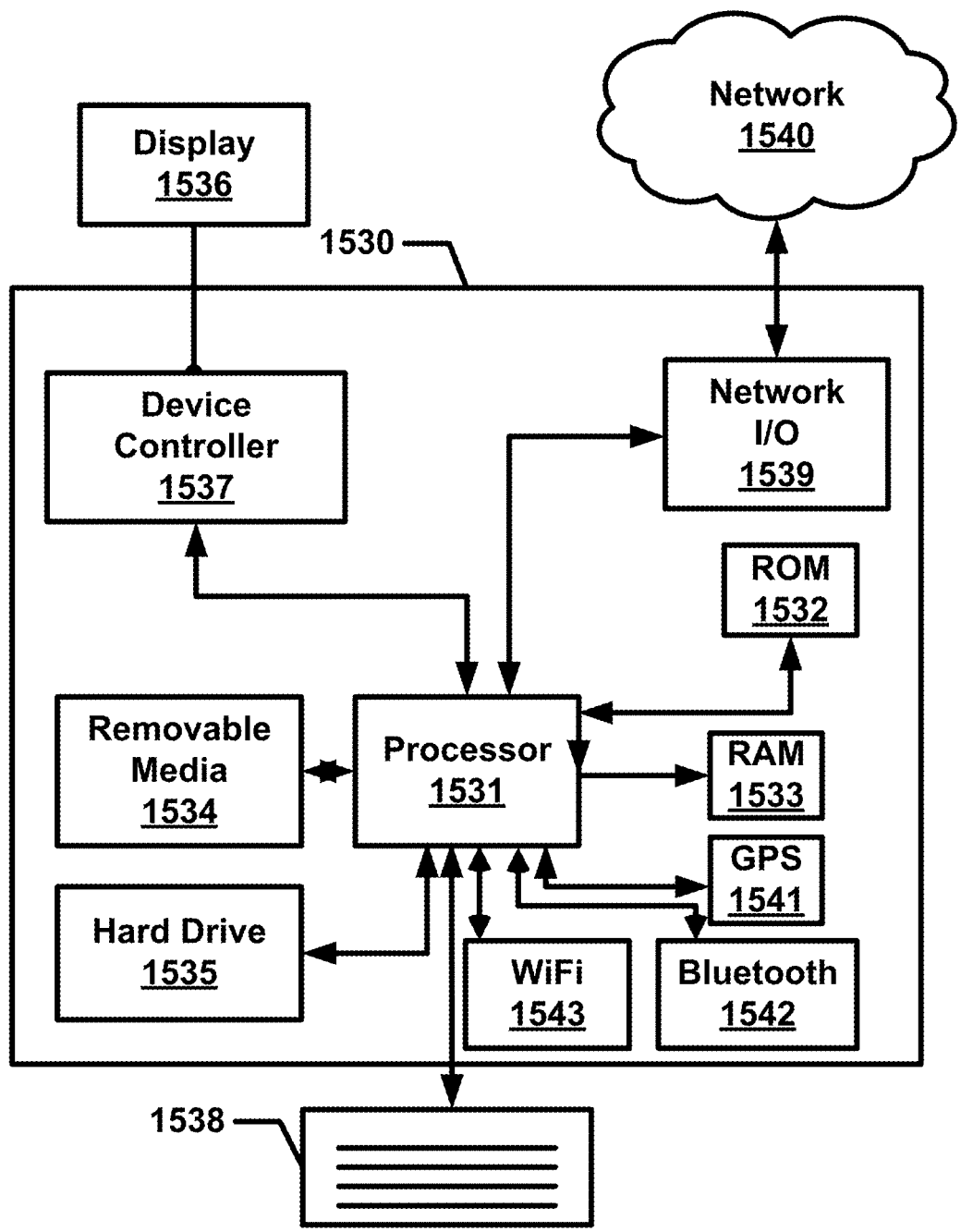
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station and a wireless device may use one or more (e.g., a plurality of) DCI formats. The DCI format(s) may be used to schedule downlink data, uplink data, and/or to deliver control information. For example, a DCI format (e.g. DCI format 0_0) may be used to schedule an uplink resource for a PUSCH transmission via a cell. A DCI format (e.g., DCI format 0_1) may be used to schedule one or more PUSCH transmissions via one cell or may be used to indicate downlink feedback information for configured grant PUSCH transmission (e.g., configured grant downlink feedback information (CG-DFI)). A DCI format (e.g., DCI format 0_2) may be used to schedule a resource for a PUSCH transmission via one cell. One or more DCI formats may be used for scheduling downlink transmissions. For example, a DCI format (e.g., DCI format 1_0) may schedule a resource for a PDSCH transmission via one cell. A DCI format (e.g., DCI format 1_1) may be used to schedule a PDSCH transmission via one cell or trigger a one shot HARQ-ACK feedback signal. A DCI format (e.g., DCI format 1_2) may be used to schedule a resource for a PDSCH transmission via one cell. One or more DCI formats may be used for signaling non-scheduling information. For example, a DCI format (e.g., DCI format 2_0) may be used to indicate slot formation information for one or more slots of one or more cells. A DCI format (e.g., DCI format 2_2) may be used to indicate one or more transmit power control commands for PUCCH and PUSCH. A DCI format (e.g., DCI format 2_3) may be used to indicate one or more transmit power control commands for SRS. A DCI format (e.g., DCI format 2_4) may be used to indicate uplink cancellation information. A DCI format (e.g., DCI format 2_5) may be used to indicate preemption information. A DCI format (e.g., a DCI format 2_6) may be used to indicate a power saving state outside of DRX active time. A DCI format (e.g., DCI format 3_0 or DCI format 3_1) may be used to schedule sidelink resources (e.g., NR sidelink resource and/or LTE sidelink resource) in one cell.

A DCI format may comprise one or more DCI fields. A DCI field (e.g., each DCI field) may be associated with a corresponding DCI size. A wireless device may determine DCI sizes of DCI fields based on one or more RRC configuration parameters (e.g., as sent by a base station). The one or more RRC configuration parameters may be sent/transmitted via a MIB, SIBs, or one or more wireless device-specific messages (e.g., wireless device-specific RRC messages). The wireless device may determine one or more DCI sizes of one or more DCI fields (e.g., in DCI corresponding to a DCI format 0_0) based on the one or more RRC configuration parameters (e.g., transmitted via the MIB and/or the SIBs). The wireless device may determine the one or more DCI sizes of the one or more DCI fields (e.g., in DCI corresponding to a DCI format 0_0) without receiving any wireless device-specific message. The wireless device may determine one or more DCI sizes of one or more second DCI fields (e.g., in DCI corresponding to a DCI format 1_0) based on the one or more RRC configuration parameters (e.g., transmitted via the MIB and/or the SIBs). One or more DCI formats (e.g., the DCI format 0_0 and/or the DCI format 1_0) may correspond to fallback DCI formats for scheduling uplink data and downlink data, respectively. The wireless device may determine one or more DCI fields of the fallback DCI based on configuration parameters (e.g., sent via MIB and/or SIBs).

Figure 17:
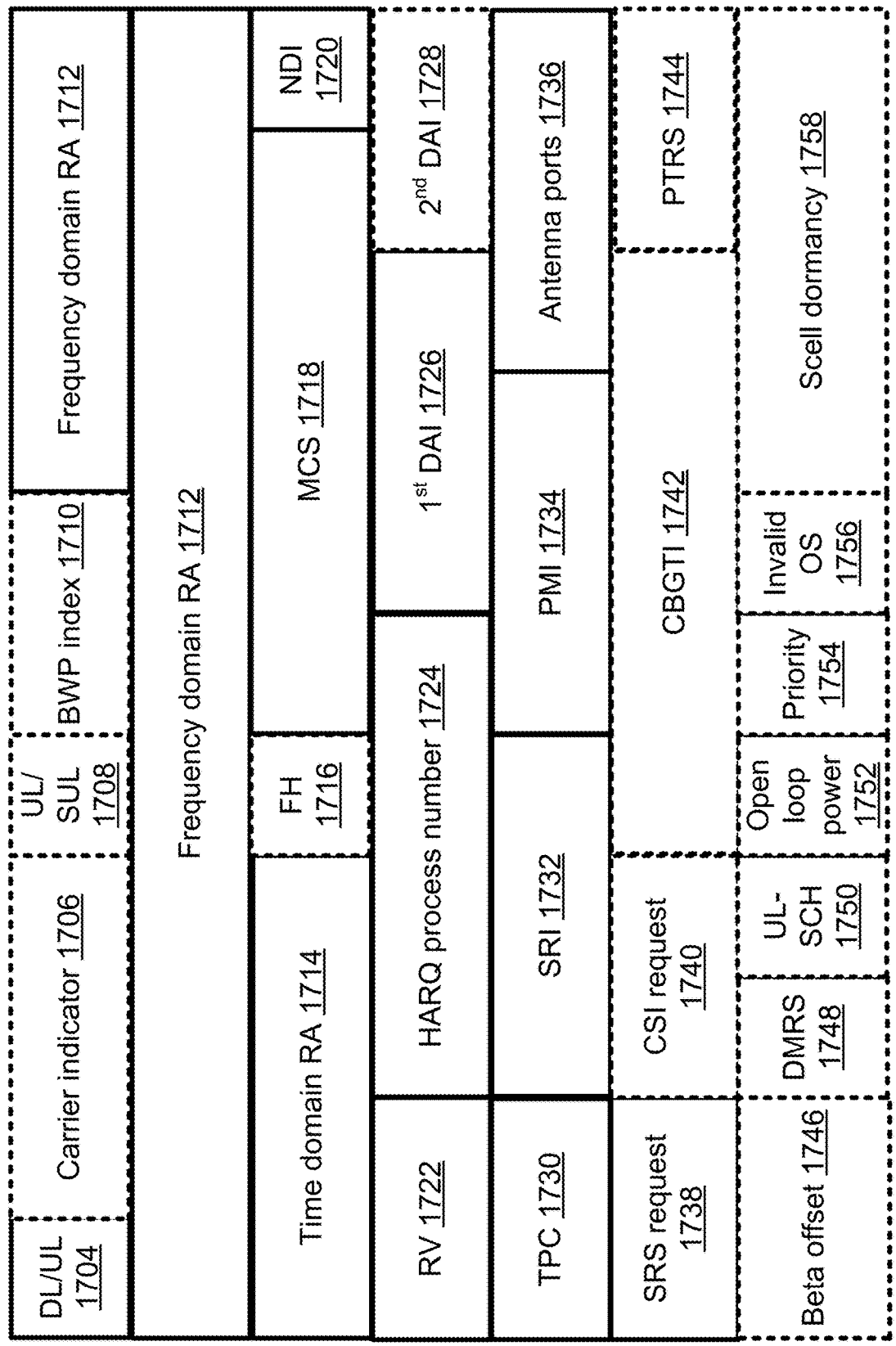
FIG. 17 shows an example DCI format.

FIG. 17 shows an example DCI format. The example DCI format may correspond to DCI format 0_1 (or any other DCI format). The example DCI format may be used for uplink resource allocation (e.g., PUSCH resource allocation). The wireless device may determine one or more first DCI sizes of one or more first DCI fields of the DCI format 0_1. The wireless device may determine the one or more first DCI sizes, for example, based on one or more RRC configuration parameters. The one or more RRC configuration parameters may be send/transmitted via a MIB, SIBs, and/or the wireless device-specific RRC message(s). The wireless device may determine a DCI size (e.g., each DCI size) of the one or more first DCI fields based on the one or more RRC configuration parameters. The DCI format may comprise one or more second DCI fields (e.g., regardless of the wireless device-specific RRC message(s)). For example, the DCI format may comprise a 1-bit (or any other quantity of bits) DL/UL indicator field 1704. The DL/UL indicator field 1704 may be set to a first value (e.g., zero) to indicate that the DCI corresponds to an uplink grant (e.g., DCI format 0_1). DCI field(s) shown in dotted boxes may or may not be present. A size of the DCI field(s) shown in dotted boxes may be configured as zero, for example, if the DCI field(s) are not present. For example, a carrier indicator field 1706 may be present if the DCI format 0_1 is used to schedule a cell based on cross-carrier scheduling. The carrier indicator field 1706 may indicate a cell indicator/index of a scheduled cell by the cross-carrier scheduling. The UL/SUL indicator field 1708 may indicate whether DCI schedules a resource for an uplink carrier or a supplemental uplink. The UL/SUL indicator field 1708 may be present, for example, if the wireless device is configured with a supplemental uplink for a scheduled cell of the DCI. The UL/SUL indicator field 1708 may not be present, for example, if the wireless device is not configured with a supplemental uplink for a scheduled cell of the DCI.

A BWP indicator/index field 1710 may indicate a BWP. The base station may configure one or more uplink BWPs for the scheduled cell. The wireless device may determine a bit size of the BWP indicator/index field 1710, for example, based on a quantity of the one or more uplink BWPs. The bit size of the BWP indicator/index field 1710 may be one bit, for example, if the quantity of the one or more uplink BWPs (excluding an initial UL BWP) is two. The BWP indicator/index field 1710 may be used to indicate an uplink BWP switching. The wireless device may switch to a first BWP, for example, based on receiving DCI comprising an indicator/index of the first BWP that is different from an active uplink BWP (e.g., a BWP that is active prior to the reception of the DCI).

A frequency domain resource allocation (frequency domain RA) field 1712 may indicate uplink resource(s) of the scheduled cell. The base station may configure a first resource allocation type (e.g., based on resource block (RBG), resource allocation type 0) or a second resource allocation type (e.g., based on resource indicator value (RIV), resource allocation type 1). The frequency domain RA field 1712 may indicate a bitmap corresponding to one or more RBGs for scheduling the uplink resource(s), for example, if resource allocation type 0 (e.g., the first resource allocation type) is configured. The frequency domain RA field 1712 may indicate a starting PRB indicator/index and a length of the scheduled uplink resource(s) (e.g., an RIV value that determines the starting PRB indicator/index and the length), for example, if resource allocation type 1 (e.g., the second resource allocation type) is configured. The frequency domain RA field 1712 may indicate a resource allocation type between the resource allocation type 0 and the resource allocation type 1, and either the bitmap or the RIV value based on the resource allocation type. The wireless device may determine a size of the frequency domain RA field 1712 based on the configured resource allocation type and a bandwidth of an active UL BWP of the scheduled cell. The bitmap may indicate each of the one or more RBGs covering the bandwidth of the active UL BWP, for example, if the resource allocation type 0 is configured. A size of the bitmap may be determined based on a quantity of the one or more RBGs of the active UL BWP. The wireless device may determine the size of the frequency domain RA field 1712 for resource allocation type 1, for example, based on the bandwidth of the active uplink BWP (e.g., ceil ($\log_2$(BW(BW+1)/2)), wherein BW is the bandwidth of the active uplink BWP). Ceil (x) may represent a smallest integer that is larger than or equal to x.

The wireless device may determine an RIV table. An entry in the table may comprise a starting PRB indicator/index and a length value. A dynamic change between the resource allocation type 0 and the resource allocation type 1 may occur. A larger of a first size based on the resource allocation type 0 (e.g., the bitmap size) and a second size based on the resource allocation type 1 (e.g., the RIV table size) with an additional one bit indication to indicate either the resource allocation type 0 or the resource allocation type 1 may be used if the dynamic change occurs. The frequency domain RA field 1712 may indicate a frequency hopping offset. The wireless device may determine a frequency location of a first hop based on the starting PRB indicator/index. The wireless device may determine a frequency location of a second hop based on the starting PRB indicator/index and the frequency hopping offset. The wireless device may transmit the first hop and the second hop as a single uplink transmission (e.g., a PUSCH transmission comprising a transport block, based on an uplink grant based on the DCI format of FIG. 17). The base station may use K bit(s) (e.g., 1 bit for two offset values, 2 bits for up to four offset values) to indicate the frequency hopping offset from one or more configured offset values, based on the resource allocation type 1. The base station may use a quantity of bits (e.g., ceil($\log_2$(BW(BW+1)/2)–K bits) to indicate the uplink resource(s) based on the resource allocation type 1, for example, if frequency hopping is enabled.

A time domain resource allocation field 1714 (time domain RA field) may indicate time domain resource of one or more slots of the scheduled cell. The base station may configure one or more time domain resource allocation lists of a time domain resource allocation table for an uplink BWP of the scheduled cell. The wireless device may determine a bit size of the time domain RA field 1714 based on a quantity of the one or more time domain resource allocation lists of the time domain resource allocation table. The base station may indicate frequency hopping using a FH flag 1716. The FH flag 1716 may present if the base station enables frequency hopping of the scheduled cell or the active UL BWP of the scheduled cell. An MCS field may indicate a coding rate and a modulation scheme for the scheduled uplink data. A new data indicator (NDI) field 1720 may indicate whether the DCI schedules the uplink resource(s) for a new/initial transmission or a retransmission of a previous transmission. A redundancy version (RV) field 1722 may indicate one or more RV values (e.g., an RV value may be 0, 2, 3, or 1) for one or more PUSCH transmissions scheduled via the one or more slots of the scheduled cells. A single RV value may be indicated, for example, if the DCI schedules a single PUSCH transmission via one slot. Two RV values may be indicated, for example, if the DCI schedules two PUSCH transmissions via two slots. A quantity of PUSCH transmissions scheduled by DCI may be indicated in a time domain resource allocation list of the one or more time domain resource allocation lists.

A HARQ process number field 1724 may indicate an indicator/index of a HARQ process used for the one or more PUSCH transmissions. The wireless device may determine one or more HARQ processes for the one or more PUSCH transmissions based on the index of the HARQ process. The wireless device may determine the index for a first HARQ process of a first PUSCH transmission of the one or more PUSCH transmissions and select a next index as a second HARQ process of a second PUSCH transmission of the one or more PUSCH transmissions, and so on. The DCI (e.g., corresponding to DCI format 0_1) may comprise a first downlink assignment indicator/index field 1726 and/or a second DAI field 1728. The first DAI field 1726 may be used to indicate a first size (e.g., a quantity of bits) of first HARQ-ACK codebook group. The second DAI field 1728 may be present if the base station may configure a plurality of HARQ-ACK codebook groups. The wireless device may assume the first HARQ-ACK codebook group only, for example, if there is no HARQ-ACK codebook group configured. The second DAI field 1728 may indicate a second size (e.g., a quantity of bits) of second HARQ-ACK codebook group. The first DAI field 1726 may be 1 bit (or any other first quantity of bits), for example, if a semi-static HARQ-ACK codebook generation mechanism is used. The first DAI field 1726 may be 2 bits or 4 bits (or any other second quantity of bits), for example, if a dynamic HARQ-ACK codebook generation mechanism is used.

A TPC field 1730 may indicate a power offset value to adjust transmission power of the one or more scheduled PUSCH transmissions. An SRS resource indicator (SRI) field 1732 may comprise an indicator/index of one or more configured SRS resources of an SRS resource set. A precoding information and number of layers field (PMI field 1734) may indicate precoding and MIMO layer information for the one or more scheduled PUSCH transmissions. An antenna ports field 1736 may indicate demodulation reference signal (DMRS) pattern(s) for the one or more scheduled PUSCH transmissions. An SRS request field 1738 may indicate to trigger an SRS transmission of an SRS resource or skipping of an SRS transmission. For example, the SRS request field 1738 may indicate that the wireless device may send an SRS transmission based on receiving the DCI. A CSI request field 1740 may indicate to trigger CSI feedback based on a CSI-RS configuration or skipping of CSI feedback. A code block group (CBG) transmission information (CBGTI) field 1742 may indicate HARQ-ACK feedback(s) for one or more CBGs. A phase tracking reference signal (PTRS)-DMRS association field (PTRS field 1744) may indicate an association between one or more ports of PTRS and one or more ports of DMRS. The one or more ports/layers of data may be indicated in the antenna ports field 1736. The wireless device may determine a precoding and/or a quantity of transmission layers based on the antenna ports field 1736 (e.g., a single layer with TMPI=1 if the antenna ports field indicates 1 with transform precoding being disabled). A beta offset field 1746 may indicate a code rate for transmission of UCI via a PUSCH transmission of the one or more scheduled PUSCH transmissions. DMRS sequence initialization field 1748 may be present based on a configuration of transform precoding. A UL-SCH field 1750 may indicate whether UCI (e.g., semi-persisitent CSI) or data (e.g., UL-SCH) may be transmitted via a PUSCH transmission of the one or more scheduled PUSCHs transmissions. An open loop power control parameter set field 1752 may indicate a set of power control configuration parameters. The wireless device may be configured with one or more sets of power control configuration parameters. A priority field may indicate a priority value of the one or more scheduled PUSCH transmissions. An invalid symbol pattern field (invalid OS field 1756) may indicate one or more unavailable OFDM symbols to be used for the one or more scheduled PUSCH transmissions. An SCell dormancy field may indicate transitioning between a dormant state and a normal state of one or more secondary cells.

The example DCI format of FIG. 17 may comprise one or more additional DCI field(s). For example, a downlink feedback information (DFI) field may indicate HARQ feedback (e.g., ACK or NACK) for one or more configured grant resources/transmissions (e.g., the DFI field may be configured to be present for an unlicensed/shared spectrum cell that is a scheduled cell of a DCI). Other DCI fields may be used to indicate a HARQ-ACK bitmap for the one or more configured grant resources and TPC commands for a scheduled PUSCH transmission, for example, if the DCI format of FIG. 17 is used for indicating downlink feedback information for the one or more configured grant resources. Remaining bits may be reserved and/or filled with zeros. A DCI format based on FIG. 17 may schedule uplink resources (e.g., DFI is set to 0) or a downlink feedback indicator for configured grant resources (e.g., CG-DFI if DFI is set to 1).

Figure 18:
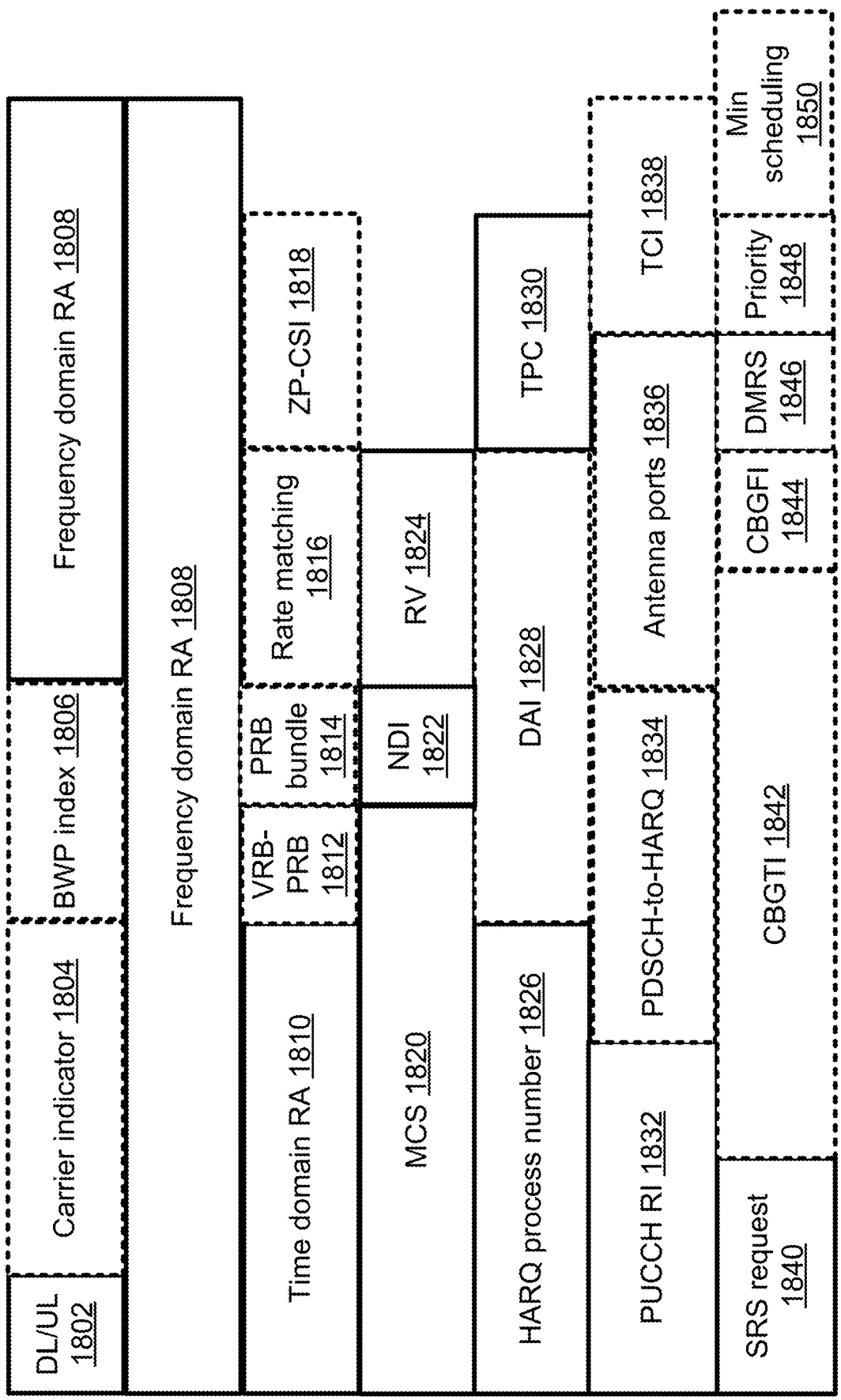
FIG. 18 shows an example DCI format.

FIG. 18 shows an example DCI format. The example DCI format may correspond to DCI format 1_1 (or any other DCI format). The example DCI format may be used to schedule a downlink resource (e.g., for a PDSCH transmission) for a scheduled downlink cell. The example DCI format may comprise one or more DCI fields. The one or more DCI fields may comprise one or more of: a DL/UL indicator/identifier field 1802 for the DCI formats (e.g., indicating whether the DCI is for scheduling a DL transmission or an UL transmission, indicating whether the DCI is based on a first DCI format for uplink transmission (e.g., FIG. 17) or a second DCI format for downlink transmission (e.g., FIG. 18)), a carrier indicator field 1804, a BWP indicator/index field 1806, a frequency domain RA field 1808, a time domain RA field 1810, a virtual resource block to physical resource block mapping (VRB-PRB) field 1812, a physical resource block (PRB) bundling size indicator (PRB bundle) field 1814, a rate matching indicator field 1816, a zero power CSI-RS (ZP-CSI) field 1818, an MCS field 1820, an NDI field 1822, an RV field 1824, a HARQ process number field 1826, a DAI field 1828, a TPC command field 1830 (e.g., indicating a TPC command for a PUCCH transmission), a PUCCH resource indicator (PUCCH-RI) field 1832, a PDSCH-to-HARQ feedback timing indicator field 1834, an antenna ports field 1836, a TCI field 1838, a SRS request field 1840, a CBGTI field 1842, a CBG flushing out information (CBGFI) field 1844, a DMRS sequence initialization field 1846, a priority indicator field 1848, and/or a minimum applicable scheduling offset indicator field 1850. One or more of the fields of FIG. 18 may perform functions as described with reference to similarly named fields of FIG. 17.

The VRB-PRB field 1812 may indicate whether a mapping is based on a virtual RB or a physical RB. The PRB bundle field 1814 may indicate a size of PRB bundle, for example, if dynamic PRB bundling is enabled. The rate matching indicator field 1816 may indicate one or more rate matching resources in which the scheduled data may be mapped based on the rate matching. The ZP-CSI field 1818 may indicate a quantity of aperiodic ZP CSI-RS resource sets configured by the base station. The DCI format of FIG. 18 may also indicate MCS, NDI and/or RV for a second transport block, for example, if a maximum quantity of codewords scheduled by DCI is configured to be two. The DCI format of FIG. 18 may not indicate MCS, NDI and/or RV for the second transport block, for example, if the maximum quantity of codewords scheduled by DCI is configured to be one. The DAI field 1818 may indicate a size (e.g., a quantity of bits) of HARQ-ACK codebook. The TPC command field 1830 may indicate a power offset for a scheduled PUCCH transmission comprising HARQ-ACK bit(s) of the downlink data scheduled by the DCI. The PUCCH-RI field 1832 may indicate a PUCCH resource of one or more PUCCH resources configured by the base station. The PDSCH-to-HARQ feedback timing indicator field 1834 may indicate a timing offset between an end of a PDSCH transmission scheduled by the DCI and a start of the scheduled PUCCH transmission. The antenna ports field 1836 may indicate DMRS patterns for the scheduled PDSCH transmission. The TCI field 1838 may indicate a TCI code point of one or more active TCI code points/active TCI states. The base station may configure one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states. The CBGTI field 1842 may indicate whether to flush a soft buffer corresponding to a HARQ process indicated by the HARQ process number field 1826 The minimum applicable scheduling offset indicator field 1850 may indicate enabling or disabling of a configured minimum scheduling offset (e.g., if a minimum scheduling offset is configured) or may indicate selection of a first minimum scheduling offset or a second minimum scheduling offset (e.g., if the first minimum scheduling offset and the second minimum scheduling offset are configured).

Two (or any other quantity of) downlink resource allocation schemes (e.g., type 0 and type 1) may be supported for wireless communication. A wireless device may determine a frequency domain resource based on DCI corresponding to a fallback DCI format (e.g., DCI format 0_1), for example, based on resource allocation type 1 being used. A base station may configure a dynamic switch between type 0 resource allocation and type 1 resource allocation via an indication in DCI. The base station may configure the wireless device (e.g., via a higher layer parameter, such as dynamic switch) to enable dynamic switching between the type 0 and the type 1 via the DCI. The dynamic switching may be supported for DCI based on a non-fallback DCI format (e.g., DCI format 1_1 or DCI format 1_2). The base station may configure the wireless device with resource allocation type 0 or resource allocation type 1 via RRC signaling. The wireless device may determine a frequency domain resource based on DCI and based on the resource allocation configured via the RRC signaling, for example, if the higher layer parameter (e.g., dynamic switch) is not configured. The wireless device may determine a frequency domain resource based on a frequency domain resource assignment field of DCI and based on an active downlink BWP of a cell. The cell may be a scheduled cell. The DCI may indicate a BWP indicator/index. The wireless device may determine the frequency domain resource based on one or more configuration parameters of a BWP indicated by the BWP indicator/index. An RB numbering may be used to determine a frequency domain resource (e.g., for a PDSCH transmission). The RB numbering/indexing may start from a lowest RB of a CORESET, for example, for a PDSCH transmission scheduled via DCI (e.g., received in any common search space configured with the CORESET) based on a fallback DCI format (e.g., DCI format 1_0). The RB numbering may start from a lowest RB of an active BWP of the scheduled cell.

A resource allocation type 0 may use a bitmap to indicate a frequency domain resource. The bitmap may indicate one or more RBGs corresponding to the frequency domain resource. One RBG may represent a set of consecutive virtual RBs defined by a size parameter (e.g., rbg-Size). The size parameter (e.g., rbg-Size) may be indicated in a PDSCH configuration (e.g., PDSCH-Config) within a serving cell configuration (e.g., servingCellConfig). The size parameter (e.g., rbg-Size) may be determined based on a configuration (e.g., configuration 1 or configuration 2) and a bandwidth of an active BWP of a scheduled cell. Configuration 1 may indicate a size (e.g., an rbg-Size) of 2 and configuration 2 may indicate a size (e.g., an rbg-Size) of 4, for example, if the bandwidth of the active BWP is between 1 to 36 RBs. Configuration 1 may indicate a size (e.g., an rbg-Size) of 4 and configuration 2 may indicate a size (e.g., an rbg-Size) of 8, for example, if the bandwidth of the active BWP is between 37 to 72 RBs. Configuration 1 may indicate a size (e.g., an rbg-Size) of 8 and configuration 2 may indicate a size (e.g., an rbg-Size) of 16, for example, if the bandwidth of the active BWP is between 37 to 72 RBs. Configuration 1 may indicate a size (e.g., an rbg-Size) of 16 and configuration 2 may indicate a size (e.g., an rbg-Size) of 16, for example, if the bandwidth of the active BWP is between 145 to 275 (or 550) RBs. Any other relationship may be defined between the configurations, the bandwidth, and a size (e.g., an rbg-Size). A downlink BWP may comprise a quantity of RBGs (N_RBG). A DCI field size of a frequency domain resource allocation based on the resource allocation type 0 may be equal to ceil (N_RBG+(N_start_BWP mod P))/P), where and P may be equal to rbg-Size and mod is a modulo operation. For example, A mod B may represent/result in a remainder of A divided by B. A size of a first RBG may be (P−N_start_BWP mod P). A size of a last RBG may be ((N_start_BWP+bandwidth) mod P) (e.g., wherein (N_start_BWP+bandwidth) mod P is greater than zero). A size of other RBGs (e.g., different from the first RBG and the last RBG) may be P. RBGs may be scheduled via the bitmap. The bitmap may comprise N_RBG bits with one bitmap bit corresponding to each RBG. The one or more RBGs may be indexed in an order of increasing frequency. Indexing may start from a lowest frequency of the active BWP. The order of the bitmap may be determined such that RBG #0 to RBG #N_RBG−1 may be mapped to most significant bit to least significant bit of the bitmap. The wireless device may determine/assume that an RBG is allocated, for example, if a corresponding bit of the bitmap indicates a first value (e.g., 1). The wireless device may determine/assume that an RBG is not allocated, for example, if a corresponding bit of the bitmap indicates a second value (e.g., 0).

The wireless device may determine one or more physical RBGs based on the indicated bitmap for the virtual RBGs, for example, if virtual RB to physical RB mapping is enabled. The wireless device may determine the one or more physical RBGs based on the indicated bitmap, for example, if virtual RB to physical RB mapping is disable or is not enabled.

A frequency domain resource allocation may indicate virtual RBs. The frequency domain resource allocation may indicate a set of contiguously allocated non-interleaved or interleaved virtual RBs within an active bandwidth part of a scheduled cell, for example, for resource allocation type 1. DCI (e.g., corresponding to the frequency domain resource allocation) may be scheduled via a wireless device-specific (e.g., UE-specific) search space (USS). The frequency domain resource allocation field based on the resource allocation type 1 may indicate a resource allocation value (RIV). The RIV may indicate a starting virtual RB (e.g., RB_start) and a length in terms of contiguously allocated virtual RBs (e.g., L_rbs). The RIV may be determined as being equal to bandwidth (L_rbs−1)+RB_start, for example, if (L_rbs−1) is smaller than or equal to floor (bandwidth/2), wherein floor is a floor function. Otherwise, the RIV may be determined as being equal to bandwidth (bandwidth−L_rbs+1)+(bandwidth−1−RB_start). The bandwidth may be qual to a bandwidth of the active BWP.

A base station may enable PRB bundling. A wireless device may determine/assume a same precoding over RBs of the PRB bundle (e.g., two PRBs, four PRBs or the bandwidth). The base station may or may not enable the PRB bundling or partial PRB bundling for the wireless device.

Multiple resource allocation types may be supported for a transmission (e.g., for an uplink transmission). Resource allocation type 0, resource allocation type 1 or resource allocation type 2 may be supported for the transmission. Transform precoding may be disabled for resource allocation type 0. Transform precoding may be either enabled or disabled for resource allocation type 1 or the resource allocation type 2. A higher layer parameter (e.g., dynamic switch) may be configured for the transmission. The wireless device may switch between the resource allocation type 0 and the resource allocation type 1 based on DCI, for example, based on being configured with the higher layer parameter. The base station may configure a resource allocation type, via an RRC signaling, with the higher layer parameter not being enabled. The resource allocation type 2 may be used, for example, if an interlaced PUSCH transmission is enabled. The wireless device may apply the resource allocation type 1 for DCI (e.g., based on a fallback DCI format, such as a DCI format 0_0), wherein interlaced PUSCH transmission is disabled. The wireless device may apply the resource allocation type 2 for the DCI, for example, if interlaced PUSCH transmission is enabled. The wireless device may determine a frequency domain resource (e.g., based on a frequency domain resource allocation field of DCI based on an active uplink BWP of a scheduled cell, for example, if the DCI does not comprise a BWP indicator/index. The wireless device may determine the frequency domain resource based on an indicated BWP, for example, if the DCI comprises the BWP indicator/index.

A resource allocation type 0 for an uplink transmission may use a bitmap indicating one or more RBGs. The one or more RBGs may be within an active uplink BWP of a scheduled cell. One RBG may represent a set of consecutive virtual resource blocks defined by a size parameter (e.g., rbg-Size). The size parameter may be indicated as a parameter of a PUSCH configuration (e.g., PUSCH-Config) within a serving cell configuration (e.g., servingCellConfig). The size parameter may be determined based on a configuration (e.g., configuration 1 or configuration 2) and a bandwidth of an active uplink BWP of a scheduled cell. Configuration 1 may indicate a size (e.g., an rbg-Size) of 2 and configuration 2 may indicate a size (e.g., an rbg-Size) of 4, for example, if the bandwidth of the active UL BWP is between 1 to 36 RBs. Configuration 1 may indicate a size (e.g., an rbg-Size) of 4 and configuration 2 may indicate a size (e.g., an rbg-Size) of 8, for example, if the bandwidth of the active UL BWP is between 37 to 72 RBs. Configuration 1 may indicate a size (e.g., an rbg-Size) of 8 and configuration 2 may indicate a size (e.g., an rbg-Size) of 16, for example, if the bandwidth of the active UL BWP is between 73 to 144 RBs. Configuration 1 may indicate a size (e.g., an rbg-Size) of 16 and configuration 2 may indicates a size (e.g., an rbg-Size) of 16, for example, if the bandwidth of the active uplink BWP is between 145 to 275 (or 550) RBs. Any other relationship may be defined between the configurations, the bandwidth, and a size (e.g., an rbg-Size). An uplink BWP may comprise a quantity of RBGs (N_RBG). Determination of a bit of the bitmap of the uplink resource allocation type 1 may be same as (or substantially the same as) that of the downlink resource allocation type 1. Almost contiguous allocation may be supported in a first frequency range (e.g., below 7 GHZ, or any other first frequency range). Contiguous resource allocation may be supported in a second frequency range (e.g., between 7 GHZ and 52.6 GHz, or any other second frequency range). The resource allocation type 0 for an uplink transmission may follow similar procedures as described for the resource allocation type 0 for a downlink transmission.

The resource allocation type 2 may be used to indicate an interlaced resource allocation. M may be equal to a quantity of interlaces. A frequency domain resource allocation field may comprise an RIV. The RIV may indicate a starting interlace index m_0 and a quantity of contiguous interlace indices L (e.g., L≥1), for example, for the RIV between 0 and M (M+1)/2 (e.g., 0<=RIV<M(M+1)/2). The RIV may indicate M (L−1)+m_0, for example, if (L−1)≤floor (M/2). Otherwise, the RIV may indicate M (M−L+1)+(M−1−m_0). The RIV may indicate a starting interlace index m_0 and a set of values d based on one or more sets of values, for example, for the RIV larger than or equal to M(M+1)/2 (e.g., RIV≥M(M+1)/2). An entry may represent {RIV−M(M+1)/2, m_0, d}. The one or more sets of values may comprise {0, 0, {0, 5}}, {1, 0, {0, 1, 5, 6}}, {2, 1, {0, 5}}, {3, 1, {0, 1, 3, 5, 6, 7, 8}}, {4, 2, {0, 5}}, {5, 2, {0, 1, 2, 5, 6, 7}}, {6, 3, {0, 5}}, and/or {7, 4, {0, 5}}. Resource allocation type and resource allocation based on DCI may be applied for a configured grant configuration or semi-persistent scheduling configuration.

A wireless device may use frequency hopping for a transmission (e.g., a PUSCH transmission, a PUCCH transmission) via a slot of an uplink wireless resource (e.g., a carrier, a frequency-time resource, a spatial resource, etc.). A base station may configure a frequency offset (e.g., using a higher layer parameter frequencyHoppingOffset) for frequency hopping. The frequency offset may be between a first frequency location of a first hop of the transmission in the slot and a second frequency location of a second hop of the transmission. The wireless device may determine the first frequency location based on a frequency domain resource allocation field indicated by scheduling DCI or based on one or more configuration parameters of a configured grant resource configuration. The wireless device may determine the second frequency location by based on the first frequency location and the frequency offset (e.g., by adding the first frequency location and the frequency offset).

A base station may send/transmit DCI. The DCI may comprise a time domain resource allocation field. A value of the time domain resource allocation field (e.g., m) may indicate a row indicator/index (e.g., m+1) of a time domain resource allocation list/a time domain resource allocation table. The base station may configure one or more time domain resource allocation tables. A first time domain resource allocation table may be used for a fallback DCI format scheduled via a common search space (CSS). A second time domain resource allocation table may be used for a fallback DCI format and/or a non-fallback DCI format via a USS. The wireless device may determine a time domain resource allocation table, from the one or more time domain resource allocation tables, for the DCI, for example, based on/in response to receiving the DCI. The base station may configure one or more time domain resource allocation entries for a time domain resource allocation table. A time domain resource allocation entry may comprise a starting and a length indicator value (SLIV), a PUSCH mapping type, and a K2 value. The K2 value may represent a scheduling offset between scheduling DCI of a PUSCH transmission and a starting slot index of the PUSCH transmission. The time domain resource allocation entry may comprise a repetition number (e.g., numberOfRepetitions). The time domain resource allocation entry may comprise a starting symbol (e.g., startSymbol) and a length addition to the SLIV. A base station may configure a repetition type (e.g., repetition type A, repetition type B) for a PUSCH transmission. The base station may configure, for the wireless device, a parameter (e.g., PUSCHRepTypeIndicator-ForDCIFormat0_1) to indicate a repetition type B (e.g., puschRepTypeB), for example, for a PUSCH transmission scheduled by DCI corresponding to a non-fallback DCI format (e.g., DCI format 0_1). The wireless device may determine a resource based on a procedure for the repetition type B and a time domain resource allocation field of the DCI, for example, based on being configured with the repetition type B. The base station may configure, for the wireless device, a parameter (e.g., PUSCHRepTypeIndicator-ForDCIformat0_2) to indicate the repetition type B (e.g., puschRepTypeB), for example, for a PUSCH transmission scheduled by second DCI (e.g., based on a DCI format 0_2). The wireless device may determine (e.g., based on receiving DCI) a time domain resource based on a repetition type A, for example, if the base station does not configure a parameter (e.g., PUSCHRepTypeIndicator-ForDCIFormat0_1) to indicate a repetition type B (e.g., puschRepTypeB).

The wireless device may determine a resource for a PUSCH transmission. The resource may be determined based on a starting symbol S in a starting slot and a quantity of consecutive symbols L from the starting symbol S. The wireless device may determine a starting symbol S in a starting slot and a quantity of consecutive symbols L from the starting symbol S based on an SLIV, for example, if the repetition type A is configured/enabled. 14 OFDM symbols (or any other first quantity of OFDM sysmbols) may be assumed for a slot in an uplink BWP with a normal cyclic prefix (CP). The SLIV may indicate a value that is equal to 14*(L−1)+S, for example, if (L−1) is smaller than or equal to 7 (e.g., half slot based on a normal CP). The SLIV may indicate a value that is equal to 14*(14−L+1)+(14−1−S), for example, if (L−1) is greater than 7. L may be greater than 0, and may be smaller than or equal to 14−S. 12 OFDM symbols (or any other second quantity of OFDM symbols) may be assumed for a slot in an uplink BWP with an extended CP. SLIV may be determined as 12*(L−1)+S or 12*(12−L+1)+(14−1−S), for example, based on (L−1) being smaller than/equal to 6 or larger than 6, respectively. The base station may configure a PUSCH mapping type (e.g., PUSCH mapping type A or PUSCH mapping type B) for repetition type A. The base station may determine a first OFDM symbol comprising a DMRS based on a fixed location (e.g., a first symbol of a slot), for example, if PUSCH mapping type A is configured. The base station may determine a first OFDM symbol comprising a DMRS based on a starting OFDM symbol of the PUSCH, for example, if PUSCH mapping type B is configured.

The wireless device may determine a starting OFDM symbol S in a starting slot and a quantity of consecutive OFDM symbols L based on a row of a time domain resource allocation table, for example, if repetition type B is configured/enabled. The row of the time domain resource allocation table may comprise start symbol parameter (e.g., startSymbol) indicating the starting OFDM symbol S and a length parameter indicating the quantity of consecutive OFDM symbols L. The wireless device may assume that PUSCH mapping type B is configured for the repetition type B. A starting OFDM symbol S, a length L, and S+L may represent one or more values, for example, if PUSCH mapping type A is configured. {S, L, S+L} may be {0, {4, . . . , 14}, {4, . . . , 14}} for a normal CP, and {0, {4, . . . , 12}, {4, . . . , 12}} for an extended CP, for example, if PUSCH mapping type A is configured. {S, L, S+L} may be {{0, . . . , 13}, {1, . . . , 14}, {1, . . . , 14} for a repetition type A, {1, . . . , 27} for a repetition type B} for the normal CP, and {{0, . . . , 11}, {1, . . . , 12}, {1, . . . , 12}} for the extended CP, for example, if PUSCH mapping type B is configured.

A wireless device may determine a repetition number K (e.g., quantity of repetitions). The wireless device may determine the repetition number K based on a row of a time domain resource allocation table, for example, for repetition type A. The row may indicate a quantity of repetitions. The wireless device may determine the quantity/number of repetitions based on an RRC parameter (e.g., pusch-AggregationFactor), for example, if the row may not indicate the quantity of repetitions. The wireless device may assume/determine a single transmission (e.g., quantity of repetitions=1), for example, if the row does not indicate the quantity of repetitions and the RRC parameter is not configured. The wireless device may determine/assume a single transmission for a PUSCH scheduled by fallback DCI (e.g., DCI format 0_0).

A wireless device may repeat a transmission (e.g., a PUSCH transmission such as a TB) across multiple slots. A wireless device may apply a starting OFDM symbol S and a length L in a slot across K consecutive slots based on a single transmission layer, for example, for repetition type A with a repetition number K that is larger than 1. The wireless device may repeat a TB across the K consecutive slots and apply/use same OFDM symbols in each slot. An RV applied on a i-th transmission of the K consecutive slots may be determined based on a repetition type and/or an RV value indicated by DCI. An RV value for i-th transmission occasion (e.g., if repetition type A is configured) or i-th actual repetition (e.g., if repetition type B is configured) may be determined as 0 if i mod 4=0, 2 if i mod 4=1, 3 if i mod 4=2, and 4 if i mod 4=3, for example, if an RV value indicated by DCI is equal to 0. An RV value may be determined as 2 if i mod 4=0, 3 if i mod 4=1, 1 if i mod 4=2, and 0 if i mod 4=3, for example, if an RV value indicated by DCI is equal to 2. An RV value may be determined as 3 if i mod 4=0, 1 if i mod 4=1, 0 if i mod 4=2, and 0 if i mod 4=2, for example, if an RV value indicated by DCI is equal to 3. An RV value may be determined as 1 if i mod 4=0, 0 if i mod 4=1, 2 if i mod 4=2, and 3 if i mod 4=3, for example, if an RV value indicated by DCI is equal to 1.

A PUSCH transmission in a slot of a plurality of slots may be omitted. A PUSCH transmission in a slot of a plurality of slots may be omitted, for example, if using repetition type A. A PUSCH transmission in a slot may be omitted, for example, if the slot does not have a sufficient quantity of uplink OFDM symbols for the PUSCH transmission. A wireless device may determine one or more slots for a quantity of repetitions equal to a nominal repetition number N, for example, for repetition type B. N may be configured by a base station via RRC signaling or via a time domain resource allocation field in DCI. The wireless device may determine a slot in which the i-th nominal repetition (i=0, 1, . . . N−1) may start. A slot indicator/index may be equal to Ks+floor ((S+iL)/N_slot_symbol), and a starting symbol in the slot may equal to mod (S+iL, N_slot_symbol). The N_slot_symbol may be 14 (or any other first quantity) for a normal CP and 12 (or any other second quantity) for an extended CP. S may represent a starting OFDM symbol indicated by a time domain resource allocation field of DCI and L may represent a length indicated by the time domain resource allocation field of the DCI. The wireless device may determine a second slot in which the i-th nominal repetition may end. A second slot indicator/index of the second slot may be determined as Ks+floor ((S+(i+1)*L−1)/N_slot_symbol). An ending symbol in the second slot may be determined as mod (S+(i+1)*L−1, N_slot_symbol). Ks may be determined as a starting slot indicated by the time domain resource allocation field of the DCI. Floor (x) may represent/result in a largest integer that is smaller than or equal to x.

The wireless device may determine an invalid OFDM symbol for PUSCH repetitions corresponding to repetition type B. The wireless device may determine an invalid OFDM symbol for PUSCH repetitions based on one or more parameters (e.g., a tdd-UL-DL-ConfigurationCommon, a tdd-UL-DL-ConfigurationDedicated and/or an InvalidSymbolPattern) indicated by an RRC signaling. The wireless device may determine a downlink symbol based on the tdd-UL-DL-ConfigurationCommon or the tdd-UL-DL-ConfigurationDedicated. The determined downlink symbol may be an invalid OFDM symbol for the repetition type B. The InvalidSymbolPattern may be a bitmap of OFDM symbols over one slot or two slots. The base station may indicate InvalidSymbolPattern to the wireless device. A bit of the bitmap may indicate a first value (e.g., 1) to invalidate a corresponding OFDM symbol. The base station may further configure a periodicity/pattern parameter (e.g., periodicityAndPattern). A bit of the periodicityAndPattern may correspond to a unit equal to a duration of the bitmap of the InvalidSymbolPattern. The wireless device may determine invalid OFDM symbol(s) based on InvalidSymbolPattern and periodicityAndPattern. An invalid symbol pattern indicator field may indicate a first value (e.g., 1) for a PUSCH scheduled/activated by DCI corresponding to a non-fallback DCI format (e.g., DCI format 0_1, or DCI format 0_2). InvalidSymbolPatternIndicator-ForDCIFormat0_1/0_2 may be configured. The wireless device may apply an invalid symbol pattern (e.g., InvalidSymbolPattern), for example, based on an invalid symbol pattern indicator field indicating the first value and based on InvalidSymbolPatternIndicator-ForDCIFormat0_1/0_2 being configured. Otherwise, the wireless device may not apply the invalid symbol pattern. The wireless device may not apply the invalid symbol pattern, for example, if InvalidSymbolPatternIndicator-ForDCIFormat0_1/0_2 is not configured. The wireless device may determine remaining OFDM symbols that do not comprise invalid OFDM symbol(s). The wireless device may consider/determine the remaining OFDM symbols to be valid OFDM symbols. The wireless device may determine an actual repetition of a slot comprising consecutive sufficient valid consecutive OFDM symbols, for example, if there is a sufficient quantity of valid OFDM symbols in the slot for a PUSCH transmission based on a scheduling DCI. The wireless device may skip the actual repetition based on a slot formation indication. The wireless device may apply a RV based on the actual repetition.

A row of a time domain resource allocation may comprise one or more resource assignments for one or more contiguous PUSCHs. K2 value associated with the row may indicate a first PUSCH of the one or more contiguous PUSCHs. Each PUSCH of the one or more contiguous PUSCHs may be indicated/scheduled with a separate SLIV and a PUSCH mapping type. A similar procedure may be used to schedule a time domain resource for a downlink data.

A base station may enable frequency hopping for repetition type A. The base station may configure a parameter to enable frequency hopping for a PUSCH transmission. The base station may configure a parameter (e.g., frequencyHopping-ForDCIFormat0_2) to enable frequency hopping for a PUSCH transmission scheduled by DCI (e.g., corresponding to a DCI format 0_2). The base station may configure a parameter (e.g., frequencyHopping in pusch-Config) to enable frequency hopping for a PUSCH transmission scheduled by second DCI (e.g., corresponding to DCI format(s) other than the DCI format 0_2). The base station may configure a parameter (e.g., frequencyHopping) for a configured grant configuration to enable a frequency hopping of a second PUSCH transmission via a resource of the configured grant configuration. The base station may configure a first hopping pattern or a second hopping pattern for an uplink carrier (e.g., via the pusch-Config). The first hopping pattern may be intra-slot frequency hopping. The first hopping pattern may be applied for a transmission via a single slot or a repetition transmission via a plurality of slots. The second hopping pattern may be inter-slot hopping. The second hopping pattern may be applied to a repetition transmission over a plurality of slots. The base station may not configure frequency hopping for a resource allocation type. The wireless device may determine whether or not to perform frequency hopping based on a DCI field (e.g., a frequency hopping (FH) field), for example, if the base station configures resource allocation type 1 and a hopping pattern is configured.

A base station may configure up to two (or any other quantity of) frequency offset values for a first uplink BWP. The first uplink BWP may have a bandwidth smaller than 50 PRB (or any other quantity of PRBs). The base station may configure up to four (or any other quantity of) frequency offset values for a second uplink BWP. The second uplink BWP may have a bandwidth larger than or equal to 50 PRBs (or any other quantity of PRBs). Scheduling DCI may select/indicate a frequency offset value (of up to two frequency offset values) for the first uplink BWP to indicate a frequency offset for frequency hopping. A second scheduling DCI may select/indicate a frequency offset value (of the up to four frequency offset values) for the second uplink BWP to indicate a frequency offset for frequency hopping. The base station may configure a frequency hopping offset via a parameter (e.g., frequencyHoppingOffset) of a configured grant configuration for a configured grant resource. The wireless device may determine a first RB frequency location of a first hop as a first RB indicated by a frequency domain resource assignment field of scheduling DCI, for example, if the first hopping pattern (e.g., intra-slot hopping) is enabled. The wireless device may determine a second RB frequency location of a second hop as ((the first RB+the frequency offset) mod bandwidth of an UL BWP). A quantity of OFDM symbols in a first hop may be determined as floor (N_PUSCH_symb/2), wherein N_PUSCH_symb may be a quantity of OFDM symbols of a scheduled PUSCH transmission. A quantity of OFDM symbols in the second hop may be determined as (N_PUSCH-symb−the quantity of OFDM symbols in the first hop). The wireless device may perform the first hop in even slots and the second hop in odd slots, for example, if the second hopping pattern (e.g., inter-slot hopping) is enabled.

FIG. 19A shows an example of intra-slot frequency hopping. The intra-slot hopping may correspond to a first hopping pattern. The base station may schedule three PUSCH transmissions via three slots (e.g., slot n, a slot n+1 and a slot n+2), or any quantity of PUSCH transmissions via a corresponding quantity of slots or other durations. The PUSCH transmissions may configured with a first frequency hopping pattern for intra-slot hopping. The wireless device may switch between a first hop 1904 (e.g., first portion) and a second hop 1908 (e.g., second portion) in each slot, and repeat the first hop 1904 and the second hop 1908 over the three slots. The wireless device may send/transmit a corresponding PUSCH transmission, of the three PUSCH transmissions, via each slot. Each PUSCH transmission may comprise the first hop and the second hop. Each PUSCH transmission may comprise a transport block.

Similar hopping patterns (e.g., intra-slot hopping as shown in FIG. 19A) may be applied to a PUCCH transmission or one or more PUCCH transmissions via one or more slots. For example, the wireless device may be scheduled with three PUCCH transmissions via three slots. The wireless device may send/transmit a first PUCCH transmission (e.g., earliest PUCCH transmission) of the three PUCCH transmissions via a slot n. The first PUCCH transmission may comprise a first hop 1904 (e.g., first portion) and a second hop 1908 (e.g., second portion). The wireless device may send/transmit a second PUCCH transmission (e.g., a second earliest PUCCH transmission) of the three PUCCH transmissions via a slot n+1. The second PUCCH may comprise a first hop and a second hop in the slot n+1. Each PUCCH transmission may comprise UCI (e.g., HARQ-ACK feedback).

FIG. 19B shows an example of inter-slot frequency hopping. The inter-slot hopping may correspond to a second hopping pattern. The base station may schedule three PUSCH transmissions via three slots (e.g., slot n, a slot n+1 and a slot n+2), or any quantity of PUSCH transmissions via a corresponding quantity of slots or other durations. The wireless device may switch between a first hop 1912 and a second hop 1916 in the slots. The first hop 1912 may be used in even slots and the second hop may be used in odd slots. The wireless device may send/transmit a corresponding PUSCH transmission, of the three PUSCH transmissions, via each slot. Each PUSCH transmission may comprise either the first hop or the second hop. For example, each PUSCH transmission may comprise a transport block. Similar hopping patterns (e.g., inter-slot hopping, as shown in FIG. 19B) may be applied to a PUCCH transmission or one or more PUCCH transmissions via one or more slots. For example, the wireless device may be scheduled with three PUCCH transmissions via three slots. The wireless device may send/transmit a first PUCCH transmission (e.g., earliest PUCCH transmission) of the three PUCCH transmissions via a slot n. The first PUCCH transmission may comprise a first hop 1912. The wireless device may send/transmit a second PUCCH transmission (e.g., a second earliest PUCCH transmission) of the three PUCCH transmissions via a slot n+1. The second PUCCH transmission may comprise a second hop 1916. Each PUCCH transmission may comprise UCI (e.g., HARQ-ACK feedback).

One or more hopping patterns may be supported for a repetition type. A first type B hopping pattern and a second type B hopping pattern may be supported for repetition type B. The first type B hopping pattern may be an inter-repetition frequency hopping pattern. The second type B hopping pattern may be an inter-slot frequency hopping pattern. The base station may enable or disable the hopping via scheduling DCI (e.g., a frequency hopping field of the scheduling DCI). The base station may configure up to two frequency hopping offset values for a first UL BWP (e.g., with less than 50 PRBs, or any other quantity of PRBs). The base station may configure up to four (or any other quantity of) frequency hopping offset values for a second UL BWP (e.g., with equal to or larger than 50 PRBs, or any other quantity of PRBs). Scheduling DCI may select one value from the configured frequency hopping offset values to indicate a frequency hopping offset. The wireless device may determine a first hop for even nominal repetitions and a second hop for odd nominal repetitions, for example, the first type B hopping pattern (e.g., the inter-repetition frequency hopping pattern). The wireless device may determine a frequency location of the first hop based on a frequency domain resource assignment field of DCI or a frequency domain resource assignment of a configured grant resource. The wireless device may determine a frequency location of the second hop based on the frequency location of the first hop and the frequency hopping offset. The frequency hopping offset may be configured by the base station for the configured grant configuration. The second type B hopping pattern of the inter-slot hopping may be the same as (or substantially same as) the second hopping pattern of the repetition type A.

UCI may comprise one or more indications. The UCI may comprise at least one of: a HARQ-ACK feedback, an SR, a link recovery request (LRR), and/or a CSI feedback. A wireless device may send/transmit one or more PUCCH transmissions. A PUCCH transmission may comprise UCI. For example, a wireless may send two PUCCH transmissions in a slot. At least one of the two PUCCH transmissions may use a PUCCH format 0 or a PUCCH format 2, for example, if the wireless device is not configured with parameter (e.g., ACKNACKFeedbackMode) set to a separate feedback (e.g., SeparateFeedback). The wireless device may send up to two PUCCH transmissions with HARQ-ACK feedback in different symbols in a slot, for example, if a base station sets the parameter (e.g., ACKNACKFeedbackMode) to a separate feedback (e.g., SeparateFeedback). A base station may configure one or more PUCCH resources via a higher layer parameter (e.g., pucch-ResourceCommon). The one or more PUCCH resources may be used if a wireless device-specific PUCCH configuration (e.g., RRC message configured PUCCH-Config) is not available. The base station may configure one or more first PUCCH resource sets (e.g., PUCCH-ResourceSet) via a PUCCH configuration (e.g., PUCCH-Config). The wireless device may determine a PUCCH resource from the one or more first PUCCH resource sets, for example, if the PUCCH configuration (e.g., PUCCH-Config) is available. A PUCCH resource set (e.g., of the pucch-ResourceCommon) may comprise up to K (e.g., K=16, or any other quantity of) PUCCH resources. Configuration parameters for the PUCCH resource may comprise at least one of a PUCCH format, a first symbol, a duration, a PRB offset, and/or a cyclic shift indicator/index for a PUCCH transmission. The wireless device may send a PUCCH transmission using frequency hopping, for example, based on interlaced PUCCH transmission (e.g., useInterlacePUCCH-Common) not being enabled. The wireless device may be enabled with interlaced PUCCH transmission in an unlicensed spectrum.

A PUCCH resource, of a PUCCH resource set of the one or more first PUCCH resource sets (e.g., configured via PUCCH-Config), may comprise/be configured with at least one of: a PUCCH resource indicator/index (e.g., pucch-ResourceId), an indicator/index of a starting PRB of a first hop (e.g., startingPRB), an indication for an intra-slot frequency hopping (e.g., intraSlotFrequencyHopping), an indicator/index of a starting PRB of a second hop (e.g., secondHopRB), an indicator/index of a first interlace (e.g., interlace 0), an indicator/index of a second interlace (e.g., interlace1), an indicator/index of an RB set (e.g., intraCellGuardBand), and/or a PUCCH format indicator. The PUCCH resource may be associated with indicator/index of a starting PRB of a first hop if an interlaced PUCCH transmission is not enabled. The PUCCH resource may be associated with an indicator/index of a first interlace, an indicator/index of a second interlace, and/or an indicator/index of an RB set if an interlaced PUCCH transmission is enabled. A PUCCH resource (e.g., corresponding to PUCCH format 0) may additionally comprise/be configured with an indicator/index for an initial cyclic shift information (e.g., initialCyclicShift), a quantity of OFDM symbols for a PUCCH transmission (e.g., nrofSymbols), and/or a first symbol for the PUCCH transmission (e.g., startingSymbolIndex). A second PUCCH resource (e.g., corresponding to PUCCH format 1) may additionally comprise/be configured with an indicator/index for an initial cyclic shift information (e.g., initialCyclicShift), a quantity of OFDM symbols for a PUCCH transmission (e.g., nrofSymbols), a first symbol for the PUCCH transmission (e.g., startingSymbolIndex), and/or an orthogonal cover code (e.g., timeDomainOCC). A third PUCCH resource (e.g., corresponding to PUCCH format 2 or PUCCH format 3) may additionally comprise/be configured with a quantity of PRBs (e.g., nrofPRBs), a quantity of symbols for a PUCCH transmission (e.g., nrofSymbols), and/or a first OFDM symbol for the PUCCH transmission (e.g., startingSymbolIndex). A fourth PUCCH resource (e.g., corresponding to PUCCH format 4) may additionally comprise a quantity of OFDM symbols for a PUCCH transmission (e.g., nrofSymbols), an orthogonal cover code length (e.g., occ-Length), an orthogonal cover code indicator/index (e.g., occ-Index), and/or a first OFDM symbol for the PUCCH transmission (e.g., startingSymbolIndex).

The base station may configure up to four (or any other quantity of) PUCCH resource sets. A PUCCH resource set may be selected for transmission of UCI based on a bit size of the UCI. A first PUCCH resource set may be used for UCI, for example, if a bit size of the UCI is less than or equal to 2 (or any other quantity). A second PUCCH resource set may be used for second UCI, for example, if a bit size (O_UCI) of the second UCI is between 2 and N2 (e.g., 2<O_UCI<N2) (or any other quantity). The base station may configure N2 for the second PUCCH resource set. O_UCI may be the bit size of the second UCI. A third PUCCH resource set may be used for third UCI, for example, if a bit size of the third UCI is between N2 and N3 (N2<O_UCI<N3). The base station may configure N3 for the third PUCCH resource set. N2 or N3 may be 1706 (or any other quantity). The wireless device may use a fourth PUCCH resource set for a fourth UCI, for example, if a bit size of the fourth UCI greater than N3 (e.g., N3<O_UCI<=1706) (or any other quantity).

A PUCCH format for a PUCCH transmission may be selected based on a quantity of bits to be transmitted. A PUCCH transmission based on PUCCH format 0 may be used for sending one or two bits of HARQ-ACK or SR information. The wireless device may send a PUCCH transmission based on the PUCCH format 1 via one OFDM symbol or two OFDM symbols. A PUCCH format 1 may be used for a PUCCH transmission, comprising 1 or 2 bits of UCI, via four OFDM symbols. A PUCCH transmission based on PUCCH format 2 may be used for sending UCI, comprising more than two bits, via 1 or 2 OFDM symbols. A PUCCH transmission based on PUCCH format 3 may be used for sending UCI, comprising more than 2 bits, via more than 4 OFDM symbols. A PUCCH transmission based on PUCCH format 4 may be used for sending UCI, comprising more than 2 bits, via more than 4 OFDM symbols. The base station may configure a quantity of DMRS symbols for a PUCCH format 3 or a PUCCH format 4 (e.g., additionalDMRS). The base station may configure a spatial domain parameter for a PUCCH transmission (e.g., PUCCH-SpatialRelationInfo in PUCCH-Config). The base station may activate (e.g., via a MAC CE) a spatial domain filter parameter (e.g., a PUCCH-SpatialRelationInfo) for a PUCCH resource.

A base station may send/transmit one or more RRC messages comprising configuration parameters (e.g., PUCCH-Config). The configuration parameters may be for a PUCCH transmission via a BWP of a cell. The configuration parameters may comprise a plurality of PUCCH configurations (e.g., PUCCH-Configs). A PUCCH configuration (e.g., PUCCH-Config) may be for an uplink BWP of the cell. The PUCCH configuration may comprise one or more PUCCH resource sets. The PUCCH configuration may comprise one or more first PUCCH resources. The PUCCHconfiguration may comprise one or more PUCCH formats supported in the uplink BWP of the cell. The PUCCH configuration may comprise one or more SR configurations. The PUCCH configuration may comprise up to eight (or any other quantity of) HARQ-ACK offsets (e.g., dl-DataUL-ACK). A HARQ-ACK offset (e.g., dl-DataUL-ACK) may represent a gap between a PDSCH transmission and a corresponding PUCCH transmission. The PUCCH configuration may comprise one or more parameters for a spatial domain filter (e.g., spatialRelationInfo). The PUCCH configuration may comprise parameters for power control (e.g., pucch-PowerControl). A wireless device may support a PUCCH transmission via a slot. The wireless device may support up to two (or any other quantity of) PUCCH transmissions via a second slot based on the wireless device capabilities. The base station may configure additional configuration parameters for additional PUCCH resources, for example, if the wireless device supports up to two (or any other quantity of) PUCCH transmissions in the second slot. The additional configuration parameters may comprise one or more second PUCCH resources. The additional configuration parameters may comprise up to eight (or any other quantity of) second HARQ-ACK offsets (e.g., dl-DataUL-ACK). The additional configuration parameters may comprise one or more parameters for spatial domain filter(s) (e.g., spatialRelationInfo) for the second PUCCH resources.

A PUCCH format may be associated with one or more configuration parameters. The configuration parameters of a PUCCH format may comprise one or more of: an inter-slot frequency hopping (e.g., interslotFrequencyHopping), additional DMRS (e.g., additionalDMRS), a maximum code rate used for the PUCCH format (e.g., maxCodeRate), a quantity of repetitions/slots of the PUCCH format (e.g., nrofSlots among 2, 4 and 8 if a PUCCH transmission corresponding to the PUCCH format may be sent via a plurality of slots), a pi-2-BPSK parameter (e.g., pi2BPSK), and/or simultaneous HARQ-ACK and CSI transmission (e.g., simultaneousHARQ-ACK-CSI). A PUCCH resource set may comprise/be associated with a PUCCH resource set indicator/index (e.g., PUCCH-ResourceSetId), one or more PUCCH resource indicators/indices (e.g., resourceList), and/or a maximum payload size (e.g., maxPayloadSize). A PUCCH resource may comprise/be associated with a PUCCH resource indicator/index (PUCCH-ResourceId), a starting PRB (e.g., startingPRB), a intra slot frequency hopping parameter (e.g., intraSlotFrequencyHopping), a second starting PRB (e.g. secondHopPRB), a PUCCH format (e.g., PUCCH-format0, PUCCH-format1, PUCCH-format2, PUCCH-format3, or PUCCH-format4). A PUCCH format may be associated with one or more parameters. For example, the PUCCH-format0 may comprise/be associated with an initial cyclic shift (e.g., initialCyclicShift), a quantity of OFDM symbols (e.g., nrofSymbols), and/or a starting OFDM symbol (e.g., startingSymbolIndex). The PUCCH-format1 may comprise/be associated with an initial cyclic shift (e.g., initialCyclicShift), a quantity of OFDM symbols (e.g., nrofSymbols), a starting OFDM symbol (e.g., startingSymbolIndex), and/or a time domain orthogonal cover code (e.g., timeDomainOCC). The PUCCH-format2, PUCCH-format3, or the PUCCH-format4 may comprise/be associated with a quantity of PRBs (e.g., nrofPRBs), quantity of OFDM symbols (e.g., a nrofSymbols), and/or a starting OFDM symbol (startingSymbolIndex).

FIG. 20 shows an example of configuration parameters of a PUCCH resource. The configuration parameters may comprise one or more first parameters of a PUCCH resource (e.g., PUCCH-Resource) and one or more second parameters of a PUCCH format (e.g., PUCCH-format0). PUCCH-Resource may comprise a pucch-ResourceId, a startingPRB, an intraSlotFrequencyHopping, a secondHopPRB, and/or an indication of a PUCCH format. PUCCH-format0 may comprise an initialCyclicShift, a nrofSymbols and startingSymbolIndex. The wireless device may determine a first frequency location of a first hop based on the startingPRB, for example, if the intraSlotFrequencyHopping is configured as enabled (e.g., intraSlotFrequencyHopping=enabled). The wireless device may determine a second frequency location of a second hop based on the secondHopPRB. The secondHopPRB may indicate a PRB indicator/index of the second frequency location. The secondHopPRB may indicate a frequency offset based on which the wireless device may determine the second frequency location. The wireless device may determine the second frequency location based on a sum of the first frequency location and the secondHopPRB.

A base station may send/transmit configuration parameters for a PUCCH. The configuration parameters may indicate enabling of intra-slot frequency hopping (e.g., intraSlotFrequencyHopping) for the PUCCH. The PUCCH may be based on a PUCCH format 3 (e.g., PUCCH-format3) or a PUCCH format 4 (e.g., PUCCH-format4). A wireless device may apply/use intra-slot hopping for a PUCCH transmission based on intra-slot frequency hopping being enabled (e.g., based on the intraSlotFrequencyHopping parameter). The wireless device may determine a quantity of DMRS symbols for a PUCCH transmission based on whether the PUCCH is enabled with intra-slot frequency hopping and a PUCCH length. The wireless device may determine a first quantity of DMRS symbols for a first PUCCH not enabled with intra-slot hopping. The wireless device may determine a second quantity of DMRS symbols for a first hop of a second PUCCH enabled with intra-slot hopping. The wireless device may determine a third quantity of DMRS symbols of a second hop of the second PUCCH enabled with the intra-slot hopping. The wireless device may determine the first quantity, the second quantity, and the third quantity based on a PUCCH length. The wireless device may determine one OFDM symbol for DMRS transmission of a PUCCH transmission with a PUCCH length of four, for example, based on the intra-slot hopping being disabled. An indicator/index of an OFDM symbol comprising the DMRS may be determined relative to a starting OFDM symbol of the PUCCH transmission and a first duration/length of the PUCCH transmission in a slot. The wireless device may determine two OFDM symbols for DMRS transmission of a second PUCCH transmission, for example, based on intra-slot hopping being enabled. A first indicator/index of a first OFDM symbol, of a first hop (e.g., m=0), comprising a first DMRS and a second indicator/index of a second OFDM symbol, of a second hop (e.g., m=1), comprising a second DMRS may be determined relative to a starting OFDM symbol of the second PUCCH transmission and a second duration/length of the second PUCCH transmission in a second slot.

FIG. 21 shows an example table indicating positions of DMRS symbols and PUCCH length. The PUCCH length may be a transmission duration of a PUCCH transmission. The PUCCH length may correspond to a quantity of OFDM symbols of the PUCCH transmission. A PUCCH length (e.g., each PUCCH length) may be associated with corresponding parameters/values indicating quantities and positions of DMRS OFDM symbols within the PUCCH transmission. The parameters/values may comprise position(s) of first DMRS OFDM symbol(s) (e.g., DMRS position), if additional DMRS is configured, and positions of second DMRS OFDM symbol(s), if additional DMRS is not configured. The position(s) may further be based on whether intra-slot hopping is enabled. The wireless device may send a PUCCH transmission with a corresponding PUCCH length via consecutive OFDM symbols. The OFDM symbols may start from a starting OFDM symbol in a slot. The configuration parameters may comprise an indication of whether an additional DMRS pattern is used or not (e.g., additional DMRS or no additional DMRS as shown in FIG. 21). The wireless device may determine a first quantity of DMRS symbols as 1 and determine a DMRS symbol as a second OFDM symbol (e.g., a next OFDM symbol from the starting OFDM symbol), for example, if a PUCCH length is 4 and intra-slot hopping is disabled, regardless of whether additional DMRS is configured. The wireless device may determine to use two DMRS symbols, for example, if a PUCCH length is 4 and intra-slot hopping is enabled, regardless of whether additional DMRS is configured. A starting OFDM symbol may be a first DMRS symbol, of the two DMRS symbols, and a third OFDM symbol from the starting OFDM symbol may be a second DMRS symbol, of the two DMRS symbols.

The wireless device may determine a quantity of DMRS symbols. The wireless device may determine a quantity of two DMRS symbols, for example, for a PUCCH length greater than 4 and if additional DMRS is not configured. For example, for a PUCCH length of 9 OFDM symbols, a second symbol of a PUCCH transmission may be a first DMRS symbol and seventh symbol of the PUCCH transmission may be a second DMRS symbol. The wireless device may determine two or four DMRS symbols, for example, for a PUCCH length greater than 4 and if additional DMRS is configured. The wireless device may determine four DMRS when a PUCCH length is greater than 9 OFDM symbols. The wireless device may determine a second symbol, a fourth symbol, a seventh symbol, and a ninth symbol of a PUCCH transmission as DMRS symbols, for example, if the PUCCH length is 10. The wireless device may determine positions of DMRS symbols of a PUCCH transmission based on the table shown in FIG. 21, for example, if the PUCCH transmission is based on a first PUCCH format (e.g., PUCCH format 3 or PUCCH format 4). The wireless device may determine to include a DMRS symbol in every two (or any other quantity of) symbols of a PUCCH transmission, for example, if the PUCCH transmission is based on a second PUCCH format (e.g., PUCCH format 1).

A base station may send/transmit configuration parameters. The configuration parameters may indicate a PUSCH mapping type (e.g., a PUSCH mapping type A or a PUSCH mapping type B). The PUSCH mapping type may be indicated in a time domain resource allocation entry (e.g., indicated by a time domain RA field) of scheduling DCI. The configuration parameters may comprise/indicate a first DMRS symbol for the PUSCH mapping type A (e.g., dmrs-TypeA-Position, $l_0$). The first DMRS symbol may be an earliest OFDM symbol that comprises a DMRS for a PUSCH transmission based on the PUSCH mapping type A. The wireless device may determine one or more DMRS symbols relative to an OFDM symbol 0 of a slot, for example, if a PUSCH transmission is scheduled (or configured/indicated), in the slot, with a PUSCH mapping type A. The wireless device may determine one or more second DMRS symbols relative to a starting OFDM symbol of a second PUSCH transmission, for example, if the second PUSCH transmission is scheduled (or configured/indicated) with the PUSCH mapping type B. The wireless device may determine the starting OFDM symbol of the second PUSCH transmission as a first DMRS symbol for the second PUSCH transmission.

A PUSCH transmission in a slot may be scheduled by DCI. The PUSCH transmission may be associated with a PUSCH duration (e.g., $l_d$). A PUSCH duration (e.g., $l_d$) may be determined between a starting OFDM symbol of a slot and an ending OFDM symbol of the slot. The configuration parameters may comprise/indicate a maximum length (e.g., maxLength) via a configuration parameter (e.g., DMRS-UplinkConfig). The wireless device may determine a single symbol DMRS pattern, for example, if the maximum length for a DMRS is not configured. The wireless device may determine a quantity of consecutive DMRS symbols based on scheduling DCI, for example, if the maximum length is configured. The configuration parameters may comprise/indicate a DMRS pattern (e.g., dmrs-AdditionalPosition). The wireless device may determine the DMRS pattern to be position 0 (e.g., pos0), for example, if the configuration parameters do not comprise the DMRS pattern. A third DMRS pattern (e.g., pos3) may be supported for the PUSCH mapping type A, for example, if an indicator/index of a first DMRS symbol is two.

FIG. 22 shows an example table indicating DMRS positions for a PUSCH. The table may correspond to an example in which intra-slot hopping is not enabled (e.g., configured/indicated). The table may be used for determining DMRS positions for PUSCH mapping type A and the PUSCH mapping type B, and for four DMRS patterns (e.g., dmrs-AdditionalPosition=0, 1, 2, 3).

A wireless device and/or a base station may determine a minimum PUSCH duration. The wireless device and/or the base station may determine a minimum PUSCH duration for a PUSCH transmission using a PUSCH mapping type. A minimum PUSCH duration for a PUSCH transmission using PUSCH mapping type A may be 4 OFDM symbols (or any other quantity of OFDM symbols). A DMRS position may be a starting OFDM symbol of a PUSCH transmission using PUSCH mapping type B, for example, if the PUSCH transmission is smaller than 5 OFDM symbols (or any other quantity of OFDM symbols). A DMRS position in a PUSCH transmission, corresponding to PUSCH mapping type A, may be determined based on a parameter (e.g., dmrs-TypeA-Position, $l_0$) as configured by the base station, for example, if a PUSCH duration ($l_d$) of the PUSCH transmission is between 4 and 7 (or any other range).

A PUSCH transmission may use PUSCH mapping type B and any DMRS pattern (e.g., dmrs-AdditionalPosition=0, 1, 2, or 3). A first DMRS position in the PUSCH transmission may be a staring OFDM symbol of the PUSCH transmission (e.g., shown as $l_0$ for PUSCH mapping type B), for example, if a PUSCH duration ($l_d$) of the PUSCH transmission is between 4 and 7 (or any other range). A fifth OFDM symbol of the PUSCH transmission may be determined as a second DMRS position, for example, if a PUSCH duration ($l_d$) of the PUSCH transmission is between 5 and 7 (or any other range) and if the DMRS pattern correspond to dmrs-AdditionalPosition 1, 2, or 3.

A PUSCH duration of a PUSCH transmission may be any quantity of OFDM symbols or any other duration. For example, a PUSCH duration of a PUSCH transmission may be 8 or 9 OFDM symbols. A first DMRS position of the PUSCH transmission may be indicated by a parameter (e.g., dmrs-TypeA-Position) if the PUSCH transmission is based on PUSCH mapping type A. A first DMRS position of the PUSCH transmission may be a starting OFDM symbol of the PUSCH transmission, for example, if the PUSCH transmission is based on PUSCH mapping type B. A second DMRS position may be determined as an 8th OFDM symbol in a slot, for example, if the PUSCH transmission is based on the PUSCH mapping type A with a DMRS pattern corresponding to dmrs-AdditionalPosition=1, 2, or 3. PUSCH transmissions based on PUSCH mapping type B and with different DMRS patterns may have different DMRS positions/symbols. For example, DMRS positions may correspond to a starting OFDM symbol, a 4th OFDM symbol and a 7th OFDM symbol in a PUSCH transmission.

FIG. 23 shows an example table specifying DMRS positions for a PUSCH. The table may correspond to an example in which intra-slot hopping is enabled for the PUSCH transmission. The table shows example DMRS positions for PUSCH mapping type A and for two different values of $l_0$ (e.g., $l_0=2$ or 3). A set of DMRS patterns (e.g., dmrs-AdditionalPosition=0 and 1) may be supported for the intra-slot hopping. A DMRS position for a first hop may represent a relative quantity of OFDM symbols from a starting OFDM symbol of the first hop. A second DMRS position for a second hop may represent a relative quantity of OFDM symbols from a second starting OFDM symbol of the second hop. For example, a duration per hop may be 4 if a PUSCH duration of the PUSCH transmission is 8. The second hop of the PUSCH transmission may start at a $5^{th}$ OFDM symbol of the PUSCH transmission, and a DMRS position of 0 in the second hop may represent the $5^{th}$ OFDM symbol (e.g., a first symbol from the starting OFDM symbol of the second hop). A first DMRS of a first hop of a PUSCH transmission based on the PUSCH mapping type A may be present in a $3^{rd}$ OFDM symbol from a starting OFDM symbol of a slot, for example, if a duration per hop is equal to 7. A second DMRS of a second hop of the PUSCH transmission may present in 8th OFDM symbol from the starting OFDM symbol of the slot, for example, if a first DMRS pattern is used (e.g., dmrs-AdditionalPosition=0). Additional DMRS symbol for each hop (e.g., $7^{th}$ OFDM symbol for the first hop, 5th OFDM symbol, from the starting symbol of the second hop, for the second hop) may be determined, for example, if a second DMRS pattern is used (e.g., dmrs-AdditionalPosition=1).

Figure 24:
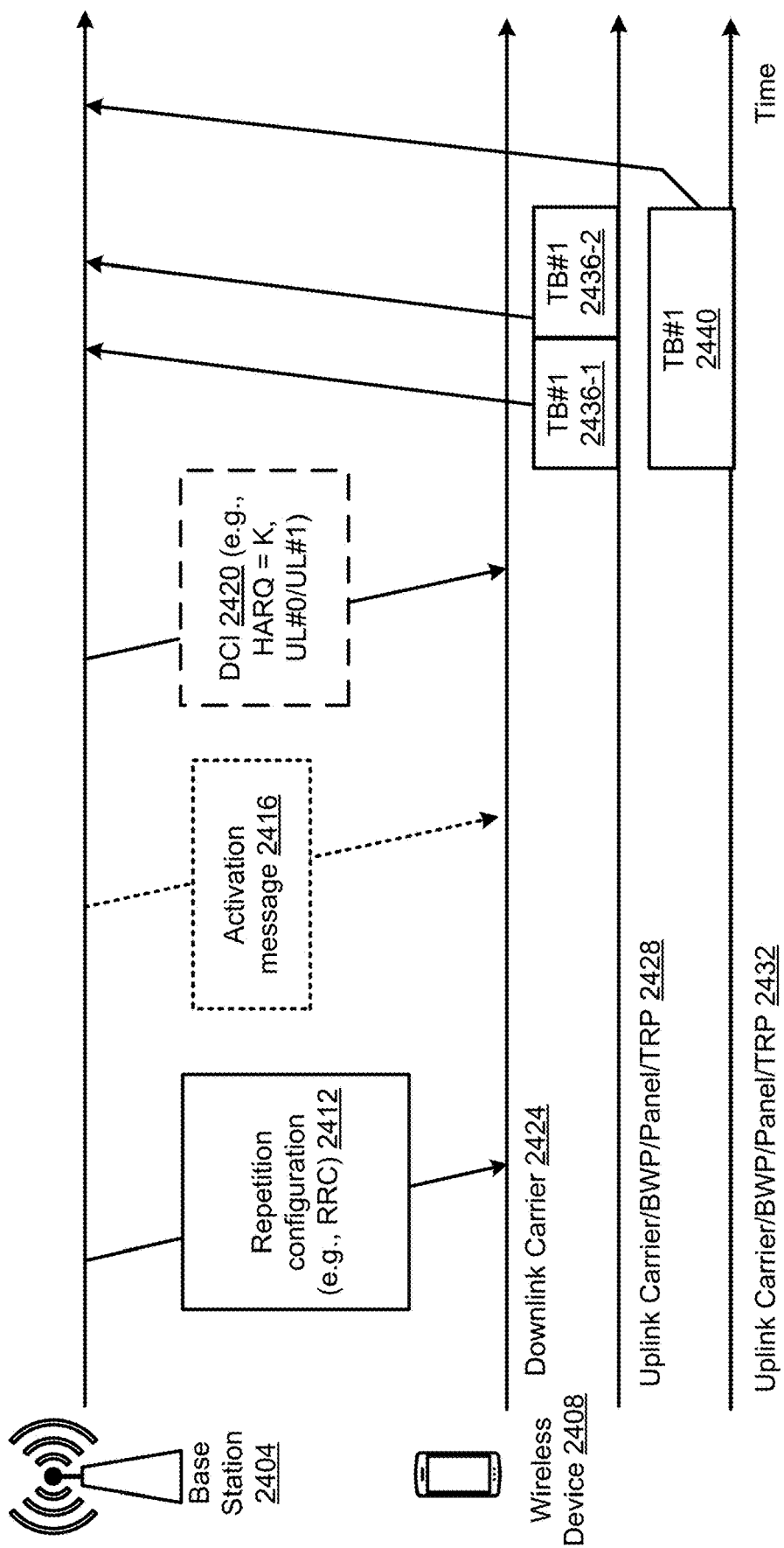
FIG. 24 shows an example communication between a base station and a wireless device using wireless resources.

FIG. 24 shows an example communication between a base station and a wireless device using wireless resources. The wireless resources may correspond resources scheduled via multiple carriers, spatial resources (e.g., beams), antenna panels, TRPs, BWPs, frequency/time resources, cells, and/or any other wireless resources. The base station and/or the wireless device may use different wireless resources, for example, for communicating via different TRPs. While FIG. 24 generally describes uplink transmissions via multiple (e.g., two) uplink carriers, a similar procedure may be applied for transmission via multiple spatial resources, antenna panels, TRPs, BWPs, frequency/time resources, cells, and/or any other wireless resources. A TRP may be represented as a CORESET pool. A panel may comprise a set of spatial resources or a set of reference signals of the set of spatial resources. A BWP may be associated with/configured with a TRP and/or a panel. A BWP may be associated with/configured with a plurality of TRPs and/or a plurality of panels.

The wireless device 2408 may send/transmit a transport block via a first uplink carrier (or a first uplink panel of an uplink carrier, a first uplink BWP of an uplink carrier, or a first TRP of an uplink carrier) and/or via a second uplink carrier (or a second uplink panel of the uplink carrier, a second uplink BWP of the uplink carrier, or a second TRP of the uplink carrier). The base station 2404 may configure a downlink carrier 2424 for the wireless device. The base station 2404 may configure a first uplink carrier 2428 and a second uplink carrier 2432. The downlink carrier 2424 and the first uplink carrier 2428 may be associated with a cell. The second uplink carrier 2432 may be associated with the cell. The first uplink carrier 2428 may be a non-supplemental uplink carrier and the second uplink carrier 2432 may be a supplemental uplink carrier of the cell. The first uplink carrier 2428 may be associated with a first uplink panel and/or a first TRP (e.g., a first CORESET pool, a first CORESET group) of the cell, and the second uplink carrier 2432 may be associated with a second uplink panel and/or a second TRP (e.g., a second CORESET pool, a second CORESET group) of the cell. The second uplink carrier 2432 may be same as the first uplink carrier 2428. The second uplink carrier 2432 may be different from the first uplink carrier 2428. The second uplink carrier 2432 may be associated with a second cell (e.g., different from the cell).

The base station 2404 may transmit one or more configuration messages 2412 (e.g., one or more RRC messages). The one or more RRC messages may comprise one or more configuration parameters indicating multi-carrier scheduling. DCI for multi-carrier scheduling may comprise resource assignments for a plurality of carriers/cells. The one or more RRC messages may comprise one or more second configuration parameters indicating multi-BWP scheduling (e.g., an uplink signal transmission via a plurality of uplink BWPs of an uplink carrier or a downlink signal transmission via a plurality of downlink BWPs of a downlink carrier). The one or more RRC messages may comprise one or more third configuration parameters indicating multi-panel scheduling (e.g., an uplink signal transmission via a plurality of panels/TRPs of an uplink carrier, or a downlink signal transmission via a plurality of TRPs of a downlink carrier). Various examples described herein with respect to multi-carrier scheduling may be used for multi-BWP scheduling, multi-TRP scheduling and/or multi-panel/TRP scheduling. The base station may indicate configuration parameters for a repetition of an uplink signal via a plurality of resources (e.g., multiple carriers, multiple BWPs, multiple panels, and/or multiple TRPs).

The one or more configuration parameters may comprise/indicate one or more control resource sets (CORESETs) and/or one or more search spaces. The one or more CORESETs and/or one or more search spaces may be used to send DCI for multi-carrier scheduling. The one or more configuration parameters may comprise a RNTI that may be used for the multi-carrier DCI. The RNTI may be different from a C-RNTI. The base station 2404 may send/transmit one or more MAC CEs or one or more DCI messages to activate multi-carrier scheduling/repetition across multiple resources (e.g., activation message 2416). The one or more MAC CEs may comprise a MAC CE activating and/or deactivating one or more secondary cells. The base station 2404 may send/transmit one or more DCI messages indicating a BWP switching from a first BWP (e.g., an active BWP of the cell) to a second BWP of a cell. The first BWP may not comprise one or more CORESETs of the multi-carrier scheduling. The second BWP may comprise one or more second CORESETs for the multi-carrier scheduling. The one or more MAC CEs may comprise indication(s) for activating and/or deactivating multi-carrier scheduling of a cell of one or more cells. The one or more DCI messages may comprise an indication to activate or deactivate multi-carrier scheduling of a cell of one or more cells.

The wireless device 2408 may activate multi-carrier scheduling. The wireless device 2408 may activate multi-carrier scheduling, for example, based on (e.g., in response to) receiving the one or more RRC messages. The one or more MAC CEs or the one or more DCIs may be optional (e.g., may or may not be transmitted/scheduled by the base station). The base station 2404 may reconfigure, via RRC signaling, deactivation or activation of multi-carrier (e.g., multi-TRP, multi-panel, multi-BWP) scheduling of a cell. The base station 2404 may send/transmit DCI 2420, for example, based on activating multi-carrier scheduling. The DCI 2420 may comprise a HARQ process indicator/identifier (e.g., HARQ=K) and resource assignments for the first uplink carrier 2428 and for the second uplink carrier 2432. The DCI 2420 may be CRC scrambled with the RNTI. The DCI 2420 may be transmitted via the one or more CORESETs and/or the one or more search spaces. The DCI 2420 may indicate two (or more) uplink resources for two (or more) repetitions of the TB via the first uplink carrier 2428. The DCI 2420 may indicate one uplink resource for a repetition of the TB via the second uplink carrier 2432. The base station 2404 may configure a first quantity of repetitions of the TB via the first uplink carrier 2428. The base station 2404 may configure a second quantity of repetitions of the TB via the second uplink carrier 2432. The wireless device 2408 may transmit the first quantity of repetitions of the TB via the first uplink carrier 2428. The wireless device 2408 may transmit the second quantity of repetitions of the TB via the second uplink carrier 2432.

The wireless device 2408 may send one or more PUSCH transmissions. The wireless device 2408 may send a first PUSCH transmission 2436-1 comprising the TB and a second PUSCH transmission 2436-2 comprising the TB via the first uplink carrier 2428. The wireless device 2408 may send a third PUSCH transmission 2440 comprising the TB via the second uplink carrier 2432. The first PUSCH transmission 2346-1 may comprise a first RV of the TB. The second PUSCH transmission 2436-2 may comprise a second RV of the TB. The third PUSCH transmission 2440 may comprise a third RV of the RB. The first PUSCH transmission 2436-1 and the second PUSCH transmission 2436-2 may be sent with inter-slot hopping enabled. A first starting PRB of the first PUSCH transmission 2436-1 may be different from a second starting PRB of the second PUSCH transmission 2436-2, for example, based on inter-slot hopping. The wireless device 2408 may determine the first starting PRB of the first PUSCH transmission 2436-1 based on a frequency domain resource assignment field of the DCI 2420. The wireless device 2408 may determine the second starting PRB of the second PUSCH transmission 2436-2 based on the first starting PRB and a frequency hopping offset. The configuration parameters may comprise the frequency hopping offset.

The DCI 2420 may comprise one or more frequency domain resource assignment fields. The DCI 2420 may comprise a first frequency domain resource assignment field and a second frequency domain resource assignment field. The first frequency domain resource assignment field may indicate first resource(s) of the first uplink carrier 2428 in frequency domain. The second frequency domain resource assignment field may indicate a second resource of the second uplink carrier 2432 in frequency domain. The first frequency domain resource assignment field may indicate an entry of one or more frequency domain resource allocation lists. The entry may comprise a first field indicating first resource(s) of the first uplink carrier 2428 and a second field indicating second resource(s) of the second uplink carrier

2432. An entry of the one or more frequency domain resource allocation lists may comprise a plurality of fields/sub-entries. Each field/sub-entry may correspond to an uplink carrier.

The DCI 2420 may comprise one or more time domain resource assignment fields. The DCI 2420 may comprise a first time domain resource assignment field and a second time domain resource assignment field. The first time domain resource assignment field may indicate first resource(s) of the first uplink carrier 2428 in time domain. The second time domain resource assignment field may indicate second resource(s) of the second uplink 2432 carrier in time domain. The first time domain resource assignment field may indicate an entry of one or more time domain resource allocation lists. The entry may comprise a first field indicating first resource(s) of the first uplink carrier 2428 and a second field indicating second resource(s) of the second uplink carrier 2432. An entry of the one or more time domain resource allocation lists may comprise a plurality of fields/sub-entries. Each field/sub-entry may correspond to an uplink carrier.

The DCI 2420 may comprise one or more frequency hopping fields. The DCI 2420 may comprise a first frequency hopping field and a second frequency hopping field. The wireless device 2408 may determine a first hopping pattern for the first uplink carrier 2428 based on the first frequency hoping field. The wireless device may determine a second hopping pattern for the second uplink carrier 2432 based on the second frequency hopping field. The DCI 2420 may comprise a frequency hopping field. The wireless device 2408 may determine whether to apply a first hopping pattern for the first uplink carrier 2428 based on the frequency hopping field. The configuration parameters may comprise the first hopping pattern for the first uplink carrier 2428 or for a PUSCH transmission via the first uplink carrier 2428. The wireless device 2408 may determine whether to apply a second hopping pattern for the second uplink carrier 2432 based on the frequency hopping field. The configuration parameters may comprise the second hopping pattern for the second uplink carrier 2432 or for a PUSCH transmission via the second uplink carrier 2432.

A wireless device (e.g., the wireless device 2408) may send/transmit (UCI via one or more first PUCCHs of a first uplink carrier (e.g., the first uplink carrier 2428) and one or more second PUCCHs of a second uplink carrier (e.g., the second uplink carrier 2432), in a similar manner to described with respect to FIG. 24. For example, the wireless device 2408 may transmit UCI via the plurality of uplink carriers instead of the TB. The wireless device may transmit a first PUCCH transmission (similar to 2436-1) comprising the UCI and a second PUCCH transmission (similar to 2436-2) comprising the UCI via the first uplink carrier 2428. The wireless device may transmit a third PUCCH transmission (similar to 2440) comprising the UCI via the second uplink carrier 2432.

A base station may configure one or more uplink carriers. The base station may configure at least an uplink carrier and a supplemental uplink carrier for a first cell. The base station may configure a downlink carrier associated with the first cell. The uplink carrier may be associated with the downlink carrier, for example, based on a paired uplink spectrum of the downlink carrier being the uplink carrier. An unpaired uplink spectrum of the downlink carrier may be the uplink carrier, for example, if TDD is used. The supplemental uplink carrier may be associated with a non-supplemental uplink carrier (e.g., a normal uplink carrier) of a second cell. The supplemental uplink carrier may be dedicated as the supplemental uplink carrier for the first cell. The dedicated supplemental uplink may not be associated with another cell as a non-supplemental uplink carrier. The supplemental uplink carrier may be an uplink spectrum of a paired spectrum or a second uplink spectrum of an unpaired spectrum. The supplemental uplink carrier may operate in a frequency region of a band (e.g., an LTE band, or a band corresponding to any other type of wireless communication). The supplemental uplink carrier may operate in a second frequency region of a second band (e.g., a new radio (NR) band, or a band corresponding to any other type of wireless communication).

A base station may configure a first uplink configuration (e.g., UplinkConfig). The first uplink configuration may comprise configuration parameters related to an uplink carrier. The first uplink configuration may be configured in a serving cell configuration (e.g., ServingCellConfig). The serving cell configuration may comprise configuration parameters associated with a cell. The serving cell configuration may comprise parameters associated with a downlink carrier and the uplink carrier. The base station may configure a second uplink configuration for a supplemental uplink carrier of the cell. The base station may configure a second uplink configuration, for example, if the supplemental uplink carrier is present. An uplink configuration may comprise parameters associated with an initial uplink BWP (e.g., initialUplinkBWP), one or more uplink BWPs, a BWP indicator/index of a first active uplink BWP for a secondary cell (e.g., firstActiveUplinkBWP-Id), configuration parameters related to PUSCH transmissions, configuration parameter(s) related to SRS carrier switching, bandwidth information of an uplink carrier based on a specific subcarrier spacing for each subcarrier spacing supported by the uplink carrier (e.g., a set of {uplink bandwidth, a subcarrier spacing}), a blind decoding scaling factor (e.g., bdFactorR), one or more CRS late matching patterns, one or more parameters related to uplink beams, etc. The base station may configure a first PUSCH configuration (e.g., pusch-ServingCellConfig) of the first uplink configuration for the uplink carrier. The base station may configure a second PUSCH configuration (e.g., pusch-ServingCellConfig) of the second uplink configuration for the second uplink carrier. A PUSCH configuration may comprise one or more configuration parameters. The one or more configuration parameters may comprise one or more of: an indication for enabling CBG transmission and/or configuration parameters related to CBG transmission (e.g., codeBlockGroupTransmission), an indication for enabling rate matching (e.g., indicating whether limitedBuffer rate matching is enabled or not), a quantity of resource elements of overhead in computing a transport block size (TBS) or a percentage of overhead in computing the TBS (e.g., xOverhead), a maximum quantity of MIMO layers, an indication for enabling fast processing time (e.g., processingType2Enabled), etc Each uplink BWP of the uplink carrier may comprise one or more configuration parameters for supporting PUCCH transmissions and/or PUSCH transmissions. The wireless device may share M HARQ processes (e.g., M=16, or any other quantity) between the uplink carrier and the supplemental uplink carrier of the first cell.

Multi-carrier DCI may comprise/indicate a first resource of the uplink carrier of the first cell and a second resource of the supplemental uplink carrier of the first cell. The wireless device may receive the multi-carrier DCI via a second cell. The second cell may be the same as the first cell or different from the first cell. The second cell may be the same as the first cell, for example, if self-carrier scheduling is enabled.

The second cell may be a scheduling cell for the first cell, for example, if cross-carrier scheduling is enabled. The wireless device may expect/determine that one or more configuration parameters related to PUSCH are commonly applied to the uplink carrier and the supplemental uplink carrier, for example, if the supplemental uplink carrier is the second carrier corresponding to multi-carrier scheduling for the first cell. The base station may configure one or more first parameters of the supplemental uplink carrier for a PUSCH transmission. The base station may configure one or more second parameters for a PUSCH transmission based on multi-carrier scheduling for the uplink carrier and the supplemental uplink carrier. The wireless device may receive first DCI comprising a resource assignment of the supplemental uplink carrier. The first DCI may schedule a first TB via a first PUSCH. The first DCI may schedule transmissions via a single cell. The wireless device may apply the one or more first parameters for the first PUSCH of the supplemental uplink carrier. The wireless device may receive second DCI comprising a first resource assignment of the uplink carrier and a second resource assignment of the supplemental uplink carrier. The second DCI may schedule a second TB via the second PUSCH(s). The wireless device may apply the one or more second parameters for the second PUSCH(s) of the supplemental uplink carrier.

A base station may send/transmit configuration parameters to a wireless device. The configuration parameters may indicate multi-carrier scheduling based on an uplink carrier and a supplemental uplink carrier. The base station may configure a first cell (e.g., Cell 1) and a second cell (e.g., Cell 2) for the wireless device. The first cell may comprise a first downlink carrier and a first uplink carrier. The first downlink carrier and the first uplink carrier may operate in an unpaired spectrum. The base station may operate a TDD in the unpaired spectrum between the first downlink carrier and the first uplink carrier. The uplink resources may be used for the first uplink carrier. The second cell may comprise a second downlink carrier and a second uplink carrier. The second downlink carrier and the second uplink carrier may operate in a paired spectrum. The second uplink carrier may have uplink resources in each slot. The second downlink carrier and the second uplink carrier may be used for FDD based on the paired spectrum. The base station may configure the second uplink carrier as a supplemental uplink carrier for the first cell. The second uplink carrier may be a normal uplink carrier of the second cell. The second uplink carrier may be the supplemental uplink carrier of the first cell. The wireless device may be configured with multi-carrier scheduling for the first cell. Multi-carrier DCI for multi-carrier scheduling may indicate a first resource of the first uplink carrier and a second resource of the second uplink carrier (e.g., the supplemental uplink carrier).

The base station may configure a first PUSCH configuration (e.g., first PUSCH-Config) for a first BWP of the first uplink carrier. The base station may configure a second PUSCH configuration (e.g., second PUSCH-Config) for a second BWP of the second uplink carrier as the normal uplink carrier of the second cell. The base station may configure a third PUSCH configuration (e.g., third PUSCH-Config) for the second BWP of the second uplink carrier as the supplemental uplink carrier of the first cell. The wireless device may receive first DCI based on multi-carrier scheduling. The first DCI may indicate a first resource of the first uplink carrier and a second resource of the second uplink carrier as the supplemental uplink carrier. The wireless device may apply the third PUSCH configuration for the supplemental uplink of the first cell, for example, for determining one or more DCI fields and/or one or more values indicated by the one or more DCI fields. The wireless device may receive second DCI based on a single carrier scheduling. The second DCI may comprise a third resource assignment of the second uplink carrier. The wireless device may apply the second PUSCH configuration for the second uplink carrier of the second cell, for example, for determining one or more second DCI fields and/or one or more second values indicated by the one or second more DCI fields.

The first DCI may be for scheduling uplink resources. The first DCI may comprise a DCI field comprising a BWP indicator/index. The first DCI may also comprise a DCI field comprising an UL/SUL indicator. The wireless device may apply one or more DCI fields of the first DCI for the first resource, for example, if the UL/SUL indicator indicates the first uplink carrier. The wireless device may apply the one or more DCI fields of the first DCI for the second resource, for example, if the UL/SUL indicator indicates the supplemental uplink carrier/the second uplink carrier. An RV field of the one or more DCI fields may indicate whether the indicated RV is mapped to the first resource or the second resource based on the UL/SUL indicator. The wireless device may apply the indicated BWP indicator/index for the first uplink carrier or the second uplink carrier (supplementary uplink carrier), for example, based on the UL/SUL indicator. The wireless device may apply a repetition of a scheduled TB for the second uplink carrier, for example, based on being configured with multi-carrier scheduling. The wireless device may apply the scheduled TB for the first uplink carrier, for example, based on the UL/SUL indicator indicating the first uplink carrier. The wireless device may apply a repetition of a scheduled TB for the first uplink carrier and apply the scheduled TB for the second uplink carrier, for example, based on being configured with multi-carrier scheduling and based on the UL/SUL indicator indicating the second uplink carrier.

A base station may configure one or more antenna/uplink panels. The base station may configure a first antenna/uplink panel and a second antenna/uplink panel. The first antenna/uplink panel and the second antenna/uplink panel may be associated with a first cell. The base station may configure multi-panel (or multi-carrier) scheduling. DCI may indicate a first resource of the first antenna/uplink panel and a second resource of the second antenna/uplink panel. The DCI may comprise a HARQ process indicator/identifier of a TB. The wireless device may send/transmit a first RV of the TB via the first uplink panel and a second RV of the TB via the second uplink panel. The wireless device may be configured with a first repetition number of the TB transmitted via the first antenna/uplink panel (e.g., based on RRC signaling, MAC CE and/or DCI signaling). The wireless device may be configured with a second repetition number of the TB transmitted via the second antenna/uplink panel (e.g., based on RRC signaling, MAC CE and/or DCI signaling). The wireless device may send/transmit one or more PUSCH transmissions comprising the TB (e.g., based on repetition) via the first antenna/uplink panel, for example, based on receiving the DCI. The wireless device may send/transmit one or more second PUSCH transmissions comprising the TB (e.g., based on repetition) via the second antenna/uplink panel.

A base station may configure one or more TRPs and/or any transmission and/or reception device. The base station may configure a first TRP and a second TRP. The first TRP and the second TRP may be associated with a second cell. The base station may configure multi-TRP (or multi-carrier)

scheduling. Second DCI may indicate a first resource associated with the first TRP and a second resource associated with the second TRP. The second DCI may comprise a HARQ process indicator/identifier of a transport block. The wireless device may receive a first RV of the TB via the first TRP and a second RV of the TB via the second TRP. The wireless device may be configured with a first repetition number of the TB received via the first TRP and/or a second repetition number of the TB received via the second TRP (e.g., based on RRC signaling, MAC CE and/or DCI signaling).

Figure 25:
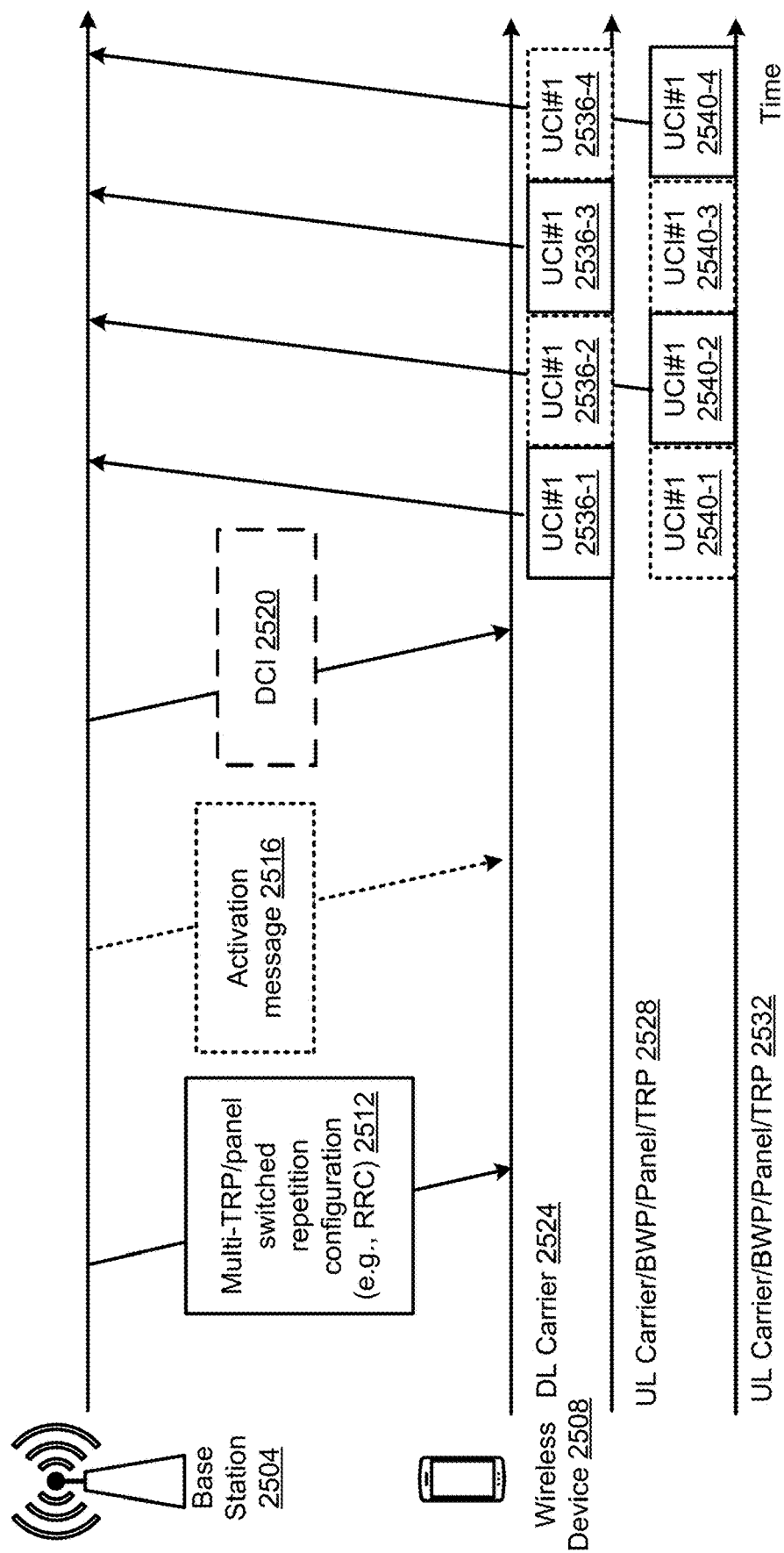
FIG. 25 shows an example communication between a base station and a wireless device using wireless resources.

FIG. 25 shows an example communication between a base station and a wireless device using wireless resources. The wireless resources may correspond to multiple carriers, spatial resources (e.g., beams), antenna panels, TRPs, BWPs, frequency/time resources, and/or cells. The base station and/or the wireless device may use different wireless resources, for example, for communicating via different TRPs. While FIG. 25 generally describes uplink transmissions via multiple (e.g., two) antenna panels, similar procedure may be applied for transmission (e.g., uplink, downlink, sidelink, and/or any other transmission) via multiple spatial resources, carriers, TRPs, BWPs, frequency/time resources, cells, and/or any other wireless resources.

A base station 2504 and a wireless device 2508 may perform one or more operations as described with respect to the base station 2404 and the wireless device 2408. One or more configuration messages 2512, an activation message 2516, and DCI 2520 may be similar to (or substantially the same as) the one or more configuration messages 2412, the activation message 2416, and the DCI 2420 as described with respect to FIG. 24.

The base station 2504 may configure multiple carrier and/or multi-panel scheduling (e.g., via multi-panel DCI with a repetition configuration) and/or a multi-TRP scheduling (e.g., via multi-TRP DCI with a repetition configuration). The base station 2504 may configure the multiple carrier/panel scheduling for transmissions via a first uplink panel 2528 (or a first uplink carrier, or a first uplink BWP of an uplink carrier) and a second uplink panel 2532 (or a second uplink carrier, or a second uplink BWP of the uplink carrier) of the wireless device 2508. As described herein, a panel and/or an uplink panel may refer to an antenna panel configured for transmission (e.g., uplink transmission and/or downlink transmission). The wireless device 2508 may have any other quantity of uplink panels. The base station 2504 may send/transmit the DCI 2520. The DCI 2520 may comprise a downlink resource assignment and parameters of an uplink transmission (e.g., a HARQ-ACK feedback). The DCI 2520 may indicate first resource(s) for transmissions via the first uplink panel 2528 and second resource(s) for transmissions via the second uplink panel 2532. The transmissions via the first uplink panel 2528 and the second uplink panel 2532 may comprise PUCCH transmissions (e.g., UCI comprising the HARQ-ACK feedback). The DCI 2520 and/or RRC signaling may indicate a first repetition number for transmissions via the first uplink panel and a second repetition number for transmissions via the second uplink panel. FIG. 25 shows two repetitions of UCI for the first uplink panel 2528 (e.g., UCI 2536-1 and UCI 2536-3) and two repetitions of UCI for the second uplink panel 2532 (e.g., UCI 2540-2 and UCI 2540-4). Any quantity of repetitions may be sent/received, and/or any quantity of panels (e.g., uplink panels, antenna panels, etc.) may be used. The wireless device may switch between the first uplink panel 2528 and the second uplink panel 2532 for the transmissions of UCI. A PUCCH transmission comprising UCI (e.g., UCI 2536-2, UCI 2536-4, UCI 2540-1, or UCI 2540-3) may be skipped, for example, if the wireless device 2508 switches between the first uplink panel 2528 and the second uplink panel 2532. The wireless device 2508 may switch between the first uplink panel 2528 and the second uplink panel 2532 for TDM transmission across the two panels. For example, the wireless device 2508 may transmit the UCI 2536 via the first uplink panel 2528, switch to the second uplink panel 2532, transmit the UCI 2540-2 via the second uplink panel 2532, and skip transmission of the UCI 2536-2 via the first antenna panel 2528.

The wireless device 2508 may simultaneously send uplink transmissions via the first antenna panel 2528 and the second antenna panel 2532 (e.g., without TDM). The DCI 2520 or the RRC signaling may indicate four repetitions (of the UCI) for both the first uplink panel 2528 and the second uplink panel 2532, for example, if the wireless device 2508 supports simultaneous transmissions via the first uplink panel 2528 and the second uplink panel 2532. The wireless device may send one or more PUCCH transmissions comprising the UCI (e.g., UCI 2536-2, UCI 2536-4, UCI 2540-1, or UCI 2540-3), for example, if the wireless device 2508 supports simultaneous transmission via the first uplink panel 2528 and the second uplink panel 2532. The wireless device 2508 may be indicated/configured with a first repetition number for transmissions via the first uplink panel and a second repetition number for transmissions via the second uplink panel. The first repetition number and the second repetition number may or may not be equal.

A wireless device (e.g., the wireless device 2508) may send/transmit repetitions of TBs via one or more first PUSCHs associated with a first uplink panel (e.g., the first uplink panel 2528) and via one or more second PUSCHs associated with a second uplink panel (e.g., the second uplink panel 2532), in a similar manner as described with respect to FIG. 25. The wireless device may transmit the TB via a plurality of uplink carriers and/or uplink panels (e.g., the first uplink panel 2528 and the second uplink panel 2532). Uplink transmissions as described herein may be performed across a plurality of cells, across a plurality of (uplink or downlink) carriers, across an uplink carrier and a supplemental uplink carrier, across a downlink carrier and a supplemental downlink carrier, a plurality of uplink panels, a plurality of TRPs, across a plurality of BWPs, etc.

A base station may send/transmit, to a wireless device, configuration parameters for an uplink transmission (e.g., PUCCH transmission). The configuration parameters may indicate one or more uplink resources (e.g., PUCCH resource sets) in an uplink BWP of a cell. The cell may be a primary cell. The base station may send/transmit second configuration parameters for the wireless device. The second configuration parameters may indicate one or more second uplink resources (e.g., second PUCCH resource sets) in a second uplink BWP. The uplink BWP may correspond to an uplink carrier of the cell. The second uplink BWP may correspond to a supplemental uplink carrier of the cell. The configuration parameters may comprise an indication of intra-slot hopping and/or an indication of inter-slot hopping. The configuration parameters may comprise an indication of intra-slot hopping and/or an indication of inter-slot hopping, for example, if transmission repetition (e.g., PUCCH repetition) is used. The wireless device may perform frequency hopping for the uplink transmission (e.g., PUCCH transmission) within a carrier, for example, based on the configuration parameters (e.g., as described with reference to FIGS. 19A and 19B). For example, the base station may indicate intra-slot hopping for the uplink BWP. The base station may indicate that hopping is not to be performed for the second uplink BWP. The base station may select an uplink resource (e.g., PUCCH resource) in either the uplink BWP or the second uplink BWP. The base station may indicate the selected uplink resource via RRC signaling, DCI, and/or MAC CEs. The wireless device may select an uplink resource (e.g., PUCCH resource) in either the uplink BWP or the second uplink BWP. The wireless device may select the uplink resource based on a RACH procedure, based on an initial access procedure, or based on an RSRP quality of a serving cell. An uplink transmission (e.g., a PUSCH transmission) may be sent based on frequency hopping within a carrier.

A wireless device may support a plurality of cells/carriers at a time. The wireless device may support communications via a first cell operating in a first frequency region (e.g., FR1, a frequency range below than 7 GHz, or any other first frequency range). The wireless device may support communications via a second cell operating in a second frequency region (e.g., FR2, a frequency of 7 GHz to 52.6 GHz, or any other second frequency range). The wireless device may support communications in different frequency regions by using different radio frequency equipment (RFE). The wireless device may use a first RFE, for the first frequency region and a second RFE for the second frequency region. The first RFE and the second RFE may operate independently. The first RFE and the second RFE may each have a corresponding dedicated power amplifier. The wireless device may determine a first power class for the first RFE or the first power class for the first frequency region. The wireless device may determine a second power class for the second RF or the second power class for the second frequency region. The wireless device may be configured with a first allowed power (e.g., a first maximum power) for the first RFE or the first frequency region. The wireless device may be configured with a second allowed power (e.g., a second maximum power) for the second RFE or the second frequency region. The wireless device may determine transmission power for one or more first uplink cells operating in the first frequency region based on the first allowed power. For example, a sum of transmission powers for transmissions via the one or more first uplink cells may not exceed the first allowed power. The wireless device may determine transmission power for one or more second uplink cells operating in the second frequency region based on the second allowed power. For example, a sum of transmission powers for transmissions via the one or more second uplink cells may not exceed the second allowed power. While the above example describes operation of the wireless device in two frequency regions, in other examples, the wireless device may be configured to operate in any other quantity of frequency regions.

A wireless device may send a first uplink transmission. The first uplink transmission may be via a cell operating in a first frequency region. The first uplink transmission may be via a first carrier. The first uplink transmission may be via a first uplink panel. A first transmission power of the first uplink transmission may be a first allowed power. The wireless device to send, simultaneously (or substantially simultaneously, in a same transmission, during a same transmission interval, etc.) with the first uplink transmission, a second uplink transmission. The second uplink transmission may be via a second cell operating in a second frequency region. A second transmission power of the second uplink transmission may be a second allowed power. The first uplink transmission may be via a first carrier. The first uplink transmission may be via a first uplink panel. Uplink transmissions via a plurality of cells (or carriers, TRPs, uplink panels) for may enable higher transmission powers thereby improving transmission reliability. Frequency hopping procedures as used for transmission via a single cell (or carrier/panel) may be enhanced to support transmissions via a plurality of cells (or carriers, panels, TRPs).

A base station may send/transmit one or more configuration messages (e.g., RRC messages). The one or more RRC messages may indicate a plurality of first uplink resources of a first uplink carrier (or a first uplink panel of an uplink carrier, or a first uplink BWP of an uplink carrier). The first uplink carrier (or first uplink panel, or first uplink BWP) may be for an uplink transmission (e.g., UCI, a TB). The one or more RRC messages may further indicate a plurality of second uplink resources of a second uplink carrier (or a second uplink panel of the uplink carrier, or a second uplink BWP of the uplink carrier). The first uplink carrier (or first uplink panel, or first uplink BWP) may be for an uplink transmission (e.g., the UCI, the TB). The one or more RRC messages may further indicate at least one hopping pattern (e.g., frequency hopping pattern) for the plurality of first uplink resources and the plurality of the second uplink resources. A wireless device may send an uplink transmission (e.g., the UCI or the TB) via the plurality of first uplink resources and the plurality of the second uplink resources.

The wireless device may send the uplink transmission based on the at least one hopping pattern. For example, the wireless device may send the uplink transmission via the first uplink carrier and the second uplink carrier. A first hop (e.g., first portion, first part) of the uplink transmission may be sent via the first uplink carrier and a second hop (e.g., second portion, second part) of the uplink transmission may be sent via the second uplink carrier. The at least one hopping pattern may comprise a first hopping pattern (e.g., intra-slot hopping) across the first uplink carrier and the second uplink carrier. The wireless device may send a first hop of the uplink transmission (via the first uplink carrier and send a second hop of the uplink transmission via the second uplink carrier.

The at least one hopping pattern may comprise a second hopping pattern. The second hopping pattern may comprise intra-slot hopping in the first uplink carrier, and an intra-slot hopping across the first uplink carrier and the second uplink carrier. The wireless device may send a first hop (e.g., first portion, first part) of the uplink transmission via the first uplink carrier, for example, based on the second hopping pattern. The wireless device may send a second hop (e.g., second portion, second part) of the uplink transmission via the first uplink carrier, for example, based on the second hopping pattern. The wireless device may send a third hop of the uplink transmission via the second uplink carrier, for example, based on the second hopping pattern. The uplink transmission may be a PUSCH transmission comprising a transport block. The uplink transmission may be a PUCCH transmission comprising UCI. The uplink transmission may comprise the first hop and the second hop, for example, based on an intra-slot hopping.

Various examples herein corresponding to hopping across a plurality of carriers may be extended/applied to a plurality of antenna panels (e.g., uplink panels) of a cell/carrier, a plurality of downlink carriers, a plurality of uplink carriers, a plurality of uplink BWPs of a carrier/cell, a plurality of downlink BWPs of a carrier/cell, a plurality of TRPs, a plurality of coreset pools, and/or a plurality of any wireless resources. For example, examples relating to a transmission via a carrier as described herein may be applied for a transmission via an uplink panel, an uplink carrier, a downlink carrier, a TRP, a coreset pool, an uplink BWP, and/or a downlink BWP. Various examples described herein may provide advantages such as enhanced transmission reliability (e.g., for an uplink transmission of a TB or a UCI), reduced latency of transmission repetition by enabling repetition via plurality of carriers (or BWPs, antenna panels, etc), and/or enhanced frequency diversity by mapping a transmission based on at least one frequency hopping pattern across the plurality of carriers (or BWPs, antenna panels, etc).

In at least some wireless communications, repetition of a message/transmission may result in increased transmission latency. Repetition of an uplink signal (e.g., of UCI or a TB) may be based on transmissions via a plurality of channels (e.g., PUCCHs, PUSCHs, etc.). For example, signals corresponding to each channel, of the plurality of channels, may be transmitted via a single slot. A plurality of slots may be needed to complete uplink signal repetition, for example, based on a single uplink single transmission in a slot. A higher latency (e.g., ≥2 ms latency, or any other latency duration) may be required for the repetition, for example, if a cell uses a small subcarrier spacing (e.g., 15 kHz, or any other frequency).

An uplink channel (e.g., PUCCH or PUSCH) transmission may be based on resources associated with a single beam, carrier, TRP, and/or a panel. A wireless device may send/transmit a plurality of uplink channel transmissions (e.g., a plurality of repetitions of an uplink signal), for transmission diversity, via resources associated with a plurality of beams, carriers, TRPs, and/or panels. A first uplink channel transmission, of the plurality of transmissions, may be associated with a first beam (or carrier, TRP, panel) of the plurality of beams (or carriers, TRPs, panels). A second uplink channel transmission, of the plurality of transmissions, may be associated with a second beam (or carrier, TRP, panel) of the plurality of beams (or carriers, TRPs, panels). In at least some wireless communications, a plurality of transmissions over a plurality of slots may be needed to transmit an uplink signal via a plurality of beams (or carriers, TRPs, panels). Sending the plurality of transmissions may increase latency. A complexity of the wireless device may also increase as the wireless device may need to support multiple transmissions via multiple beams.

An uplink channel (e.g., a PUCCH, a PUSCH) may be determined based on a resource (e.g., a PUCCH resource for the PUCCH, a time/frequency resource indicated by DCI for the PUSCH). A PUCCH resource may be configured, by a base station, based on a parameter (e.g., PUCCH-Resource shown in FIG. 20 or 26). The time/frequency resource of the PUSCH may be indicated by a frequency domain RA field (1712 in FIG. 17) and a time domain RA (1714 in FIG. 17) by a DCI. The wireless device may map uplink information (e.g., UCI, a transport block, a redundancy version of a transport block) via the PUCCH resource or the time/frequency resource of the PUSCH.

As described herein, a transmission (e.g., a PUCCH transmission, a PUSCH transmission, and/or any other transmission) may be sent via a first hop and a second hop in a slot (e.g., using intra-slot hopping) and/or across multiple slots (e.g., using inter-slot hopping), and/or in or across any other duration/period. As used herein, a hop may refer to a switch and/or adjustment to a different wireless resource (e.g., frequency, cell, carrier, beam, TRP, panel, etc.). A plurality of beams may be used for the transmission in the slot. A hop (e.g., each hop) may be mapped to a different beam. The use of different beams for transmission of different hops may enhance transmission diversity and improve reliability. A first beam of a first hop may be associated with a first CORESET pool (e.g., the first beam may be associated with a first TRP). A second beam of a second hop may be associated with a second CORESET pool (e.g., the second beam may be associated with a second TRP). The use of different CORESET pools may enhance reliability by enabling TRP diversity. Various examples described herein may enable a wireless device to send a single transmission via a plurality of wireless resources (e.g., TRPs, panels, beams, carriers, BWPs). Various examples described herein may reduce latency of uplink signal repetition via the plurality of wireless resources. Various examples described herein may reduce complexity of the wireless device, for example, by sending a single uplink channel transmission via a slot.

An uplink transmission (e.g., UCI, TB, etc.) may use be based on (e.g., may use) a hopping pattern (e.g., intra-slot or inter-slot). A hopping pattern may be applied for the uplink transmission via a single carrier (or TRP, panel). An uplink transmission may be repeated across a plurality of carriers (or TRPs, panels). A same resource mapping may be used for each carrier (or TRP, or panel) of the plurality of carriers (or TRPs, panels.) For example, a single hopping pattern may be applied for resources corresponding to the plurality of carriers. For example, inter-slot hopping may be applied across resources corresponding to the plurality of carriers, for example, if inter-slot hopping pattern is configured. The use of a single hopping pattern may not account for different subcarrier spacing associated with each carrier and/or different bandwidths of each carrier. The use of a single hopping pattern may reduce benefits associated with transmission diversity and may increase complexity of a wireless device. A wireless device (e.g., configured with inter-slot hopping), for transmission via resources associated with a carrier (e.g., or beam, TRP, panel), may not perform frequency hopping across consecutive slots of the carrier (e.g., or beam, TRP, panel). For example, the wireless device may perform inter-slot frequency hopping with beam switching across each slot of consecutive slots in which a repetition may occur, such that each slot maps to a different beam. Performing inter-slot frequency hopping with beam switching may not provide optimal transmission diversity.

Various examples described herein may enable different hopping patterns for different carriers. Various examples described herein may enable independent configuration/application of a hopping pattern for each wireless resource (e.g., carrier, TRP, panel, beam, BWP) of a plurality of wireless resources (e.g., carriers, TRPs, panels, beams, BWPs). For example, intra-slot hopping and/or inter-slot hopping may be configured independently for each wireless resource. A first hopping pattern may be configured for transmissions via a first wireless resource, and a second hopping pattern may be configured for transmissions via a second wireless resource. For example, inter-slot hopping may be applied for transmissions via the first wireless resource and inter-slot (or an intra-slot) hopping may be applied (e.g., independently applied) for transmissions via the second wireless resource. The transmissions via the first wireless resource and the second wireless resource may comprise repetitions (e.g., of UCI or a TB). Examples described herein may enable flexible hopping patterns regardless of transmission repetition via a single wireless resource or multiple wireless resources. Examples described herein may enable application of hopping patterns independently across resources associated with a single carrier (or beam, TRP, panel, CORESET pool) of a plurality of carriers (or beams, TRPs, panels, CORESET pools) for repetitions of an uplink signal.

A slot may be a time domain resource allocation unit. A time domain resource allocation unit may be a slot, a sub-slot (e.g., a slot may comprise a plurality of sub-slots, and a sub-slot may comprise a any quantity of symbols (e.g., 2 symbols, 7 symbols, or any other quantity of symbols)). A time domain resource allocation unit may comprise K slots. K may be determined based on time domain resources scheduled for an uplink signal/channel. Transmissions via an uplink channel may be sent via a single time domain resource allocation unit.

An uplink carrier may be referred as a carrier associated with a TRP, a BWP, a panel, a set of beams, and/or the like. A multi-carrier repetition may be referred as uplink signal transmission, via repetition, across a plurality of carriers (or TRPs, BWPs, panels, beams). A first uplink BWP may be determined to be or assumed as an active BWP for a first uplink carrier. A second uplink BWP may be determined to be or assumed as an active BWP for a second uplink carrier. A base station configuring one or more parameters for the first uplink carrier may comprise the base station configuring the one or more parameters for the first uplink BWP and/or an uplink BWP of one or more BWPs of the first uplink carrier. The base station configuring one or more parameters for the second uplink carrier may comprise the base station configuring the one or more second parameters for the second uplink BWP and/or an uplink BWP of one or more second BWPs of the second uplink carrier. An active BWP may be associated with a plurality of TRPs (or panels, CORESET pools).

A base station may send/transmit configuration parameters (e.g., via one or more RRC messages). The configuration parameters may indicate a plurality of carriers for a PUCCH transmission (e.g., UCI). The UCI via the PUCCH may be sent via the plurality of carriers. The plurality of carriers may be associated with a first cell. The configuration parameters may indicate a PUCCH-cell of the first cell for one or more serving cells. The base station may indicate a PUCCH SCell of a secondary cell for a second PUCCH transmission. A wireless device may send/transmit second UCI via the second PUCCH. The base station may indicate the PUCCH SCell as a PUCCH-cell for one or more second serving cells. The base station may transmit one or more second RRC messages comprising second configuration parameters. The second configuration parameters may indicate a second plurality of carriers for the second transmission. The second plurality of carriers may be associated with the PUCCH SCell. Various parameters/transmission schemes for the first cell may be applied to the PUCCH SCell. Various parameters/transmission schemes may be applied to a PUCCH cell, for example, regardless whether the PUCCH cell is a primary cell or a secondary cell. A wireless device may determine an uplink carrier of the first cell among the plurality of carriers. The wireless device may determine an unpaired uplink spectrum, of a downlink carrier of the first cell, as the uplink carrier. The wireless device may determine a carrier used for an initial access procedure or used for sending a most recent PRACH transmission, among the plurality of carriers, as the uplink carrier. The configuration parameters may comprise an indication of the uplink carrier of the plurality of uplink carriers for the first cell. The wireless device may determine one or more complementary/supplemental uplink (CUL) carriers of the plurality of uplink carriers. A CUL carrier may be different from the uplink carrier. A CUL carrier may be same as the uplink carrier. The CUL carrier may be associated with a different TRP (or panel, beam(s), BWP) than that of the uplink carrier. For example, a carrier associated with a first TRP (or a first panel, or first beam(s)) may be referred as a first uplink carrier (or an uplink carrier). The carrier associated with a second TRP (or a second panel, or second beam(s)) may be referred as a second uplink carrier (or a CUL/supplemental uplink carrier). The UL carrier and the CUL carrier may share an active BWP. The wireless device may determine a CUL carrier, from the plurality of uplink carriers, that is different from the uplink carrier. The plurality of uplink carriers may comprise a first uplink carrier, an uplink carrier of a first cell, and a second uplink carrier, a CUL carrier of the first cell.

The configuration parameters may comprise one or more PUCCH resource sets for an uplink BWP of the uplink carrier of the first cell. A PUCCH resource set may comprise one or more PUCCH resources. The base station may or may not send messages indicating parameters for a PUCCH transmission for a CUL carrier. The wireless device may determine one or more parameters for the PUCCH transmission via the CUL carrier. The wireless device may determine the one or more parameters for the PUCCH transmission based on the configuration parameters for the uplink carrier of the first cell. The base station may send/transmit messages indicating parameters for a second PUCCH transmission for the CUL carrier. The wireless device may determine one or more parameters for the second PUCCH transmission via the CUL carrier. The wireless device may determine one or more parameters for the second PUCCH transmission based on the configuration parameters for the uplink carrier of the first cell and the parameters for the second PUCCH transmission configured for the CUL carrier of the first cell. The base station may configure a first PUCCH resource set for the uplink carrier and a second PUCCH resource set for the CUL carrier. A first PUCCH resource of the first PUCCH resource set and a second PUCCH resource of the second PUCCH resource set may be jointly used for transmitting UCI. The base station may send/transmit message(s) comprising a first PUCCH configuration (e.g., PUCCH-Config) for the uplink carrier and/or the CUL carrier. The first PUCCH configuration may comprise, for the uplink carrier, a first set of PUCCH format configurations (e.g., PUCCH-FormatConfig), for a PUCCH format 0, a PUCCH format 1, a PUCCH format 2, a PUCCH format 3, and/or a PUCCH format 4. The first PUCCH configuration may comprise, for the CUL carrier, a second set of PUCCH format configurations (e.g., PUCCH-FormatConfig), for the PUCCH format 0, the PUCCH format 1, the PUCCH format 2, the PUCCH format 3, and/or the PUCCH format 4.

A base station may configure one or more hopping patterns. The base station may configure a first hopping pattern for the uplink carrier and/or a second hopping pattern for the CUL carrier. The base station may configure a first hopping pattern (e.g., interslotFrequencyHopping) for the uplink carrier and may not enable a second hopping pattern for the CUL carrier for a PUCCH format, for example, based on the first set of PUCCH format configurations and the second set of PUCCH format configurations. The base station may configure a first repetition number or a first quantity of slots for the uplink carrier and a second repetition number or a second quantity of slots for the CUL carrier. The base station may skip configuring one or more parameters of the second set of PUCCH format configurations. The wireless device may use the one or more parameters of the first set of PUCCH format configurations, for example, if the one or more parameters of the second set of PUCCH format configurations is skipped/omitted.

A base station may transmit RRC message(s) indicating/comprising a PUCCH configuration (e.g., PUCCH-Config) for an uplink carrier and/or a CUL carrier of a PUCCH cell. The PUCCH configuration may comprise one or more PUCCH resource sets. The PUCCH configuration may comprise one or more PUCCH resources. The PUCCH configuration may comprise parameters of a PUCCH format 1, a PUCCH format 2, a PUCCH format 2, a PUCCH format 3, and a PUCCH format 4. The PUCCH configuration may comprise a first set of spatial relation information (e.g., first PUCCH-SpatialRelationInfo in PUCCH-Config in the PUCCH configuration) for the uplink carrier. The PUCCH configuration may comprise a second set of spatial relation information (e.g., second PUCCH-SpatialRelationInfo in PUCCH-Config in the PUCCH configuration) for the CUL carrier. The PUCCH configuration may comprise a first PUCCH power control parameter (e.g., pucch-PowerControl). The PUCCH configuration may comprise a second PUCCH power control parameter (e.g., pucch-PowerControl). The PUCCH configuration may comprise up to eight (or any other quantity of) scheduling offsets between a PDSCH and a PUCCH (e.g., dl-DataToUL-ACK). The base station may configure a first numerology for the uplink carrier. The base station may configure a second numerology for the CUL carrier. The first numerology may be same as or different from the second numerology. The base station may activate (e.g., via a MAC CE) a first spatial domain filter parameter of the first PUCCH-SpatialRelationInfo and a second spatial domain filter parameter of the second PUCCH-SpatialRelationInfo for a PUCCH resource.

A PUCCH resource of the one or more PUCCH resources may comprise or be associated with at least one of: an indicator/identifier (e.g., a pucch-ResourceId), a first starting PRB of a first active uplink BWP of the uplink carrier, and/or an indication for intra-slot hopping for the first active uplink BWP and a first ending PRB of the first active uplink BWP. The PUCCH resource may further comprise or be associated with at least one of: a second starting PRB of a second active uplink BWP of the CUL carrier, and/or a second indication for intra-slot hopping for the second active uplink BWP and a second ending PRB of the second active uplink BWP. The PUCCH resource may correspond to a first PUCCH format (e.g., one of a PUCCH format 0, a PUCCH format 1, a PUCCH format 2, a PUCCH format 3, and a PUCCH format 4). The PUCCH resource may correspond to a second PUCCH format (e.g., one of the PUCCH format 0, the PUCCH format 1, the PUCCH format 2, the PUCCH format 3, and the PUCCH format 4). The first PUCCH format and the second PUCCH format may be same (e.g., a PUCCH format 0, 1, 2, 3, or 4). One or more first parameters of the first PUCCH format may be same as/different from one or more second parameters of the second PUCCH format.

FIG. 26 shows example configuration parameters of a PUCCH resource. The PUCCH resource may comprise one or more first parameters for a first uplink carrier (e.g., startingPRB, intraSlotFrequencyHopping, secondHopPRB, and format). The PUCCH resource may comprise one or more second parameters for a second uplink carrier (e.g., CUL-startingPRB, CUL-intraSlotFrequencyHopping, CUL-secondHopPRB, and CUL-format). The second uplink carrier may comprise a CUL carrier. The wireless device may send/transmit UCI via one or more PUCCHs of the first uplink carrier and via one or more second PUCCHs of the second uplink carrier. The base station may send/transmit message(s) indicating a multi-slot transmission (e.g., over K slots) and enabling an inter-slot frequency hopping for a PUCCH transmission (e.g., corresponding to the PUCCH format 3). The wireless device may send/transmit the UCI via the one or more first PUCCHs and the one or more second PUCCHs based on the PUCCH format 3. The wireless device may send the UCI via K first PUCCHs of the first uplink carrier. The wireless device may send the UCI via K second PUCCHs of the second UL carrier. The wireless device may send the UCI via the K first PUCCHs and the K second PUCCHs, for example, if the wireless device supports simultaneous PUCCH transmissions via the first uplink carrier and the second uplink carrier. The wireless device may send the UCI via a first quantity (e.g., floor(K/2)) of first PUCCHs of the first uplink carrier and send the UCI via a second quantity (e.g., K−floor (K/2)) second PUCCHs of the second uplink carrier, for example, if the wireless device does not support simultaneous transmission PUCCH transmissions via the first uplink carrier and the second uplink carrier. A first numerology of a first active uplink BWP of the first uplink carrier may be the same as or different from a second numerology of a second active uplink BWP of the second uplink carrier.

The base station may enable intra-slot hopping for the first uplink carrier. The base station may or may not enable intra-slot hopping for the second uplink carrier. The base station may configure a first starting OFDM symbol for the first uplink carrier (e.g., a first startingSymbolIndex) via one or more parameters of a PUCCH format (e.g. PUCCH format 3). The base station may indicate a second starting OFDM symbol for the second uplink carrier (e.g., a second startingSymbolIndex). The first starting symbol index (e.g., startingSymbolIndex) may be different from the second starting symbol index (e.g., startingSymbolIndex), for example, if the wireless device does not support simultaneous transmission via the first uplink carrier and the second uplink carrier. The base station may configure a first PUCCH resource, for the PUCCH format, in the first uplink carrier. The base station may configure the first PUCCH resource that does not overlap with a second PUCCH resource, for the PUCCH format, in the second uplink carrier. The wireless device may send K first PUCCH transmissions via the first uplink carrier and K second PUCCH transmissions via the second uplink carrier, for example, if the first PUCCH resource does not overlap with the second PUCCH resource. The wireless device may perform intra-slot hopping (e.g., transmit a first hop and a second hop in a slot) for a PUCCH transmission of the K first PUCCH transmissions. The wireless device may not perform intra-slot hopping (e.g., may only transmit a first hop in a slot) for a PUCCH transmission of the K second PUCCH transmissions. The wireless device may determine a same starting PRB of a first hop of a first PUCCH transmission in each slot over the K transmissions, for example, based on being configured with inter-slot hopping. The wireless device may determine a starting PRB of a first hop of a second PUCCH transmission differently in each slot (e.g., based on a slot indicator/index), for example, based on being configured with the inter-slot hopping. The starting PRB of a first hop in an even slot may be determined based on the CUL starting PRB (e.g., CUL-startingPRB). The starting PRB of the first hop in an odd slot may be determined based on the CUL second hop PRB (e.g., CUL-secondHopPRB). The wireless device may use different frequency locations of the second PUCCH transmissions over different slots and/or other durations/periods.

A base station may send message(s) comprising configuration parameters for one or more PUCCH configurations. The base station may send message(s) comprising configuration parameters for first configuration parameters for a first PUCCH configuration (e.g., a first PUCCH-Config). The first PUCCH configuration may be for a first uplink carrier associated with a first PUCCH cell. The base station may send/transmit second message(s) comprising second configuration parameters for a second PUCCH configuration (e.g., a second PUCCH-Config). The second PUCCH configuration may be for a second uplink carrier associated with the first PUCCH cell. A PUCCH configuration may comprise one or more PUCCH resource sets and one or more PUCCH resources. A wireless device may determine a first PUCCH resource, in a first slot, of the first uplink carrier. The first PUCCH resource may be among one or more first PUCCH resources indicated by the first PUCCH configuration. The wireless device may determine a second PUCCH resource, in a second slot, of the second uplink carrier. The second PUCCH resource may be among one or more second PUCCH resources indicated by the second PUCCH configuration. The wireless device may determine the first PUCCH resource based on a DCI field (e.g., PUCCH resource indicator, PUCCH RI, PRI) of scheduling DCI. The scheduling DCI may comprise resource assignment(s) for downlink data. The wireless device may determine the first PUCCH resource based on the scheduling DCI (e.g., based on a CCE indicator/index of a CCE via which the DCI has been transmitted). The wireless device may determine the second PUCCH resource based on a first indicator/index of the first PUCCH resource and a second indicator/index of the second PUCCH resource. The first index may be same as the second index. The second index may be a sum of the first index and an offset. The base station may configure the offset via RRC signaling. The second index may be determined based on a rule and the first index. The base station may send/transmit messages indicating a mapping between one or more first indices of the one or more first PUCCH resources and one or more second indices of the one or more second PUCCH resources. The wireless device may determine the second PUCCH resource based on the mapping.

A base station may send/transmit DCI comprising resource assignment(s) for downlink data. The DCI may comprise a PUCCH resource indicator (e.g., PRI), a PUCCH scheduling offset (e.g., PDSCH-to-HARQ offset), and a TPC command. The base station may send/transmit one or more RRC messages comprising configuration parameters. The first configuration parameters may comprise a first PUCCH configuration (e.g., first PUCCH-Config) for a first uplink carrier. The base station may transmit one or more second RRC messages comprising second configuration parameters. The second configuration parameters may comprise a second PUCCH configuration (e.g., PUCCH-Config) for a second uplink carrier. The first PUCCH configuration may comprise/indicate one or more PUCCH resources. The second PUCCH configuration may comprise/indicate one or more second PUCCH resources. The wireless device may determine a first slot, for a first PUCCH transmission, based on a first numerology of the first uplink carrier and the PUCCH scheduling offset K (e.g., PDSCH-to-HARQ offset=K) indicated by the DCI. The first PUCCH transmission may be via the first uplink carrier and may be based on the DCI. The wireless device may determine, based on the first numerology, a slot (n−K) in which the wireless device receives the DCI. The wireless device may determine the slot n as the first slot for the first uplink carrier. The wireless device may determine a second slot, for a second PUCCH transmission, based on a second numerology and the PUCCH scheduling offset. The second PUCCH transmission may be via the second uplink carrier and may be based on the DCI. The wireless device may determine, based on the second numerology, a slot (m−K) in which the wireless device receives the DCI. The wireless device may determine the slot m as the second slot for the second uplink carrier. For example, the first numerology may be 15 kHz with K=2. The wireless device may receive the DCI at a slot N of a downlink carrier with a 15 kHz subcarrier spacing. The wireless device may transmit the first PUCCH transmission via the slot N+2 of the first uplink carrier. For example, the second numerology may be 60 kHz. The wireless device may receive the DCI at the slot M, wherein slot M and a first symbol of the slot N overlap. The wireless device may transmit the second PUCCH transmission via the slot M+2. The wireless device may transmit the second PUCCH transmission earlier than the first PUCCH transmission based on one or more numerologies (e.g., the example numerologies).

The wireless device may determine a slot of a first PUCCH transmission via the first uplink carrier and a second PUCCH transmission via the second uplink carrier. The wireless device may determine the slot of a first PUCCH transmission and the second PUCCH transmission based on a selected numerology of the first numerology of the first uplink carrier and the second numerology of the second uplink carrier. the selected numerology may correspond to a larger numerology in terms of a subcarrier spacing. The selected numerology may correspond to a smaller numerology in terms of a subcarrier spacing. The selected numerology may be the first numerology, for example, if the first uplink carrier is not a CUL carrier. The selected numerology may be the second numerology, for example, if the second uplink carrier is not a CUL carrier. The wireless device may determine a first slot, for the first uplink carrier, that overlaps the determined slot and which is an earliest slot among one or more slots that overlap the determined slot. The wireless device may determine a second slot, for the second uplink carrier, that overlaps the determined slot and which is an earliest slot among one or more slots that overlap the determined slot. The wireless device may determine a quantity of slots, as measured from the first slot for the first uplink carrier, for example, based on being configured with multi-slot transmission/repetition for the first PUCCH transmission. The wireless device may determine a quantity of slots, as measured from the second slot for the second uplink carrier, based on being configured with multi-slot transmission/repetition for the second PUCCH transmission.

The wireless device may determine a PUCCH resource set of one or more first PUCCH resource sets of the first PUCCH configuration. The wireless device may determine the PUCCH resource set based on a quantity of bits in UCI corresponding to the DCI. The wireless device may determine a second PUCCH resource set of one or more second PUCCH resource sets of the second PUCCH configuration. The wireless device may determine the second PUCCH resource set based on an indicator/index of the first PUCCH resource set. An indicator/index of the second PUCCH resource set may be same as the indicator/index of the first PUCCH resource set. The base station may configure a mapping between one of the one or more first PUCCH resource sets and one of the one or more second PUCCH resource sets. The wireless device may determine the second PUCCH resource set based on the mapping and the first PUCCH resource set. The wireless device may determine the second PUCCH resource set based on the quantity of bits in the UCI and the second PUCCH configuration. The base station may configure the first PUCCH configuration and the second PUCCH configuration such that a same bit size of UCI may select a same PUCCH format. The wireless device may determine the first PUCCH resource and the second PUCCH resource based on the selected first PUCCH resource set and the selected second PUCCH resource set, in accordance with various examples described herein.

A base station may send/transmit one or more RRC messages. The one or more RRC messages may comprise/indicate one or more configured grant resource configurations for single-carrier scheduling. A configured grant resource configuration (e.g., ConfiguredGrantConfig) may comprise at least one of: a frequency hopping pattern (e.g., no hopping, intra-slot hopping, or inter-slot hopping), a DMRS pattern, an MCS table (e.g., mcs-Table), a resource allocation type, a rbg-Size, a power control process indicator/index, a p0 value for power control (e.g., p0-PUSCH-Alpha), a quantity of HARQ processes, an RV pattern, and/or a periodicity. The base station may send/transmit activation DCI to schedule frequency resources and a time offset within an interval indicated by the periodicity. A base station may transmit one or more RRC messages comprising/indicating one or more configured grant resource configurations. A configured grant resource configuration may comprise/indicate a first frequency hopping pattern for a first uplink carrier and a second frequency hopping pattern for a second uplink carrier. The wireless device may apply the first hopping pattern for one or more PUSCH transmissions via the first uplink carrier. The wireless device may apply the second hopping pattern for the one or more second PUSCH transmissions via the second uplink carrier. The one or more PUSCH transmissions via the first uplink carrier and the one or more second PUSCH transmissions via the second uplink carrier may comprise a TB (e.g., repetitions of the TB). The configured grant resource configuration may comprise/indicate a frequency hopping pattern. A wireless device may apply the frequency hopping pattern for transmissions via the first uplink carrier and the second uplink carrier. The configured grant resource configuration may comprise a first DMRS pattern for the one or more PUSCH transmissions via the first uplink carrier. The configured grant resource configuration may comprise a second DMRS pattern for the one or more second PUSCH transmissions via the second uplink carrier. The wireless device may send/transmit a first PUSCH transmission of the one or more PUSCH transmissions and a second PUSCH transmission of the one or more second PUSCH transmissions. The first PUSCH transmission may comprise a first RV of the TB and the second PUSCH transmission may comprise a second RV of the TB.

The configured grant resource configuration may comprise/indicate a resource allocation type. The resource allocation type may be applied to/used for the first uplink carrier and the second uplink carrier. The configured grant resource configuration may comprise/indicate one or more first power control parameters for the first uplink carrier. The configured grant resource configuration may comprise/indicate one or more second power control parameters for the second uplink carrier. The configured grant resource configuration may comprise/indicate a first repetition number for the first uplink carrier. The configured grant resource configuration may comprise/indicate a second repetition number for the second uplink carrier. The configured grant resource configuration may comprise/indicate a single repetition number for the first uplink carrier and the second uplink carrier. The configured grant resource configuration may comprise/indicate a periodicity. The wireless device may apply the periodicity based on a numerology. The numerology may be determined based on a first numerology of the first uplink carrier and a second numerology of the second uplink carrier. The first numerology may be a numerology of an active uplink BWP of the first uplink carrier. The numerology may be a larger numerology between the first numerology and the second numerology. The numerology is a smaller numerology between the first numerology and the second numerology. The wireless device may determine one or more first configured grant resources, for example, based on the configured grant resource configuration for the first uplink carrier, the periodicity, and the numerology. The wireless device may determine one or more second configured grant resources, for example, based on the configured grant resource configuration for the second uplink carrier, the periodicity and the numerology.

The configured grant resource configuration may comprise one or more parameters indicating the second uplink carrier. The configured grant resource configuration may comprise a cell indicator/index or a carrier indicator/index of the second uplink carrier. The configured grant resource configuration may comprise frequency information of the second uplink carrier. The configured grant resource configuration may comprise a BWP indicator/index of one or more uplink BWPs of the second uplink carrier and a cell/carrier indicator/index of the second uplink carrier. The configured grant resource configuration may comprise an indication to enable a CUL carrier (e.g., enableCUL). The base station may transmit messages indicating configuration parameters to configure the CUL carrier associated with the cell. The configured grant resource configuration may comprise an indication of simultaneous transmission or non-simultaneous transmission via the first uplink carrier and the second uplink carrier. The wireless device may send/transmit the one or more first PUSCH transmissions and the one or more second PUSCH transmissions via non-overlapped time resources, for example, based on being configured/indicated with the non-simultaneous transmission.

The configured grant resource configuration may comprise/indicate a switching pattern between the first uplink carrier and the second uplink carrier. The configured grant resource configuration may comprise/indicate the switching pattern based on the wireless device being configured/indicated with non-simultaneous transmission. The switching pattern may indicate an alternating pattern between the first uplink carrier and the second uplink carrier. The wireless device may send a PUSCH transmission in a first unit and via the first uplink carrier and a second PUSCH transmission in a second unit via the second uplink carrier, for example, based on the alternating pattern. A switching unit may be a PUSCH transmission in a slot. The switching pattern may indicate a half-divided pattern. The wireless device may transmit one or more first PUSCH transmissions via the first uplink carrier, for example, based on the half-divided pattern. A quantity of the one or more first PUSCH transmissions may be equal to floor(the single repetition number/2). The wireless device may transmit one or more second PUSCH transmissions via the second uplink carrier. A quantity of the one or more second PUSCH transmissions may be equal to (the single repetition number−floor(the single repetition number/2)). The configured grant resource configuration may comprise/indicate a first repetition RV pattern for the one or more first PUSCH transmissions. The configured grant resource configuration may comprise a second repetition RV pattern for the one or more second PUSCH transmissions. The configured grant resource configuration may comprise a repetition RV pattern for the one or more first PUSCH transmissions and the one or more second PUSCH transmissions.

A base station may transmit messages indicating/comprising configuration parameters. The configuration parameters may comprise a first configured grant resource configuration for a first uplink carrier. The configuration parameters may comprise a second configured grant resource configuration for a second uplink carrier. The base station may configure a mapping between the first configured grant resource configuration and the second configured grant resource configuration. A wireless device may determine a first configured grant (CG) resource of the first configured grant resource configuration and a second CG resource of the second configured grant resource configuration for transmitting a TB. The wireless device may send/transmit a first RV of the TB via the first CG resource and a second RV of the TB via the second CG. The wireless device may determine a first CG resource of the first configured grant resource configuration based on a logical channel (LCH) of data available at the wireless device (e.g., a MAC layer of the wireless device). The wireless device may determine a second CG resource of the second configured grant resource configuration based on the first CG resource. The wireless device may determine the second CG resource that overlaps in a time domain with the first CG resource. The configuration parameters may comprise one or more first configured grant resource configurations for the first uplink carrier. The configuration parameters may comprise one or more second configured grant resource configurations for the second uplink carrier. The wireless device may determine a first configured grant resource configuration of the one or more first configured grant resource configurations for transmitting the data. The wireless device may determine a second configured grant resource configuration of the one or more second configured grant resource configurations based on the first configured grant resource configuration. A first indicator/index of the first configured grant resource configuration may be same as a second indicator/index of the second configured grant resource configuration.

A base station may send/transmit one or more RRC messages. The one or more RRC messages may indicate/comprise configuration parameters for an uplink transmission. The uplink transmission may comprise a TB (e.g., a PUSCH transmission) or UCI (e.g., a PUCCH transmission). The configuration parameters may indicate/comprise a hopping pattern across a plurality of carriers. The hopping pattern may correspond to an uplink transmission via single slot and/or uplink transmission repetition via multiple slots. The hopping pattern may indicate inter-carrier hopping, and further indicate one of intra-slot hopping and inter-slot hopping. The hopping pattern for the single slot transmission may or may not indicate that hopping is to be performed. The wireless device may determine a first starting PRB of a first resource, of a first uplink carrier, based on one or more parameters indicated by the configuration parameters or a frequency domain resource assignment field indicated by scheduling DCI. The wireless device may determine a second starting PRB of a second resource, of a second uplink carrier, based on the one or more parameters indicated by the configuration parameters or the frequency domain resource assignment field indicated by the scheduling DCI. The wireless device may send/transmit a first part (e.g., a first hop) of a PUSCH transmission or a first part (e.g., a first hop) of a PUCCH transmission via the first resource of the first uplink carrier. The wireless device may send/transmit a second part (e.g., a second hop) of the PUSCH transmission or a second part (e.g., a second hop) of the PUCCH transmission via the second resource of the second uplink carrier. The wireless device may determine a transport block size (TBS) based on the first resource and the second resource. The wireless device may determine the TBS based on the first resource and the second resource, for example, if the wireless device is configured with non-simultaneous transmission via the first uplink carrier and the second uplink carrier. The wireless device may determine the TBS based on the first resource, for example, if simultaneous transmission is enabled/configured. The wireless device may determine a first duration of the first part (e.g., first portion, first hop) of the PUSCH transmission based on a duration (e.g., d1) indicated by a time domain resource assignment field of the scheduling DCI. The wireless device may determine a first duration of the first part of the PUCCH transmission based on a duration (e.g., d1) corresponding to a quantity of OFDM symbols (e.g., nrofSymbols) indicated by a PUCCH configuration (e.g., PUCCH-Config) or corresponding to a PUCCH resource. For example, the first duration may be equal to floor(d1). The wireless device may determine a second duration of the second part (e.g., second portion, second hop) of the PUSCH transmission or the PUCCH transmission based on the duration and the first duration (e.g., the second duration=the duration−the first duration).

FIG. 27A shows an example transmission via multiple carriers (or multiple TRPs, panels, BWPs, beams). The transmission may comprise an uplink transmission, a downlink transmission, a sidelink transmission, and/or any other transmission. The transmission may not have a hopping pattern. The uplink transmission may be based on switching pattern for transmissions via a first uplink carrier 2704 and a second uplink carrier 2708. The switching pattern may correspond to an alternating pattern of transmission via the first uplink carrier 2704 and the second uplink carrier 2708. The wireless device may send a first transmission 2706 (e.g., a PUSCH transmission or a PUCCH transmission) via a first slot of the first uplink carrier 2704. The wireless device may send a second transmission 2710 (e.g., a PUSCH transmission or a PUCCH transmission) via a second slot of the second uplink carrier 2708.

The wireless device may determine resources (e.g., PRBs) for the first transmission 2706 and the second transmission 2710 based on one or more configuration parameters. The wireless device may determine a first starting PRB of a PUSCH transmission in the first slot of the first uplink carrier 2704 based on a frequency domain resource assignment field indicated by scheduling DCI or parameters (e.g., startingPRB) for a PUCCH transmission. The wireless device may determine a second starting PRB of a second PUSCH transmission in a second slot of the second uplink carrier 2708 based on the frequency domain resource assignment field or parameters (e.g., CUL-startingPRB) for the PUCCH transmission.

While the above description generally relates to transmissions via multiple carriers, a similar procedure may be applied for transmission via multiple spatial resources, antenna panels, TRPs, BWPs, frequency/time resources, and/or cells. For example, the wireless device may send the first PUSCH transmission 2706 via a first uplink BWP of a carrier and send the second PUSCH transmission 2710 via a second uplink BWP of a carrier. The wireless device may send the first PUSCH transmission 2706 via a first antenna panel and send the second PUSCH transmission 2710 via a second antenna panel.

A hopping pattern for a single slot transmission may indicate intra-slot hopping. A hopping pattern for a single slot transmission may not indicate inter-carrier hopping. A wireless device may transmit a first PUSCH transmission (or first PUCCH transmission), of the one or more first PUSCH transmissions (or first PUCCH transmissions) via a slot. The wireless device may send the first PUSCH transmission (or first PUCCH transmission) in the slot via a first hop (e.g., first portion, first part) and a second hop (e.g., second portion, second part). A wireless device may determine one or more hops (e.g., first hop and second hop) of an uplink channel transmission based on a hopping pattern. As described herein, a hop may refer to a transmission adjustment/switching/changing/alternating of a wireless resource (e.g., frequency, carrier, etc.) based on one or more patterns (e.g., hopping patterns). A hop may correspond to an uplink channel transmission based on at least one of an inter-slot hopping pattern or inter-repetition hopping pattern. A hop may be a part of an uplink channel transmission based on one or more second hopping patterns (e.g., a hop may correspond to a first part of a PUCCH or a PUSCH based on an intra-slot hopping pattern, or intra-slot beam hopping pattern). Frequency/spatial domain resources of the hop may be same for a transmission duration of the hop. The wireless device may determine different frequency resources (e.g., based on frequency hopping) and/or spatial resources (e.g., based on beam hopping), for example, if the wireless device switches from a first hop to a second hop. The wireless device may determine a plurality of hops with each hop being associated with a corresponding frequency and spatial domain resource, for example, if the wireless device switches frequency and/or spatial resources during an uplink channel transmission). The frequency hopping pattern may comprise an intra-slot hopping and an inter-slot hopping, where the wireless device may change a first frequency location of a first hop to a second frequency location of a second hop based on the frequency hopping pattern. The beam hopping (or inter-carrier hopping) may comprise intra-slot hopping, inter-slot hopping, inter-slot beam hopping, intra-slot beam hopping, inter-slot carrier hopping, intra-slot carrier hopping, carrier hopping, etc. The wireless device may change a first beam (or a first carrier) of a first hop to a second beam (or a second carrier) of a second hop based on the beam hopping (or inter-carrier hopping).

FIG. 27B shows an example of transmission via multiple carriers (or TRPs, panels, BWPs, beams). The transmission may comprise an uplink transmission, a downlink transmission, a sidelink transmission, and/or any other transmission. A transmission via a single slot may comprise intra-slot hopping and may not comprise inter-carrier hopping. An uplink transmission may be via a first uplink carrier 2712 or a second uplink carrier 2716. The uplink transmission may correspond to a PUSCH transmission (e.g., at TB) or a PUCCH transmission (e.g., UCI). Wireless communications described with respect to FIG. 27 may be applied for uplink transmissions via a first uplink panel and a second uplink panel, or for uplink transmissions via a first uplink BWP and a second uplink BWP.

A base station may indicate one or more repetitions via one or more slots or other durations/periods. For example, the base station may indicate four repetitions (or any other quantity of repetitions) of a transmission via four (or any other quantity of) slots (e.g., a TB via one or more PUSCHs, or UCI via one or more PUCCHs). The wireless device may perform intra-slot hopping in each slot for a PUSCH transmission or a PUCCH transmission. The wireless device may perform intra-slot hopping for the PUSCH transmission or the PUCCH transmission within an uplink carrier (e.g., the uplink carrier 2712 or the uplink carrier 2716). For wireless device may transmit a first hop 2720 (e.g., first portion, first part) of the transmission (e.g., the PUSCH transmission or the PUCCH transmission) and a second hop 2724 (e.g., second portion, second part) of the transmission via a slot.

The wireless device may switch between the first uplink carrier 2712 and the second uplink carrier 2716 based on a hopping/switching pattern (e.g., inter-carrier hopping). The wireless device may switch/transition between a first hop via the first uplink carrier 2712 and a second hop via the second uplink carrier 2716 based on being configured with non-simultaneous transmission via the first uplink carrier 2712 and the second uplink carrier 2716. The wireless device may use an alternating pattern as the switching pattern between the first uplink carrier 2712 and the second uplink carrier 2716. The wireless device may transmit a first repetition of the transmission (e.g., the first hop 2720 and the second hop 2724) via a slot in the first uplink carrier 2712, and transmit a second repetition of the transmission via a next slot in the second uplink carrier 2716.

The wireless device may use other switching patterns for switching transmission between the first uplink carrier 2712 and the second uplink carrier 2716. The wireless device may transmit first two repetitions of the transmission via the first uplink carrier and next two repetitions of the transmission via the second uplink carrier. The configuration parameters may indicate the switching pattern, for example, if a repetition is configured for a configured grant transmission or for a PUSCH transmission. The base station may indicate a switching pattern in a configured grant configuration (e.g., via a plurality of carriers) with a repetition configured. The base station may indicate a switching pattern in a PUCCH configuration (e.g., PUCCH-Config) or in a PUCCH format indication (e.g., PUCCH-Format) for multi-slot PUCCH transmission via a plurality of carriers.

A hopping/switching pattern for a single slot transmission may indicate both intra-slot hopping and inter-carrier hopping. The wireless device may send/transmit a first hop of a transmission (e.g., a PUSCH transmission or a PUCCH transmission) via a first uplink carrier and send/transmit a second hop of the transmission via the second uplink carrier based on the hopping pattern, for example, if the wireless device is configured with non-simultaneous transmission. The hopping pattern may indicate carrier switching between the first hop of the transmission and the second hop of the transmission.

FIG. 28A shows an example of transmission using intra-slot hopping and inter-carrier hopping. The transmission may be via multiple carriers in a single slot. The transmission may be via multiple CORESET pools/TRPs/panels in a single slot. The base station may indicate one or more repetitions via one or more slots or other durations/periods. For example, the base station may indicate four (or any other quantity of) repetitions of a transmissions via four (or any other quantity of) slots (e.g., a TB via PUSCHs or UCI via PUCCHs). The wireless device may send/transmit a first hop (e.g., first portion, first part) 2820 of a first transmission (e.g., of repetitions of the transmissions) in a first slot via the first uplink carrier 2804. The wireless device may send/transmit a second hop (e.g., second portion, second part) 2824 of the first transmission in the first slot via the second uplink carrier 2808. The wireless device may determine a first starting PRB of the first hop 2820 based on a frequency resource assignment field indicated by scheduling DCI and/or parameters configured by the configuration parameters. The wireless device may determine a second starting PRB of the second hop 2824 based on the frequency resource assignment field and/or a frequency hopping offset configured by the configuration parameters. The configuration parameters may comprise/indicate the frequency hopping offset, for example, if intra-slot hopping is enabled/configured with inter-carrier hopping. The wireless device may determine the first starting PRB of a PUSCH (e.g., of the PUSCHs) or a PUCCH (e.g., of the PUCCHs) in a slot. The wireless device may send/transmit the first hop of a PUSCH transmission or a PUCCH transmission in a slot (e.g., first slot) of four slots. The wireless device may send/transmit the second hop of the PUSCH transmission or the PUCCH transmission in the slot of four slots. The wireless device may send repetitions of a transmission (e.g., the TB via PUSCHs or the UCI via PUCCHs) via the four slots, where each transmission of the repetitions of the transmissions may occur in each slot. Each transmission of the repetitions of the transmissions may comprise a first hop (e.g., a first portion, first part) of an uplink channel (e.g., a PUSCH of the PUSCHs or a PUCCH of the PUCCHs) in each slot.

FIG. 28B shows an example transmission using inter-slot hopping and inter-carrier hopping. A hopping pattern may indicate inter-slot hopping and inter-carrier hopping. The wireless device may not perform the intra-slot hopping in a slot based on the hopping pattern indicating inter-slot hopping. The wireless device may perform a frequency hopping (e.g., change from a first starting PRB to a second starting PRB, switch from a first hop to a second hop, etc.) across slots. The wireless device may perform an inter-carrier hopping. The wireless device may change between a first hop 2828 of the first uplink carrier 2812 and a second hop 2832 of the second uplink carrier 2816, for example, based on being configured (e.g., enabled, indicated) with inter-carrier hopping. The hopping pattern may indicate inter-slot hopping across a plurality of carriers. The wireless device may send the first hop 2828 in a slot via the first uplink carrier 2812 and send the second hop in a second slot via the second uplink carrier 2816.

A base station may indicate intra-slot hopping for multi-carrier scheduling and/or transmission (e.g., of a TB via a PUSCH and/or UCI via a PUCCH) via a first uplink carrier and a second uplink carrier. A wireless device may send/transmit a first hop of a transmission (e.g., a PUSCH transmission or a PUCCH transmission) in a slot via the first uplink carrier. The wireless device may send/transmit a second hop of the transmission in the slot via the second uplink carrier. The base station may or may not indicate enabling of an inter-carrier hopping. The wireless device may apply inter-carrier switching regardless of configuration of the inter-carrier hopping (e.g., regardless of whether or not inter-carrier hopping is configured). The base station may indicate inter-slot hopping with the multi-carrier scheduling/transmission (e.g., of the TB and/or the UCI). The wireless device may send/transmit a first hop (e.g., a first PUSCH transmission or a first PUCCH transmission) in a first slot via the first uplink carrier, for example, based on inter-slot hopping pattern with multi-carrier scheduling. The wireless device may send/transmit a second hop (e.g., a second PUSCH transmission or a second PUCCH transmission) in a second slot via the second uplink carrier, for example, based on inter-slot hopping pattern with multi-carrier scheduling. The second hop may be a repetition of the first hop. The wireless device may determine a starting PRB of the second hop transmission based on a frequency hopping offset. One or more parameters of a PUSCH configuration (e.g., PUSCH-Config) may comprise the frequency hopping offset. The wireless device may determine the starting PRB of the second hop transmission based on a parameter for the first uplink carrier (e.g., secondHopPRB) and/or a parameter for the second uplink carrier (e.g., CUL-secondHopPRB). One or more parameters of a PUCCH resource may comprise the parameters (e.g., secondHopPRB and/or the CUL-secondHopPRB).

The wireless device may send/transmit a transmission (e.g., a PUSCH transmission comprising a first hop and a second hop, or a PUCCH transmission comprising the first hop and the second hop) in a slot, for example, if the slot comprises sufficient uplink OFDM symbols for the transmission. A duration of transmission may be K symbols. A slot may be used for the transmission if the slot may have more than K uplink symbols that overlap with the first hop and the second hop. The wireless device may skip transmitting the first hop and the second hop in the slot, for example, if the slot does not have the sufficient quantity of uplink symbols. The wireless device may determine whether the first uplink carrier supports sufficient uplink symbols in the slot overlapping with the first hop. The wireless device may determine whether the second uplink carrier supports sufficient uplink symbols in the slot overlapping with the second hop. The wireless device may send the transmission via the slot, for example, based on determining that the first uplink carrier supports sufficient uplink symbols in the slot overlapping with the first hop and the second uplink carrier supports sufficient uplink symbols in the slot overlapping with the second hop. The wireless device may drop the transmission, for example, based on determining that the first uplink carrier does not support sufficient uplink symbols in the slot overlapping with the first hop and/or the second uplink carrier does not support sufficient uplink symbols in the slot overlapping with the second hop. The wireless device may send/transmit the first hop, for example, if the first uplink has sufficient uplink symbols in the slot for the first hop. The wireless device may send/transmit the second hop, for example, if the second uplink has sufficient uplink symbols in the slot for the second hop. The wireless device may transmit the first hop only, the second hop only, or both the first hop and the second hop in the slot. The wireless device may drop the transmission in the slot, for example, if an uplink carrier has insufficient uplink symbols. The wireless device may determine whether to transmit an uplink signal via an uplink carrier based on a slot formation information for the uplink carrier. The wireless device may transmit the uplink signal based on the uplink carrier providing sufficient uplink symbols in a slot. The wireless device may determine that the uplink carrier provides sufficient uplink symbols for the uplink signal in the slot, for example, based on the slot being configured/indicated with uplink symbols in a time duration that overlaps with a duration of the uplink signal. The wireless device may assume that the duration of the uplink signal may comprise consecutive (OFDM) symbols. Symbols mentioned herein may refer to OFDM symbols of a carrier and/or a BWP.

A base station may configure a hopping pattern, for example, if a wireless device supports simultaneous transmission via a first uplink carrier and a second uplink carrier, or if the wireless device is configured with simultaneous transmission via the first uplink carrier and the second uplink carrier. The wireless device may apply the configured hopping pattern for the first uplink carrier and the second uplink carrier, respectively. The wireless device may apply intra-slot hopping for a first transmission (e.g., a first PUSCH transmission or a first PUCCH transmission) via the first uplink carrier, for example, if intra-slot hopping is enabled. The wireless device may also apply intra-slot hoping for a second transmission (e.g., a second PUSCH transmission or a second PUCCH transmission) via the second uplink carrier.

A base station may send/transmit configuration parameters to a wireless device. The base station may send/transmit one or more RRC messages. The one or more RRC messages may comprise the configuration parameters. The configuration parameters may comprise/indicate a first hopping pattern for a first uplink carrier. The configuration parameters may comprise/indicate a second hopping pattern for a second uplink carrier. The configuration parameters may comprise/indicate an alternating switching pattern between the first uplink carrier and the second uplink carrier. The wireless device may apply the first hopping pattern for one or more transmissions (e.g., PUSCH transmission(s) or PUCCH transmission(s)) sent via the first uplink carrier. The wireless device may apply the second hopping pattern for one or more second transmissions (e.g., second PUSCH transmission(s) or second PUCCH transmission(s)) sent via the second uplink carrier. The first hopping pattern may indicate intra-slot hopping. The second hopping pattern may indicate inter-slot hopping. The configuration parameters may indicate a repetition number (e.g., 4, or any other quantity). The wireless device may apply the intra-slot hopping for a first transmission via a first slot and via the first uplink carrier. The wireless device may apply no intra-slot hopping for a second transmission via a second slot and via the second uplink carrier. The wireless device may apply the intra-slot hopping for a third transmission via a third slot and via the first uplink carrier. The wireless device may send the second transmission via the second slot and via the second uplink carrier. The wireless device may send a fourth transmission via a fourth slot and via the second uplink carrier. The wireless device may send the second transmission and the fourth transmission based on inter-slot hopping.

The configuration parameters may comprise at least a first resource of a first uplink carrier and a second resource of a second uplink carrier. The configuration parameters may configure multi-carrier scheduling for a transmission (e.g., a PUSCH transmission or a PUCCH transmission) via the first uplink carrier and the second uplink carrier. The configuration parameters may configure non-simultaneous transmission via the first uplink carrier and the second uplink carrier. The first resource may not overlap with the second resource. The wireless device may be configured with the first resource and the second resource in a same slot.

Figure 28C:
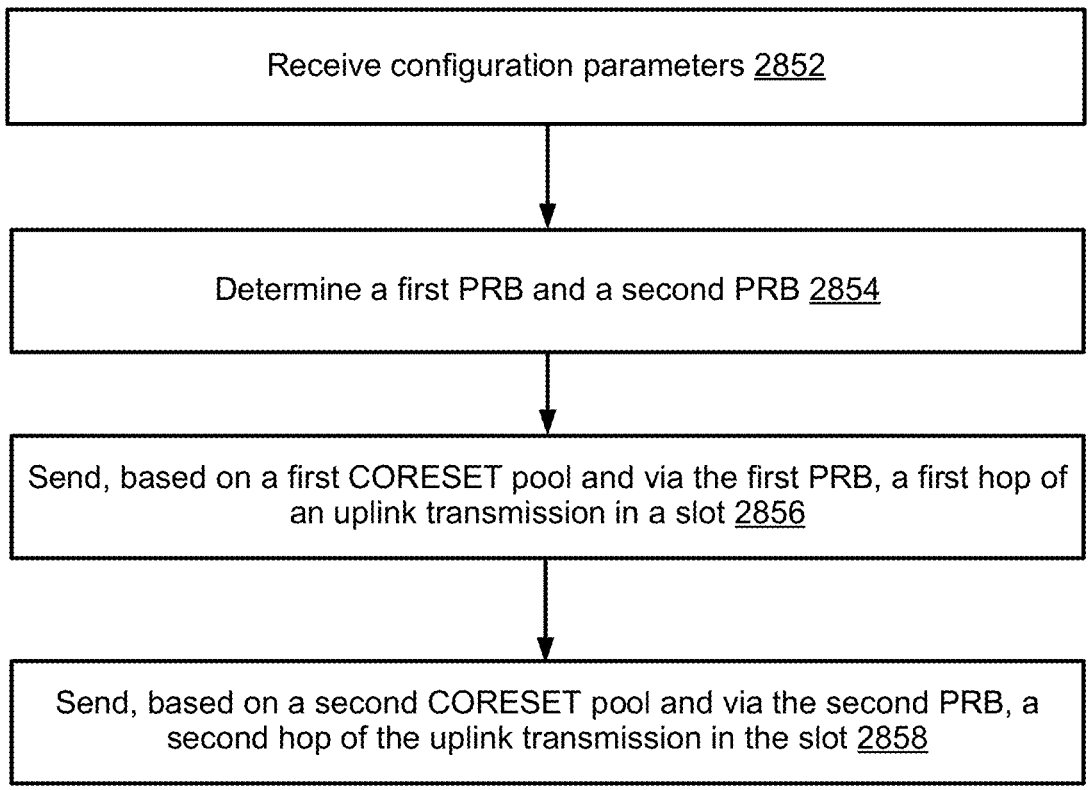
FIG. 28C shows an example method for transmission via multiple carriers.

FIG. 28C shows an example method for transmission via multiple carriers (or beams, TRPs, panels). FIG. 28C shows an example of repetitions of an uplink signal via resources (e.g., a first resource, a second resource) associated with a plurality of CORESET pools/TRPs. The first resource may be associated with a first CORESET pool, for example, if a first spatial domain filter parameter (e.g., first beam/spatial information) of first resources is based on a first reference signal of a first TRP. The second resource may be associated with a second CORESET pool, for example, if a second spatial domain filter parameter (e.g., second beam/spatial information) of second resources is based on a second reference signal of a second TRP. The example method may be performed by a wireless device (e.g., the wireless device 2408, the wireless device 2508, or any other wireless device described herein). At step 2852, the wireless device may receive configuration parameters for an uplink transmission. The configuration parameters may indicate a first PRB (e.g., first starting PRB) and a second PRB (e.g., second starting PRB) of an uplink resource (e.g., a PUCCH resource, a PUSCH resource). The configuration parameters may further indicate a hopping pattern. The hopping pattern may indicate intra-slot hopping and inter-carrier/beam hopping for single slot transmission. The wireless device may determine intra-slot hopping based on a parameter of the PUCCH resource (e.g., intraSlotFrequencyHopping being enabled shown in FIG. 20/26). The wireless device may determine that inter-carrier/beam hopping is enabled based on one or more parameters of the PUCCH resource. For example, the PUCCH resource may be configured with CUL-SecondHop-PRB (e.g., as shown in FIG. 26) that indicates that inter-carrier/beam hopping is enabled. The PUCCH resource may be configured with a plurality of spatial relation information parameters (e.g., beams). The wireless device may determine that inter-carrier/beam hopping is enabled, for example, based on the plurality of spatial relation information parameters. The PUCCH resource may be configured with a beam/carrier hopping pattern.

At step 2854, the wireless device may determine the first PRB and the second PRB based on the configuration parameters. At step 2856, the wireless device may send a first hop of the uplink transmission in a slot via the first PRB. The wireless device may send the first hop based on a first CORESET pool. At step 2858, the wireless device may send a second hop of the uplink transmission in the slot via the second PRB. The wireless device may send the second hop based on a second CORESET pool. The wireless device may send the first hop and the second hop in the slot based on the hopping pattern indicating intra-slot hopping. The wireless device may send the first hop based on the first CORESET pool and the second hop based on the second CORESET pool, for example, based on the hopping pattern indicating intra-carrier/beam hopping. The first CORESET pool may be associated with a first uplink carrier, a first uplink BWP, a first TRP and/or a first cell, etc. The second CORESET pool may be associated with a second uplink carrier, a second uplink BWP, a second TRP and/or second cell.

Figure 29A:
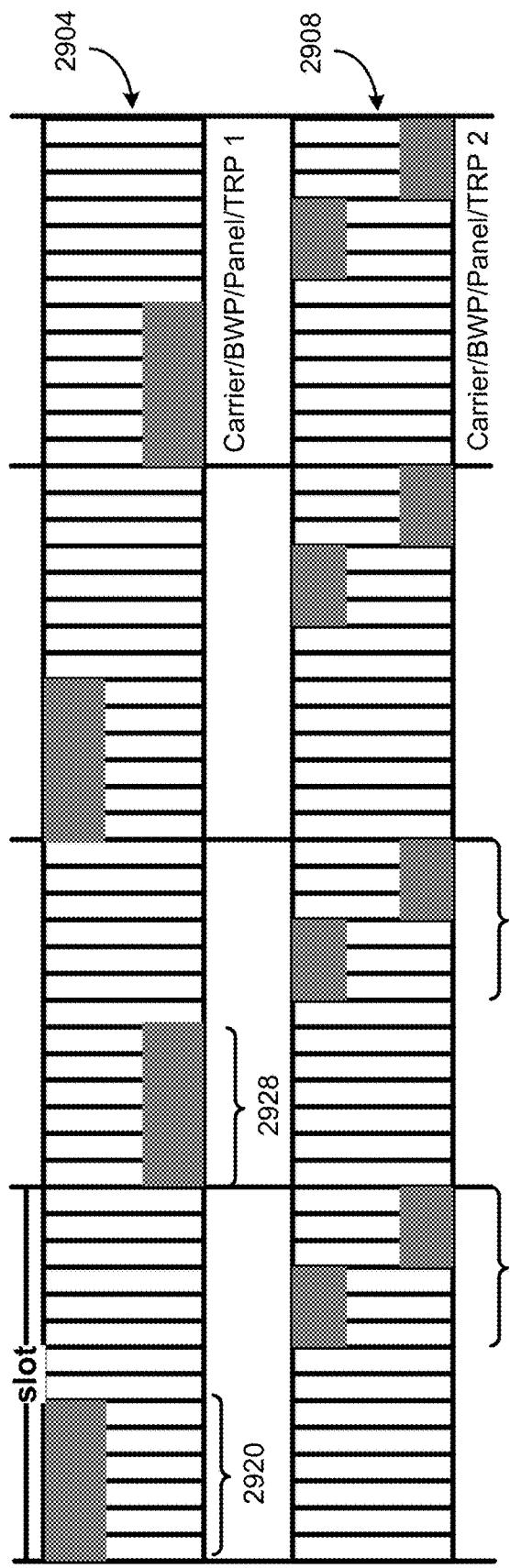
FIG. 29A shows an example transmission via multiple carriers.

FIG. 29A shows an example transmission via multiple carriers. Each of the multiple carriers may be configured with a corresponding hopping pattern. The multiple uplink carriers may be configured with corresponding different hopping patterns. A first resource 2920 may comprise a first set of OFDM symbols (e.g., OFDM symbols 0-6) of a first uplink carrier. A second resource 2924 may comprise a second set of OFDM symbols (e.g., OFDM symbols 8-13) of a second uplink carrier 2908. The wireless device may send a transmission (e.g., a PUSCH transmission or a PUCCH transmission) via the first resource 2920 and the second resource 2924. The wireless device may determine a TBS of a PUSCH transmission based on the first resource 2920 and the second resource 2924. The configuration parameters may configure a single overhead value for determining the TBS applied across the first resource 2920 and the second resource 2924. The configuration parameters may indicate/comprise a first hopping pattern applied for the first resource 2920 of the first uplink carrier. The configuration parameters may indicate/comprise a second hopping pattern applied for the second resource 2924 of the second uplink carrier 2908. As shown in FIG. 29A, the base station may configure inter-slot hopping pattern for the first uplink carrier 2904, and intra-slot hopping pattern for the second uplink carrier 2908. The wireless device may transmit a first transmission (e.g., a first PUSCH transmission or a first PUCCH transmission) via the first resource 2920 in a slot. The wireless device may transmit a second transmission (e.g., a second PUSCH transmission or a second PUCCH transmission) via the second resource 2924 in the slot. The first transmission may be a repetition of the second transmission. The wireless device may determine the TBS based on the first resource. The configuration parameters may comprise an overhead for determining the TBS. The wireless device may apply the overhead based on the first resource.

The configuration parameters may comprise parameters of a PUCCH format. Configuration parameters corresponding to a PUCCH format (e.g., PUCCH-format0) may comprise a quantity of OFDM symbols for a PUCCH transmission (e.g., nrofSymbols) and an indication of a first symbol for the PUCCH transmission (e.g., startingSymbolIndex) for the first resource of the first uplink carrier. The configuration parameters may further indicate/comprise a quantity of OFDM symbols for a PUCCH transmission (e.g., CUL-nrofSymbols) and an indication of a first symbol for the PUCCH transmission (e.g., CUL-startingSymbolIndex) for the second resource of the second uplink carrier. A value of the number of symbols (e.g., nrofSymbols) may be assumed as 1 (or any other quantity) for a PUCCH format (e.g., PUCCH-format0). A number of symbols for a transmission (e.g., nrofSymbols) and a CUL number of symbols (e.g., CUL-nrofSymbols) may be the same. The wireless device may repeat the PUCCH format 0 via the second resource, for example, if a number of symbols for a transmission (e.g., nrofSymbols) and/or a CUL number of symbols (e.g., CUL-nrofSymbols) are equal to two (or any other quantity).

The configuration parameters may comprise parameters of other PUCCH formats (e.g., PUCCH format 1, PUCCH format 2, PUCCH format 3). The configuration parameters may comprise a number of symbols (e.g., nrofSymbols) and a starting symbol index (e.g., startingSymbolIndex) for the first resource of the first uplink carrier. The configuration parameters (e.g., corresponding to PUCCH format 0) may indicate/comprise a CUL number of symbols (e.g., CUL-nrofSymbols) and a CUL starting symbol index (e.g., CUL-startingSymbolIndex) for the second resource of the second uplink carrier. The wireless device may determine a DMRS pattern of the first resource (e.g., based on a PUCCH format 3 or a PUCCH format 4) based on the first hopping pattern and a duration of the first resource. The wireless device may determine a first duration of a first hop in the first resource, for example, if the first hopping pattern is intra-slot hopping.

The wireless device may determine DMRS of a hop. The wireless device may determine a first DMRS of the first hop, for example, based on the first duration and the first hopping pattern. The wireless device may determine a second DMRS of a second hop, for example, based on a second duration of the second hop and the hoping pattern. The wireless device may determine a DMRS based on no-hopping (e.g., shown in FIG. 21) and the duration of the first resource, for example, if the first hopping pattern does not enable intra-slot hopping. The wireless device may determine DMRS(s) of the second resource independently based on the second hopping pattern and a second duration of the second resource. The wireless device may determine DMRS symbols as a $2^{nd}$ symbol (index=1) and a $5^{th}$ symbol (index=4) for the first resource (e.g., for either no additional DMRS or additional DMRS), for example, if the duration of the first resource is 6 and the first hopping pattern does not enable intra-slot hopping. The wireless device may determine DMRS symbols as the $9^{th}$ symbol (index=1 from a starting symbol of the second resource) and the $12^{th}$ symbol (index=4) for the second resource (e.g., for either no additional DMRS or additional DMRS), for example, if a first duration of the first hop of the second resource is 3, a second duration of the second hop of the second resource is 3, and the second hopping pattern is intra-slot hopping.

The wireless device may determine DMRS symbols, for each duration of a first resource and a second resource, based on a frequency hopping pattern configured for the first resource or the second resource. The configuration parameters may indicate whether additional DMRS is configured for a first uplink carrier and a second uplink carrier. The configuration parameters may separately indicate, for each uplink carrier, whether additional DMRS is configured for the uplink carrier.

Applying independent hopping pattern for the first uplink carrier and for the second uplink carrier may provide flexibility of transmission and/or may offer other performance benefits. The wireless device may independently enable or disable hopping pattern for an uplink carrier. For example, the wireless device may disable intra-slot hopping for an uplink carrier with large subcarrier spacing. Disabling intra-slot hopping for the uplink carrier may reduce interruptions due to frequency switching latency or power transient periods.

While transmissions (e.g., PUCCH transmissions or PUSCH transmissions) based on hopping patterns as described herein with respect to multicarrier transmission (e.g., via a first uplink carrier and a second uplink carrier), similar procedures may be applied for transmissions via any set of wireless resources (e.g., BWPs, antenna panels, spatial resources/beams, etc.). For example, uplink transmissions (as described with respect to FIGS. 27-30) may be via multiple uplink panels (e.g., a first uplink panel and a second uplink panel associated with an uplink carrier), or via multiple uplink BWPs (e.g., a first uplink BWP and a second uplink BWP associated with an uplink carrier).

Transmissions may be sent via a first uplink panel and a second uplink panel in a similar manner as transmissions via the first uplink carrier and the second uplink carrier as described with respect to FIGS. 27-30. The first uplink panel and the second uplink panel may operate in an uplink carrier associated with a cell. Transmissions may be sent via a first uplink BWP of an uplink carrier and a second uplink BWP of the uplink carrier in a similar manner as transmissions via the first uplink carrier and the second uplink carrier as described with respect to FIGS. 27-30. Transmissions as described with respect to FIGS. 27-30 may be sent via a plurality of uplink carriers. Transmissions as described with respect to FIGS. 27-30 may be sent via a plurality of uplink BWPs of the uplink carrier. A base station may transmit configuration parameters for an uplink BWP, for example, if a wireless device sends uplink transmissions via an uplink BWP. A base station may send configuration parameters for an uplink BWP of one or more uplink BWPs of an uplink carrier. The base station may configure configuration parameters respectively for each uplink BWP of the one or more uplink BWPs. A base station may send configuration parameters for an uplink panel of one or more uplink panels associated with an uplink carrier. The base station may configure configuration parameters respectively for each uplink panel of the one or more uplink panels. Transmissions as described with respect to FIGS. 27-30 may be sent via a single uplink carrier with a plurality of uplink BWPs.

One or more hopping patterns (e.g., patterns shown in FIG. 27A-B and FIG. 28A-B) may be used for a plurality of carriers with a single numerology. A numerology of an active BWP of an uplink carrier, of the plurality of carriers, may be same across the plurality of carriers. A first numerology of a first uplink carrier may be different from a second numerology of a second uplink carrier. The first uplink carrier may operate in a frequency range 2 (e.g., FR2). The second uplink carrier may operate in a frequency range 1 (e.g., FR1). A base station may send/transmit first configuration parameters for the first uplink carrier, for example, if the first numerology and the second numerology are different. The base station may send/transmit second configuration parameters for the second uplink carrier. The first configuration parameters may comprise a first repetition number or a quantity of slots for an uplink transmission (e.g., a TB or UCI). The first configuration parameters may comprise a first hopping pattern. The first configuration parameters may comprise/indicate a first PUCCH format (e.g., a PUCCH format 1 for UCI payload size of up to two bits). The second configuration parameters may comprise a second repetition number or a quantity of slots for the uplink transmission (e.g., the TB or the UCI). The second configuration parameters may comprise a second hopping pattern. The second configuration parameters may comprise/indicate a second PUCCH format (e.g., a PUCCH format 0 for UCI payload size up to two bits). The wireless device may use a short PUCCH format for the first uplink carrier. The wireless device may use a long PUCCH format for the first uplink carrier, for example, based on the first numerology being smaller than the second numerology. A PUCCH format in an uplink carrier may be based on a subcarrier spacing. The wireless device may use a short PUCCH format in an uplink carrier with a smaller subcarrier spacing. The wireless device may use a long PUCCH format in another uplink carrier with a larger subcarrier spacing.

Figure 29B:
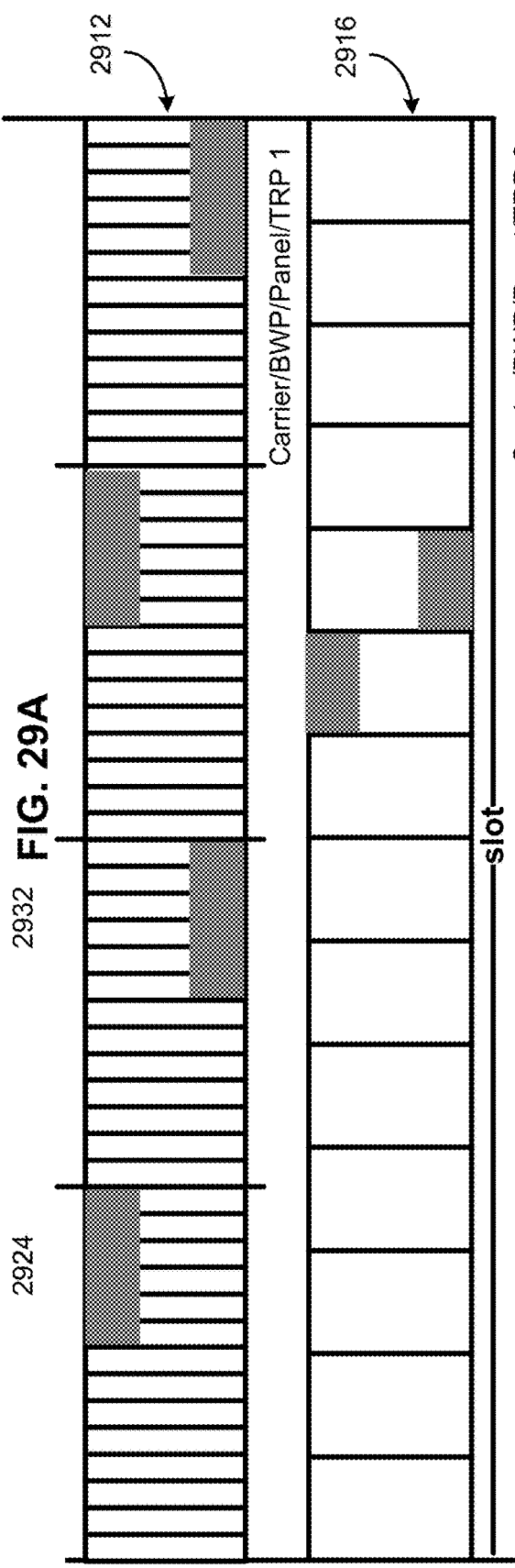
FIG. 29B shows an example transmission via multiple carriers.

FIG. 29B shows an example of transmission via multiple resources. The uplink transmission may be UCI via PUCCH. The uplink transmission may be via a first uplink carrier 2912 (or a first uplink panel) and via a second uplink carrier 2916 (or a second uplink panel). The base station may send/transmit configuration parameters of the first uplink carrier 2912 and/or the second uplink carrier 2916. The configuration parameters may indicate a PUCCH format (e.g., PUCCH format 1) for the first uplink carrier 2912. The PUCCH format may indicate that the UCI comprises a single bit HARQ-ACK. The configuration parameters may indicate a PUCCH format (e.g., PUCCH format 1) for the second uplink carrier 2916. The configuration parameters may indicate a multi-slot transmission (e.g., 4 slots) for the first uplink carrier 2912. The configuration parameters may indicate single slot transmission for the second uplink carrier 2916. The configuration parameters may indicate inter-slot hopping for the first uplink carrier 2912. The configuration parameters may indicate intra-slot hopping for the second uplink carrier 2916. The configuration parameters may indicate a first set of OFDM symbols (e.g., OFDM symbols 8-13, a startingSymbolIndex=8, a nrofSymbols=6) for the first uplink carrier 2912 corresponding to the PUCCH format 1. The configuration parameters my indicate a starting symbol (e.g., 8th OFDM symbol, a CUL-startingSymbolIndex=8, a CUL-nrofSymbols=2) for the second uplink carrier 2916 corresponding to the PUCCH format 0. The wireless device may receive DCI indicating a HARQ scheduling offset (e.g., PDSCH-to-HARQ offset). The wireless device may determine a slot of the first uplink carrier 2912 based on the HARQ scheduling offset. The wireless device may send/transmit up to four PUCCH transmissions based on the PUCCH format 1 via one or more slots (e.g., starting from the slot) via the first uplink carrier 2912. The wireless device may determine a second slot of a second PUCCH transmission via the second uplink carrier 2916 based on the slot. The wireless device may determine the second slot that overlaps with the determined slot.

A wireless device may support simultaneous transmission via a first uplink carrier and a second uplink carrier (e.g., for transmitting UCI or a TB). A base station may send/transmit configuration parameters. The configuration parameters may indicate a first PUCCH resource for a PUCCH transmission corresponding to a PUCCH format via the first uplink carrier. The configuration parameters may indicate a second PUCCH resource for PUCCH transmission corresponding to the PUCCH format via the second uplink carrier. The wireless device may send/transmit UCI via the first PUCCH resource and the second PUCCH resource. A first numerology of the first PUCCH resource may be same as a second numerology of the second PUCCH resource. A first duration of the first PUCCH resource may be different from a second duration of the second PUCCH resource. The configuration parameters may configure intra-slot hopping for the first uplink carrier and the second uplink carrier. The wireless device may apply intra-slot hoping for the first PUCCH resource and the second PUCCH resource. The wireless device may determine a transmission duration for a first hop and a second hop of the PUCCH transmission based on a larger duration among the first duration and the second duration. The wireless device may determine the transmission duration based on a union of OFDM symbols of the first PUCCH resource and the second PUCCH resource. The first PUCCH resource may comprise a first set of OFDM symbols (e.g., from 2nd OFDM symbol to 9th OFDM symbol). The second PUCCH resource may comprise a second set of OFDM symbols (e.g., from 4th OFDM symbol to 11th OFDM symbol). The transmission duration may be determined based on the first OFDM symbol of the first PUCCH resource and a last OFDM symbol of the second PUCCH resource (e.g., between 2nd OFDM symbol and 11th OFDM symbol (10 symbols)). The wireless device may determine a symbol indicator/index for intra-slot hopping (e.g., the intra-slot hopping is to be performed) based on the determined transmission duration. The wireless device may align a hopping point (a hopping symbol, a hopping symbol index, a hopping occurrence) between the first uplink carrier and the second uplink carrier to minimize interruption or an impact of a power transient.

The wireless device may determine the symbol indicator/index as a sum of floor(transmission duration/2) and a starting symbol index corresponding to the determined transmission duration. The wireless device may determine a first hop of a PUCCH transmission via an uplink carrier based on the symbol indicator/index (e.g., a hopping point). The first hop may be determined between a starting OFDM symbol (e.g., startingSymbolIndex) and a symbol corresponding to the symbol indicator/index. A second hop may be determined between a symbol next to the symbol corresponding to the symbol indicator/index and an ending symbol (e.g., determined by nrofSymbols).

Figure 29C:
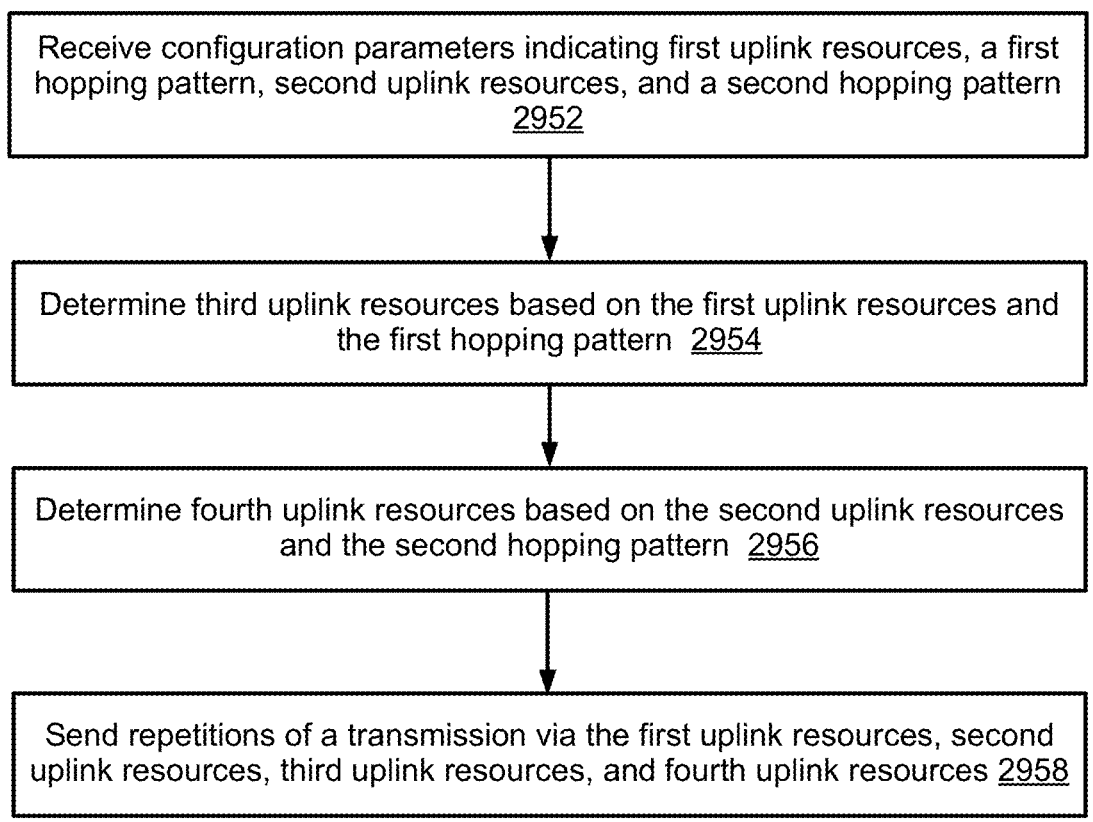
FIG. 29C shows an example method for transmission via multiple carriers.

FIG. 29C shows an example method for transmission via multiple carriers. The wireless device may use the method 2900 to perform an uplink transmission as described with respect to FIG. 29A. The wireless device may receive one or more messages (e.g., RRC messages) comprising configuration parameters. The configuration parameters may indicate first uplink resources (e.g., uplink resources 2920), a first hopping pattern, second uplink resources (e.g., uplink resources 2908), and a second hopping pattern. The first hopping pattern and the second hopping pattern may indicate intra-slot hopping or inter-slot hopping. The first hopping pattern and the second hoping pattern may be same or different. The first uplink resources may be associated with the first CORESET pool. For example, the first uplink resources may be configured with spatial relation information of a first reference signal of the first CORESET pool. The second uplink resources may be associated with the second CORESET pool. For example, the second uplink resources may be configured with spatial relation information of a second reference signal of the second CORESET pool. The first CORESET pool may be associated with a first uplink carrier, a first uplink BWP, a first TRP and/or a first cell, etc. The second CORESET pool may be associated with a second uplink carrier, a second uplink BWP, a second TRP and/or second cell.

At step 2954, the wireless device may determine third uplink resources (e.g., uplink resources 2928) associated with the first CORESET pool. The wireless device may determine the third uplink resources based on the first uplink resources and the first frequency hopping pattern. At step 2959, the wireless device may determine fourth uplink resources (e.g., uplink resources 2932) associated with the first CORESET pool. The wireless device may determine the fourth uplink resources based on the second uplink resources and the second frequency hopping pattern. At step 2958, the wireless device may send uplink transmissions via the first uplink resources, the second uplink resources, the third uplink resources, and the fourth uplink resources. The uplink transmissions may correspond to repetition transmission of UCI.

FIG. 30A shows an example of intra-slot hopping via multiple carriers. A wireless device may send a first PUCCH transmission via the first uplink carrier 3004 and a second PUCCH transmission via the second uplink carrier 3008. With respect to example transmission of FIG. 30A, a first duration of the first PUCCH transmission may be 12 OFDM symbols. A second duration of the second PUCCH may be 7 OFDM symbols. The wireless device may determine the transmission duration as 12 OFDM symbols which is a larger duration between two PUCCH transmissions. The wireless device may determine a hopping point as a 7th OFDM symbol corresponding to the transmission duration. The wireless device may align a hopping point of the second PUCCH transmission at the 7th OFDM symbol. The wireless device may determine a first hop to be equal to two symbols and a second hop of five symbols for the second PUCCH transmission based on the determined hopping point.

FIG. 30B shows an example of intra-slot hopping via multiple carriers. A wireless device may send a first PUCCH transmission via the first uplink carrier 3012 and a second PUCCH transmission via the second uplink carrier 3016. With respect to example transmission of FIG. 30A, a first duration of the first PUCCH transmission may be 12 OFDM symbols. A second duration of the second PUCCH may be 8 OFDM symbols. The wireless device may determine the transmission duration as 12 OFDM symbols which is a larger duration between two PUCCH transmissions. Similar to FIG. 30A, the wireless device may determine a hopping point of 7th OFDM symbol. The wireless device may determine a first hop of the second PUCCH transmission to be equal to 6 OFDM symbols and a second hop of the second PUCCH to be equal to 2 OFDM symbols based on the determined hopping point.

The wireless device may perform transmissions via multiple resources (e.g., multiple BWPs, antenna panels, spatial resources, etc.) in a manner similar to as described with reference to FIGS. 30A and 30B. For example, the wireless device may send the first PUCCH transmission via a first BWP (or a first antenna panel) and send the second PUCCH transmission via a second BWP (or a second antenna panel).

Aligning a hopping point, as described herein with respect to a PUCCH transmission in FIGS. 30A and 30B, may be applied for a first PUSCH transmission of a TB via the first uplink carrier and a second PUSCH transmission of a TB via the second uplink carrier. The first PUSCH transmission and the second PUSCH transmission may be sent via a slot. The wireless device may determine a hopping point of each PUSCH transmission based on one or more rules described herein.

The wireless device may determine one or more DMRS symbols for each hop of a PUCCH transmission based on the table shown in FIG. 21. With respect to FIG. 30A, the first PUCCH transmission may comprise DMRS symbols at 2nd OFDM symbol and 8th OFDM symbol of the first PUCCH transmission (e.g., if no additional DMRS is being configured). The second PUCCH transmission may comprise DMRS symbols at the 1st OFDM symbol and the 4 OFDM symbol of the second PUCCH transmission. Determined DMRS may only be present in one hop of a PUCCH transmission, for example, if the wireless device determines DMRS positions based on the table of FIG. 21. The wireless device may determine to send DMRS symbol(s) in each hop of the PUCCH transmission. The wireless device may select an OFDM symbol at a symbol number corresponding to floor(first hop duration/2)−1 in a first hop as a DMRS symbol. The wireless device may select an OFDM symbol at a symbol number corresponding to floor(second hop duration/2)−1 in a second hop as a DMRS symbol. FIG. 30B shows example transmission based on DMRS symbol determination to ensure that each hop has at least one DMRS symbol. The wireless device may select an OFDM symbol corresponding to OFDM symbol index 2 for the first DMRS of the first hop of the first PUCCH transmission. The wireless device may select an OFDM symbol corresponding to the OFDM symbol index 2 for the second DMRS of the second hop of the first PUCCH transmission. The wireless device may determine the second DMRS symbol relative to a starting OFDM symbol of the second hop. The wireless device may determine an OFDM symbol corresponding to OFDM symbol index 2 for the first hop of the second PUCCH transmission. The wireless device may determine an OFDM symbol corresponding to OFDM symbol index 0 for the second hop of the second PUCCH transmission. The wireless device may similarly determine DMRS symbols if additional DMRS pattern are to be used. The wireless device may determine positions of DMRS symbols based on the table shown in FIG. 21, for example, if a transmission duration of a PUCCH transmission is greater than or equal to 10 OFDM symbols (or any other quantity of OFDM symbols). The wireless device may determine positions of DMRS symbols to ensure that each hop has at least one DMRS symbol, for example, if a transmission duration of a PUCCH transmission is smaller than 10 OFDM symbols (or any other quantity of OFDM symbols). The wireless device may determine positions of DMRS symbols based on a PUCCH transmission selected from the first PUCCH transmission and the second PUCCH transmission based on the table shown in FIG. 21. The wireless device may select a longer PUCCH transmission among the first PUCCH transmission and the second PUCCH transmission. The wireless device may determine DMRS symbols based on the selected PUCCH transmission and based on the table. The wireless device may apply the rule mentioned above for the other PUCCH transmissions (e.g., a shorter PUCCH transmission) to ensure that each hop has at least one DMRS symbol.

A wireless device may send a PUSCH transmission via a first uplink carrier based on intra-slot hopping. The wireless device may determine one or more DMRS symbols for a first hop of a first PUSCH transmission and a second hop of the first PUSCH based on the table shown in FIG. 22. The wireless device may determine to use a mapping type B for a multi-carrier scheduled PUSCH transmission. The wireless device may determine DMRS symbol(s) of a PUSCH transmission via the multi-carrier scheduling based on a column of the PUSCH mapping type B regardless of actual PUSCH mapping type configured for the PUSCH transmission. A wireless device may determine positions of one or more DMRS symbols of a PUSCH transmission based on a hopping symbol alignment between a first PUSCH transmission via a first uplink carrier and a second PUSCH transmission via a second uplink carrier. The wireless device may determine positions of one or more first DMRS symbols of a first hop of the first PUSCH transmission and/or positions of one or more second DMRS symbols of a first hop of the second PUSCH transmission, for example, based on a hopping point between the first PUSCH transmission and the second PUSCH transmission. The wireless device may determine positions of DMRS symbols based on one or more above considerations to ensure that each hop has at least one DMRS symbol. For example, the wireless device may determine a position of a DMRS symbol to be equal to floor(first duration of the first hop/2)−1). The wireless device may determine one or more third DMRS symbols of a second hop of the first PUSCH transmission and/or one more fourth DMRS symbols of a second hop of the second PUSCH transmission in a manner similar to that described above with respect to a PUCCH transmission.

A base station may send/transmit configuration parameters to enable multi-carrier transmission (e.g., of a TB or UCI). Configuration parameters may configure a PUCCH resource in an uplink carrier for a PUCCH format. The configuration parameters may configure a plurality of PUCCH resources in a plurality of uplink carriers for the PUCCH format. The configuration parameters may enable one or more UCI types. The wireless device may enable the multi-carrier transmission, for example, if an uplink signal comprises at least one of the one or more UCI types. For example, a UCI type for transmission of HARQ-ACK may be configured for the multi-carrier transmission. The wireless device may send a PUCCH transmission with one or more HARQ-ACK bits via the plurality of uplink carriers. The configuration parameters may comprise parameters of the multi-carrier transmission. The base station may enable the multi-carrier transmission of a PUCCH transmission or a PUSCH transmission via DCI. For example, scheduling DCI (e.g., comprising downlink resource assignment) may have a field indicating the multi-carrier transmission. The wireless device may send a PUSCH transmission or a PUCCH transmission scheduled by the scheduling DCI via the plurality of uplink carriers, for example, based on the scheduling DCI indicating the multi-carrier transmission. The scheduling DCI may indicate a resource comprising a plurality of resources associated with the plurality of uplink carriers. The wireless device may send the scheduled PUSCH transmission or the scheduled PUCCH transmission via the plurality of resources of the plurality of the uplink carriers, for example, based on the indicated resource.

The wireless device may enable multi-carrier transmission based on one or more other considerations. The wireless device may enable the multi-carrier transmission based on an RSRP measurement. The configuration parameters may comprise first RACH resources of a first uplink carrier. The configuration parameters may comprise second RACH resources of a second uplink carrier. The configuration parameters may comprise third RACH resources of the second uplink carrier. The wireless device may select a RACH resource from the third RACH resources, for example, if a signal quality of a serving cell/beam is lower than a threshold. The wireless device may indicate a need of the multi-carrier transmission, for example, based on selecting the RACH resource from the third RACH resources. The third RACH resources may be configured in resources associated with the first uplink carrier and the second uplink carrier. A preamble may be repeated via the first uplink carrier and the second uplink carrier. The wireless device may determine a RACH resource from the first RACH resources or the second RACH resources, for example, based on the signal quality of the serving cell/beam being greater than or equal to the threshold and based on the signal quality being greater than a second threshold. The wireless device may determine the RACH resource from the first RACH resources, for example, based on the signal quality of the serving cell/beam being greater than the second threshold. The wireless device may determine the RACH resource from the second RACH resources, for example, based on the signal quality of the serving cell/beam being lower than or equal to the second threshold. The wireless device may enable the multi-carrier transmission for an uplink signal transmission (e.g., a TB, UCI, SRS, a PRACH transmission), for example, based on selecting/determining the RACH resource from the third RACH resources. The base station may send/transmit one or more messages (e.g., MAC CEs and/or DCIs) to enable the multi-carrier transmission for the uplink signal transmission.

A wireless device may fallback to using a single carrier (or cell, or panel) transmission for an uplink transmission based on one or more conditions/considerations. The wireless device may be scheduled with fallback DCI (e.g., corresponding to a DCI format 0_0, a DCI format 1_0) for a PUSCH transmission and/or a PUCCH transmission. The wireless device may send the scheduled transmission (e.g., PUSCH transmission or the PUCCH transmission) via the single cell (or carrier, or panel). For example, the wireless device may select a PUCCH resource from one or more cell-specific configured PUCCH resources (e.g., default PUCCH resources) based on the single cell (or carrier, or panel) transmission assumption. The wireless device may not enable a multi-carrier transmission via the PUCCH resource selected from the default PUCCH resources.

A wireless device may be configured with simultaneous PUCCH transmission and PUSCH transmission via multiple carriers. The wireless device may send a PUCCH transmission via a first uplink carrier and a PUSCH transmission via a second uplink carrier (or vice versa), for example, based on being configured with the simultaneous PUCCH transmission and PUSCH transmission via first uplink carrier and the second uplink carrier. The first uplink carrier and the second uplink carrier may be associated with a first cell. The wireless device may be configured with simultaneous PUCCH transmission and PUSCH transmission via a carrier. The wireless device may send a PUCCH transmission via the first uplink carrier and a PUSCH transmission via the second uplink carrier (or vice versa), for example, based on configured with simultaneous PUCCH transmission and PUSCH transmission via the carrier. A wireless device may send/indicate (e.g., to a base station) one or more capabilities indicating whether simultaneous PUCCH transmission and PUSCH transmission via a plurality of panels are supported by the wireless device. The one or more capabilities may be indicated per band or a band combination. The wireless device may send/indicate (e.g., to a base station) one or more second capabilities indicating whether simultaneous uplink transmission (e.g., a PUSCH transmission via a first panel and a second PUSCH transmission via a second panel) is supported via a plurality of panels. The base station may configure simultaneous PUCCH transmission and PUSCH transmission via a plurality of uplink panels. The base station may configure simultaneous transmission of an uplink signal via the plurality of uplink panels.

A base station may send/transmit one or more RRC messages to a wireless device. The one or more RRC messages may comprise/indicate a downlink BWP and/or an uplink BWP of a cell/carrier for the wireless device. The one or more RRC messages may comprise a hopping pattern or a floating pattern of the downlink BWP and/or the uplink BWP. The hopping pattern or the floating pattern may comprise one or more hopping frequencies/offset values and an interval between a hop and a next hop. The hopping pattern may indicate a frequency offset that is equal to a bandwidth of the downlink BWP or the uplink BWP. The hopping pattern may indicate the interval as 1 slot (or any other quantity of slots). The wireless device may use a center frequency fc for the downlink BWP and/or the uplink BWP at a slot n. The wireless device may switch to a center frequency that is equal to a sum of fc and the frequency offset for the downlink BWP and/or the uplink BWP in a slot n+1. The wireless device may switch to a center frequency that is equal to fc for the downlink BWP and/or the uplink BWP at a slot n+2. The wireless device may alternate between two center frequencies in the slots. The hopping pattern may comprise one or more values of the hopping frequencies or the frequency/hopping offset values.

Multiple hopping frequencies or hopping offset values may be used for determining multiple CSI measurements or CSI-RS configurations. The wireless device may assume that a non-zero power CSI-RS (NZP-CSI-RS) configuration configured for the downlink BWP may occur in each mirrored downlink BWP corresponding to the downlink BWP. For example, a mirrored downlink BWP of the downlink BWP may be determined as between [a starting PRB of the downlink BWP+a hopping offset, an ending PRB of the downlink BWP+a hopping frequency]. The wireless device may inherit one or more parameters of the downlink BWP for the mirrored downlink BWP. The wireless device may similarly determine a mirrored uplink BWP based on the uplink BWP and a hopping frequency or a frequency/hopping offset value. The wireless device may determine one or more mirrored downlink BWPs (based on configured hopping frequencies or frequency/hopping offset values) for the downlink BWP. The wireless device may determine one or more mirrored uplink BWPs for the uplink BWP. The wireless device may measure a CSI based on one or more NZP-CSI-RSs transmitted via a same mirrored downlink BWP of the one or more mirrored downlink BWPs or based on the downlink BWP.

A wireless device may receive one or more radio resource control (RRC) messages. The one or more RRC messages may indicate one or more first uplink resources of a first uplink carrier for sending/transmitting UCI or TB. The one or more RRC messages may further indicate one or more second uplink resources of a second uplink carrier for transmitting the UCI or the TB. The one or more RRC messages may further indicate at least one frequency hopping pattern for the one or more first uplink resources and the one or more second uplink resources. The wireless device may transmit the UCI or the TB via the one or more of first uplink resources and the one or more of the second uplink resources based on the at least one frequency hopping pattern.

One or more candidate hopping patterns for the first uplink resources or for the second uplink resources may comprise intra-slot hopping, inter-slot hopping without intra-slot hopping, and inter-slot hopping with intra-slot hopping. One or more second candidate hopping patterns for the at least one hopping pattern may comprise a first hopping pattern from the one or more hopping patterns for the first uplink resources and a second hopping pattern from the one or more hopping patterns for the second uplink resources. The one or more second hopping patterns may comprise the at least one frequency hopping pattern. The wireless device may determine a PUCCH resource for transmitting the UCI, for example, based on each of the one or more of the first uplink resources of the first uplink carrier and each of the one or more of the second uplink resources of the second uplink carrier.

A wireless device may receive DCI. The DCI may indicate a first resource of the one or more first uplink resources and a second resource of the one or more second uplink resources. The DCI may comprise a HARQ process indicator/identifier for the TB. The wireless device may determine a third resource of the one or more first uplink resources based on the at least one hopping pattern. The one or more first uplink resources may comprise the first resource and the third resource. The wireless device may determine a fourth resource of the one or more second uplink resources based on the at least one hopping pattern. The one or more second uplink resources may comprise the second resource and the fourth resource. The first uplink carrier may be an uplink carrier associated with a first cell. The second uplink carrier may be a supplemental uplink carrier associated with the first cell.

A wireless device may receive one or more second RRC messages. The one or more second RRC messages may indicate configuration parameters of a PUCCH resource. The PUCCH resource may be comprise the UCI based on the at least one frequency hopping pattern. The configuration parameters may comprise an indication for enabling frequency hopping, a first PRB of the first uplink carrier, a first time domain resource allocation of the first uplink carrier, a second PRB of the second uplink carrier, and a second time domain resource allocation of the supplemental uplink carrier. The wireless device may determine the one or more first resources based on the first PRB and the first time domain resource allocation. The wireless device may determine the one or more second resources based on the second PRB and the second time domain resource allocation.

A PUSCH for the TB or a PUCCH for the UCI in a slot of the one or more first resources may comprise a first hop and a second hop based on the at least one hopping pattern. The wireless device may determine one or more first DMRS symbols of the first hop based on a first duration of the first hop and one or more second DMRS symbols of the second hop based on a second duration of the second hop. The wireless device may determine one or more first DMRS symbols of the first hop and one or more second DMRS symbols of the second hop, for example, based on one or more DMRS symbols of a second PUSCH for the TB or a second PUCCH for the UCI in the slot of the one or more second resources. A DMRS symbol indicator/index of the one or more first DMRS symbols may be determined as equal to floor(a first duration of the first hop/2)−1. The one or more RRC messages may indicate parameters of multi-carrier scheduling/transmission. The wireless device may transmit the UCI or the TB via the first uplink carrier and the second uplink carrier based on the multi-carrier scheduling/transmission being enabled. The wireless device may receive MAC-CEs and/or DCIs indicating enabling the multi-carrier scheduling/transmission.

A wireless device may receive one or more RRC messages. The one or more RRC messages may indicate one or more first uplink resources of a first uplink carrier for transmitting UCI. The one or more RRC messages may further indicate one or more second uplink resources of a second uplink carrier for transmitting the UCI or the TB. The one or more RRC messages may further indicate at least one frequency hopping pattern for the one or more first uplink resources and the one or more second uplink resources. The wireless device may send/transmit the UCI or the TB via the one or more of first uplink resources and the one or more of the second uplink resources based on the at least one frequency hopping pattern.

A wireless device may receive one or more RRC messages. The wireless device may receive DC indicating one or more first uplink resources of a first uplink carrier. The one or more first uplink resources may be for sending a TB. The DCI may further indicate one or more second uplink resources of a second uplink carrier. The one or more second uplink resources may be for sending UCI or the TB. The one or more RRC messages may indicate at least one frequency hopping pattern for the one or more first uplink resources and the one or more second uplink resources. The wireless device may send/transmit the UCI or the TB via the one or more of first uplink resources and the one or more of the second uplink resources based on the at least one frequency hopping pattern.

A wireless device may receive one or more RRC messages indicating a parameter to enable simultaneous transmission via a PUSCH and a PUCCH for a cell. The cell may comprise an uplink carrier and a supplemental uplink carrier. The wireless device may receive a first DCI comprising a first resource assignment for a PUSCH transmission via the uplink carrier. The wireless device may receive a second DCI indicating a second resource for a PUCCH transmission via the supplemental uplink carrier. A first time resource of the PUSCH may overlap with a second time resource of the PUCCH. The wireless device may transmit, based on the parameter to enable simultaneous transmission via the PUSCH and the PUCCH, the PUSCH transmission via the uplink carrier and the PUCCH transmission via the supplemental uplink carrier.

A wireless device may receive one or more RRC messages indicating configuration parameters for an uplink channel. The configuration parameters may comprise/indicate a plurality of first uplink resources of a first uplink carrier for transmitting UCI or a TB, a first frequency hopping pattern for the plurality of first uplink resources, a plurality of second uplink resources of a second uplink carrier for transmitting the UCI or the TB, and/or a second frequency hopping pattern for the plurality of second uplink resources. The wireless device may send/transmit the UCI or the TB, via the plurality of first uplink resource, based on the first frequency hopping pattern. The wireless device may transmit the UCI or the TB, via the plurality of second uplink resources, based on the second frequency hopping pattern.

A wireless device may receive one or more RRC messages indicating configuration parameters for a cell. The configuration parameters may comprise/indicate that frequency hopping is enabled, a first PRB of a first uplink carrier associated with the cell, and/or a second PRB of a second uplink carrier associated with the cell. The wireless device may receive DCI indicating a time domain resource. The wireless device may send/transmit an uplink transmission via the uplink carrier and the supplemental uplink carrier during the time domain resource. The wireless device may determine a frequency hopping pattern. The frequency hopping pattern may comprise one or more sets of parameters (e.g., each set comprising a corresponding frequency location and hop duration for the uplink transmission based on the first PRB), the second PRB, a first numerology of the first uplink carrier, a second numerology of the second uplink carrier, a first repetition number of the uplink transmission via the first uplink carrier and/or a second repetition number of the supplemental uplink transmission via the second uplink carrier. The wireless device may send/transmit, based on the frequency hopping pattern, the uplink transmission via the first uplink carrier and the second uplink carrier.

A wireless device may perform a method comprising multiple operations. The wireless device may receive one or more radio resource control (RRC) messages indicating configuration parameters for a cell. The configuration parameters may indicate: a first physical resource block (PRB) of a physical uplink control channel (PUCCH) resource; a second PRB of the PUCCH resource; and a hopping pattern for the first PRB and the second PRB of the PUCCH resource. The wireless device may send, via the PUCCH resource and based on the hopping pattern, uplink control information (UCI). Sending the UCI may comprise sending at least a first portion of the UCI via the first PRB and using a first control resource set (CORESET) pool of the cell, and sending at least a second portion of the UCI via the second PRB and using a second CORESET pool of the cell using a second CORESET pool of the cell. The wireless device may also perform one or more additional operations. The hopping pattern may indicate carrier switching between the sending the at least the first portion of the UCI and the sending the at least the second portion of the UCI. Sending at least the first portion of the UCI via the first PRB comprises sending only the first portion of the UCI via the first PRB. Sending at least the second portion of the UCI via the second PRB comprises sending only the second portion of the UCI via the second PRB. The first portion of the UCI may a first hop of the UCI. The second portion of the UCI may be a second hop of the UCI. The hopping pattern may indicate that: intra-slot frequency hopping is enabled; or intra-slot frequency hopping is not enabled. The hopping pattern may indicate that intra-slot frequency hopping is enabled. A first indicator of the first PRB may be different from a second indicator of the second PRB. The sending the UCI may comprise sending the at least the first portion of the UCI and sending the at least the second portion of the UCI via a same slot based on the hopping pattern indicating that intra-slot frequency hopping is enabled. The first CORESET pool of the cell may be associated with a first carrier and the second CORESET pool of the cell may be associated with a second carrier. The configuration parameters may indicate first spatial relation information for the first carrier and second spatial relation information for the second carrier. Sending at least the first portion of the UCI via the first PRB comprises sending, via the first carrier and based on the first spatial relation information, at least the first portion of the UCI. Sending at least the second portion of the UCI via the second PRB comprises sending, via the second carrier and based on the second spatial relation information, at least the second portion of the UCI. The hopping pattern may indicate that inter-carrier hopping is enabled. Sending the at least the first portion of the UCI using the first CORESET pool and the sending the at least the second portion of the UCI using the second CORESET pool may be based on inter-carrier hopping. The wireless device may determine a first time duration of at least the first portion of the UCI transmitted via the first PRB. The wireless device may determine a first demodulation reference signal (DM-RS) pattern for at least the second portion of the UCI based on the first time duration. The configuration parameters may indicate one or more PUCCH resources comprising the PUCCH resource. The wireless device may receive downlink control information (DCI) indicating the PUCCH resource. Sending the UCI via the first PRB may comprise sending, based on a first spatial domain filter, at least the first portion of the UCI. Sending the UCI via the second PRB may comprise sending, based on a second spatial domain filter, at least the second portion of the UCI. The UCI may comprise hybrid automatic repeat request acknowledgment (HARQ-ACK) feedback. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more RRC messages. A computer-readable medium may store instructions that, when executed, cause performance of the described method, additional operations and/or include the additional elements.

A wireless device may perform a method comprising multiple operations. The wireless device may receive one or more radio resource control (RRC) messages indicating configuration parameters for a cell. The configuration parameters may indicate, for a wireless resource: a first physical resource block (PRB), associated with a first spatial domain filter, for a first portion of an uplink transmission; and a second PRB, associated with a second spatial domain filter, for a second portion of the uplink transmission. The wireless device may send, via the wireless resource, the uplink transmission. Sending the uplink transmission may comprise: sending the first portion based on the first PRB and the first spatial domain filter; and sending the second portion based on the second PRB and the second spatial domain filter. The wireless device may also perform one or more additional operations. The first spatial domain filter may be associated with a first CORESET pool. The second spatial domain filter may be associated with a second CORESET pool. The uplink transmission may comprise at least one of: uplink control information; or a transport block. The wireless resource may comprise at least one of: a physical uplink control channel (PUCCH) resource; or a physical uplink shared channel (PUSCH) resource. The first spatial domain filter may be associated with a first carrier and the second spatial domain filter may be associated with a second carrier. Sending the first portion may comprise transmitting, via the first carrier, the first portion. Sending the second portion may comprise transmitting, via the second carrier, the second portion. The configuration parameters may indicate that inter-carrier hopping is enabled. The sending the uplink transmission may be based on inter-carrier hopping. The first portion of the uplink transmission nay be a first hop of the uplink transmission. The second portion of the uplink transmission may be a second hop of the uplink transmission. The configuration parameters may indicate a hopping pattern comprising the first hop and the second hop. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more RRC messages. A computer-readable medium may store instructions that, when executed, cause performance of the described method, additional operations and/or include the additional elements.

A wireless device may perform a method comprising multiple operations. The wireless device may receive one or more radio resource control (RRC) messages indicating configuration parameters for a cell. The configuration parameters may indicate, for a wireless resource: a first physical resource block (PRB), associated with a first carrier, for a first portion of an uplink transmission; and a second PRB, associated with a second carrier, for a second portion of the uplink transmission. The wireless device may send, via the wireless resource, the uplink transmission. The sending the uplink transmission may comprise: sending the first portion based on the first PRB; and sending the second portion based on the second PRB. The wireless device may also perform one or more additional operations. The first carrier may be associated with a first CORESET pool. The second carrier may be associated with a second CORESET pool. The uplink transmission may comprise at least one of: uplink control information; or a transport block. The wireless resource may comprise at least one of: a physical uplink control channel (PUCCH) resource; or a physical uplink shared channel (PUSCH) resource. The configuration parameters may indicate that inter-carrier hopping and intra-slot hopping are enabled. The first portion of the uplink transmission may be a first hop of the uplink transmission. The second portion of the uplink transmission may be a second hop of the uplink transmission. The configuration parameters may indicate a hopping pattern comprising the first hop and the second hop. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more RRC messages. A computer-readable medium may store instructions that, when executed, cause performance of the described method, additional operations and/or include the additional elements.

A wireless device may perform a method comprising multiple operations. The wireless device may receive one or more radio resource control (RRC) messages indicating configuration parameters for a cell. The configuration parameters may indicate an uplink resource comprising: a first physical resource block (PRB); and a second PRB of the uplink resource based on a hopping pattern being configured for the uplink resource. The wireless device may transmit an uplink signal via an uplink channel based on the uplink resource. The uplink channel may comprise: a first hop based on the first PRB and a first spatial domain filter parameter; and a second hop based on the second PRB and a second spatial domain filter parameter. The wireless device may also perform one or more additional operations. The uplink resource may comprise a physical uplink control channel (PUCCH) resource. The uplink resource may comprise a configured grant physical uplink shared channel (PUSCH) resource. The uplink signal may comprise uplink control information. The uplink signal may comprise a transport block. A first control resource set (CORESET) pool may be configured with the first spatial domain filter parameter. A second CORESET pool may be configured with the second spatial domain filter parameter. The first PRB may be associated with the first CORESET pool. The second PRB may be associated with the second CORESET pool. The configuration parameters may indicate a PUCCH resource set. The PUCCH resource set may comprise: one or more PUCCH resources; a first set of spatial domain filter parameters, comprising the first spatial domain filter parameter, associated with a first control resource set (CORESET) pool; and a second set of spatial domain filter parameter, comprising the second spatial domain filter parameter, associated with a second CORESET pool. The first hop may be associated with the first CORESET pool. The second hop may be associated with the second CORESET pool. The wireless device may receive downlink control information (DCI) indicating time resources for the uplink channel. The wireless device may determine to transmit the uplink channel based on: one or more first symbols, overlapping with the first hop, being uplink symbols; and one or more second symbols, overlapping with the second hop, being uplink symbols. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more RRC messages. A computer-readable medium may store instructions that, when executed, cause performance of the described method, additional operations and/or include the additional elements.

A wireless device may perform a method comprising multiple operations. The wireless device may receive one or more radio resource control (RRC) messages indicating configuration parameters for a cell. The configuration parameters may indicate, for a physical uplink control channel (PUCCH) resource: that frequency hopping is enabled; a first physical resource block (PRB), associated with a first spatial domain filter parameter, for a first hop of a PUCCH; and a second PRB, associated with a second spatial domain filter parameter, for a second hop of the PUCCH. The wireless device may transmit uplink control information via the PUCCH based on the PUCCH resource. The PUCCH, based on the frequency hopping, may comprise: the first hop based on the first PRB and the first spatial domain filter parameter; and the second hop based on the second PRB and the second spatial domain filter parameter. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more RRC messages. A computer-readable medium may store instructions that, when executed, cause performance of the described method, additional operations and/or include the additional elements.

A wireless device may perform a method comprising multiple operations. The wireless device may receive one or more radio resource control (RRC) messages. The one or more RRC messages may indicate: first uplink resources, associated with a first control resource set (CORESET) pool of a cell, for transmitting an uplink control information (UCI); a first frequency hopping pattern for the first uplink resources; second uplink resources, associated with a second CORESET pool of the cell, for transmitting the UCI; and a second frequency hopping pattern for the second uplink resources. The wireless device may determine third uplink resources, associated with the first CORESET pool, based on the first uplink resources and the first frequency hopping pattern. The wireless device may further determine fourth uplink resources, associated with the second CORESET pool, based on the second uplink resources and the second frequency hopping pattern. The wireless device may transmit repetitions of the UCI via: the first uplink resources and the third uplink resources; and the third uplink resources and the fourth uplink resources. The wireless device may also perform one or more additional operations. The first frequency hopping pattern may indicate at least one of: an intra-slot frequency hopping; an inter-slot frequency hopping without intra-slot frequency hopping; or an inter-slot frequency hopping with intra-slot frequency hopping. The second frequency hopping pattern may indicate at least one of: an intra-slot frequency hopping; an inter-slot frequency hopping without intra-slot frequency hopping; or an inter-slot frequency hopping with intra-slot frequency hopping. The one or more RRC messages may further indicate a first physical uplink control channel (PUCCH) resource indicating the first uplink resources. The first PUCCH resource may comprise a first index of a starting physical resource block (PRB) indicating the first uplink resources. The first PUCCH resource may comprise a second index of a second hop PRB indicating the third uplink resources based on the first frequency hopping pattern enabling an intra-slot frequency hopping. The wireless device may determine the third uplink resources based on the first index of the starting PRB of the first uplink resources. The wireless device may determine the second frequency hopping pattern based on the first frequency hopping pattern. The second frequency hopping pattern may be the same as the first frequency hopping pattern. The one or more RRC messages may further indicate a second PUCCH resource indicating the second uplink resources. The second PUCCH resource may comprise a third index of a starting physical resource block (PRB) indicating the second uplink resources. The second PUCCH resource may comprises a fourth index of a second hop PRB indicating the fourth uplink resources based on the second frequency hopping pattern enabling an intra-slot frequency hopping. The wireless device may receive downlink control information (DCI) indicating the first uplink resources and the second uplink resources. The one or more RRC messages may indicate parameters of a multi-carrier transmission. The wireless device may transmit the UCI via a first uplink carrier and a second uplink carrier based on the multi-carrier scheduling being enabled. The first uplink carrier may be an uplink carrier associated with a cell. The second uplink carrier may be a supplemental uplink carrier associated with the cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more RRC messages. A computer-readable medium may store instructions that, when executed, cause performance of the described method, additional operations and/or include the additional elements.

A wireless device may perform a method comprising multiple operations. The wireless device may receive one or more messages. The one or more messages may indicate: a first frequency hopping pattern for first uplink resources of a first uplink carrier; and a second frequency hopping pattern for second uplink resources of a second uplink carrier. The wireless device may transmit repetitions of an uplink signal via: the first uplink resources and third uplink resources based on the first frequency hopping pattern; and the third uplink resources and fourth uplink resources based on the second frequency hopping pattern. Uplink resources may comprise resources of a physical uplink control channel (PUCCH) resource or resources of a configured grant physical uplink shared channel (PUSCH). The uplink signal may comprise uplink control information or a transport block. The first uplink carrier may be configured with a first spatial domain filter parameter. The second uplink carrier may be configured with a second spatial domain filter parameter. The first uplink carrier may be configured with a first control resource set (CORESET) pool of a cell. The second uplink carrier may be configured with a second CORESET pool of the cell. The wireless device may also perform one or more additional operations. The wireless device may comprise one or more processors; and memory storing instructions that, when executed by the one or more processors, cause the wireless deviceOfin to perform the described method, additional operations and/or include the additional elements. A system may comprise the wireless device configured to perform the described method, additional operations and/or include the additional elements; and a base station configured to send the one or more messages. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device, one or more radio resource control (RRC) messages that indicate a hopping pattern for physical resource blocks (PRBs) of a physical uplink control channel (PUCCH) resource of a cell, wherein the PRBs comprise a first PRB and a second PRB; and
sending, via the PUCCH resource and based on the hopping pattern, uplink control information (UCI), wherein the sending the UCI comprises:
sending at least a first portion of the UCI via the first PRB and using a first control resource set (CORESET) pool of the cell; and
sending at least a second portion of the UCI via the second PRB and using a second CORESET pool of the cell.

2. The method of claim 1, wherein the hopping pattern indicates carrier switching between the sending the at least the first portion of the UCI and the sending the at least the second portion of the UCI.

3. The method of claim 1, wherein:
the sending the at least the first portion of the UCI via the first PRB comprises sending only the first portion of the UCI via the first PRB; and
the sending the at least the second portion of the UCI via the second PRB comprises sending only the second portion of the UCI via the second PRB.

4. The method of claim 1, wherein the hopping pattern indicates that:
intra-slot frequency hopping is enabled; or
intra-slot frequency hopping is not enabled.

5. The method of claim 1, wherein:
the hopping pattern indicates that intra-slot frequency hopping is enabled,
a first indicator of the first PRB is different from a second indicator of the second PRB, and the sending the UCI comprises sending the at least the first portion of the UCI and sending the at least the second portion of the UCI via a same slot based on the hopping pattern indicating that intra-slot frequency hopping is enabled.

6. The method of claim 1, wherein:
the first CORESET pool of the cell is associated with a first carrier and the second CORESET pool of the cell is associated with a second carrier;
the configuration parameters indicate first spatial relation information for the first carrier and second spatial relation information for the second carrier;
the sending the at least the first portion of the UCI via the first PRB comprises sending, via the first carrier and based on the first spatial relation information, at least the first portion of the UCI; and
the sending the at least the second portion of the UCI via the second PRB comprises sending, via the second carrier and based on the second spatial relation information, at least the second portion of the UCI.

7. The method of claim 1, wherein the hopping pattern indicates that inter-carrier hopping is enabled, and wherein the sending the at least the first portion of the UCI using the first CORESET pool and the sending the at least the second portion of the UCI using the second CORESET pool is based on inter-carrier hopping.

8. A method comprising:
receiving, by a wireless device, one or more radio resource control (RRC) messages indicating configuration parameters for a cell, wherein the configuration parameters indicate, for a wireless resource:
a first physical resource block (PRB), associated with a first spatial domain filter, for a first portion of an uplink transmission; and
a second PRB, associated with a second spatial domain filter, for a second portion of the uplink transmission; and
sending, via the wireless resource, the uplink transmission, wherein the sending the uplink transmission comprises:
sending the first portion based on the first PRB and the first spatial domain filter; and
sending the second portion based on the second PRB and the second spatial domain filter.

9. The method of claim 8, wherein:
the first spatial domain filter is associated with a first control resource set (CORESET) pool; and
the second spatial domain filter is associated with a second CORESET pool.

10. The method of claim 8, wherein the uplink transmission comprises at least one of:
uplink control information; or
a transport block.

11. The method of claim 8, wherein the wireless resource comprises at least one of:
a physical uplink control channel (PUCCH) resource; or
a physical uplink shared channel (PUSCH) resource.

12. The method of claim 8, wherein:
the first spatial domain filter is associated with a first carrier and the second spatial domain filter is associated with a second carrier;
the sending the first portion comprises transmitting, via the first carrier, the first portion; and
the sending the second portion comprises transmitting, via the second carrier, the second portion.

13. The method of claim 8, wherein the configuration parameters indicate that inter-carrier hopping is enabled, and wherein the sending the uplink transmission is based on inter-carrier hopping.

14. The method of claim 8, wherein:
the first portion of the uplink transmission is a first hop of the uplink transmission; and
the second portion of the uplink transmission is a second hop of the uplink transmission, wherein the configuration parameters further indicate a hopping pattern comprising the first hop and the second hop.

15. A method comprising:
receiving, by a wireless device, one or more radio resource control (RRC) messages indicating configuration parameters for a cell, wherein the configuration parameters indicate, for a wireless resource:
  a first physical resource block (PRB), associated with a first carrier, for a first portion of an uplink transmission; and
  a second PRB, associated with a second carrier, for a second portion of the uplink transmission; and
sending, via the wireless resource, the uplink transmission, wherein the sending the uplink transmission comprises:
  sending the first portion based on the first PRB; and
  sending the second portion based on the second PRB.

16. The method of claim 15, wherein:
the first carrier is associated with a first control resource set (CORESET) pool; and
the second carrier is associated with a second CORESET pool.

17. The method of claim 15, wherein the uplink transmission comprises at least one of:
uplink control information; or
a transport block.

18. The method of claim 15, wherein the wireless resource comprises at least one of:
a physical uplink control channel (PUCCH) resource; or
a physical uplink shared channel (PUSCH) resource.

19. The method of claim 15, wherein the configuration parameters indicate that inter-carrier hopping and intra-slot hopping are enabled.

20. The method of claim 15, wherein:
the first portion of the uplink transmission is a first hop of the uplink transmission; and
the second portion of the uplink transmission is a second hop of the uplink transmission, wherein the configuration parameters further indicate a hopping pattern comprising the first hop and the second hop.

* * * * *

UNITED STATES PATENT AND TRADEMARK OFFICE
CERTIFICATE OF CORRECTION

PATENT NO. : 11,723,032 B2
APPLICATION NO. : 17/323928
DATED : August 8, 2023
INVENTOR(S) : Yi et al.

It is certified that error appears in the above-identified patent and that said Letters Patent is hereby corrected as shown below:

In the Specification

Column 12, Detailed Description, Line 22:
Delete "223" and insert --212-- therefor Column 13, Detailed Description, Line 50:
After "commands", insert --.-- therefor Column 35, Detailed Description, Line 52:
Delete "0≤fid<8)," and insert --0≤f_id<8),-- therefor Column 47, Detailed Description, Line 21:
After "running", insert --.-- therefor Column 51, Detailed Description, Line 36:
Delete "semi-persisitent" and insert --semi-persistent-- therefor Column 53, Detailed Description, Line 1:
Delete "1826The" and insert --1826. The-- therefor Column 54, Detailed Description, Line 52:
Delete "qual" and insert --equal-- therefor Column 57, Detailed Description, Line 18:
Delete "sysmbols)" and insert --symbols)-- therefor Column 77, Detailed Description, Line 24:
Delete "RFE," and insert --RFE-- therefor Signed and Sealed this
Eighth Day of October, 2024

Katherine Kelly Vidal
*Director of the United States Patent and Trademark Office*

CERTIFICATE OF CORRECTION (continued)
U.S. Pat. No. 11,723,032 B2

Column 113, Detailed Description, Line 20:
Delete "deviceOfin" and insert --device-- therefor Column 114, Detailed Description, Line 19:
Delete "Lab VIEWMathScript." and insert --LabVIEWMathScript.-- therefor In the Claims Column 115, Claim 5, Line 65:
Delete "enabled," and insert --enabled;-- therefor Column 115, Claim 5, Line 65:
Delete "PRB," and insert --PRB;-- therefor